US012700982B2

(12) United States Patent
Zhang et al.

(10) Patent No.: US 12,700,982 B2
(45) Date of Patent: Aug. 4, 2026

(54) TECHNIQUES FOR USER EQUIPMENT FULL-DUPLEX OPERATION

(71) Applicant: QUALCOMM Incorporated, San Diego, CA (US)

(72) Inventors: Qian Zhang, Basking Ridge, NJ (US); Yan Zhou, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 345 days.

(21) Appl. No.: 18/493,648

(22) Filed: Oct. 24, 2023

(65) Prior Publication Data

US 2025/0132889 A1     Apr. 24, 2025

(51) Int. Cl.
| | | |
|---|---|---|
| *H04L 5/14* | (2006.01) | |
| *H04L 5/00* | (2006.01) | |
| *H04W 72/232* | (2023.01) | |

(52) U.S. Cl.
CPC ................ *H04L 5/14* (2013.01); *H04L 5/001* (2013.01); *H04W 72/232* (2023.01)

(58) Field of Classification Search
CPC ......... H04L 5/14; H04L 5/001; H04L 5/0094; H04L 5/16; H04W 72/232
See application file for complete search history.

(56) References Cited

U.S. PATENT DOCUMENTS

| | | | | | |
|---|---|---|---|---|---|
| 2013/0083704 A1* | 4/2013 | Gaal | ........................ | H04L 5/001 |
| | | | | 370/277 |
| 2016/0323088 A1* | 11/2016 | Beale | ........................ | H04L 5/16 |

| | | | | | |
|---|---|---|---|---|---|
| 2021/0176626 A1* | 6/2021 | Abdelghaffar | ........ | H04W 76/27 |
| 2021/0400637 A1* | 12/2021 | Abotabl | ................ | H04W 72/02 |
| 2021/0400673 A1* | 12/2021 | Abotabl | ................ | H04W 72/23 |
| 2022/0116191 A1* | 4/2022 | Bai | ........................ | H04W 72/23 |
| 2022/0377843 A1* | 11/2022 | Zhang | ................... | H04W 88/06 |

(Continued)

OTHER PUBLICATIONS

International Search Report and Written Opinion—PCT/US2024/048224—ISA/EPO—Jan. 3, 2025.

(Continued)

*Primary Examiner* — Ayaz R Sheikh
*Assistant Examiner* — Mang Boi Thawng
(74) *Attorney, Agent, or Firm* — Holland & Hart LLP

(57) ABSTRACT

Methods, systems, and devices for wireless communications are described that provide for full-duplex communications at both a user equipment (UE) and a serving network entity in which the UE, the network entity, or both can dynamically change from full-duplex communications to half-duplex communications. A UE may be configured for full-duplex communications for a set of symbols, and may receive an indication to switch one or more symbols to a half-duplex configuration. The half-duplex configuration may correspond to an indicated half-duplex configuration in which both the network entity and UE operate in the half-duplex configuration, or may correspond to a full-duplex configuration of the network entity in which the UE operates in half-duplex and the network operates in the full-duplex configuration. Signaling that indicates one or more symbols to be switched to the half-duplex configuration may be provided in downlink control information, medium access control signaling, or both.

30 Claims, 22 Drawing Sheets

(56)                    References Cited

U.S. PATENT DOCUMENTS

| | | | |
|---|---|---|---|
| 2023/0106194 A1* | 4/2023 | Rudolf | H04W 74/0833 |
| | | | 370/329 |
| 2023/0370240 A1* | 11/2023 | Abotabl | H04W 72/23 |
| 2025/0365122 A1* | 11/2025 | Jung | H04B 17/345 |

OTHER PUBLICATIONS

Samsung: "On SBFD for NR Duplex Evolution", 3GPP TSG-RAN WG1 Meeting #112bis-e, R1-2303127, 3rd Generation Partnership Project (3GPP), Mobile Competence Centre, 650, Route Des Lucioles, F-06921, Sophia-Antipolis Cedex, France, vol. RAN WG1, No. Online, Apr. 17, 2023-Apr. 26, 2023, Apr. 7, 2023, pp. 1-42, XP052293694, Section 4.3.3.

TCL: "Discussion on Subband Non-Overlapping Full Duplex", 3GPP TSG RAN WG1 Meeting #114, R1-2306680, 3rd Generation Partnership Project (3GPP), Mobile Competence Centre, 650, Route Des Lucioles, F-06921, Sophia-Antipolis Cedex, France, vol. RAN WG1, No. Toulouse, FR, Aug. 21, 2023-Aug. 25, 2023, Aug. 11, 2023, pp. 1-13, XP052435911, The Whole Document.

* cited by examiner

710

720

715

705

700

130    105    115

Network
Entity

Transceiver    Antenna 1410    1415

Communications
Manager

Memory

Code

1430

1420    1425

1440

Processor

1435

1405

1400

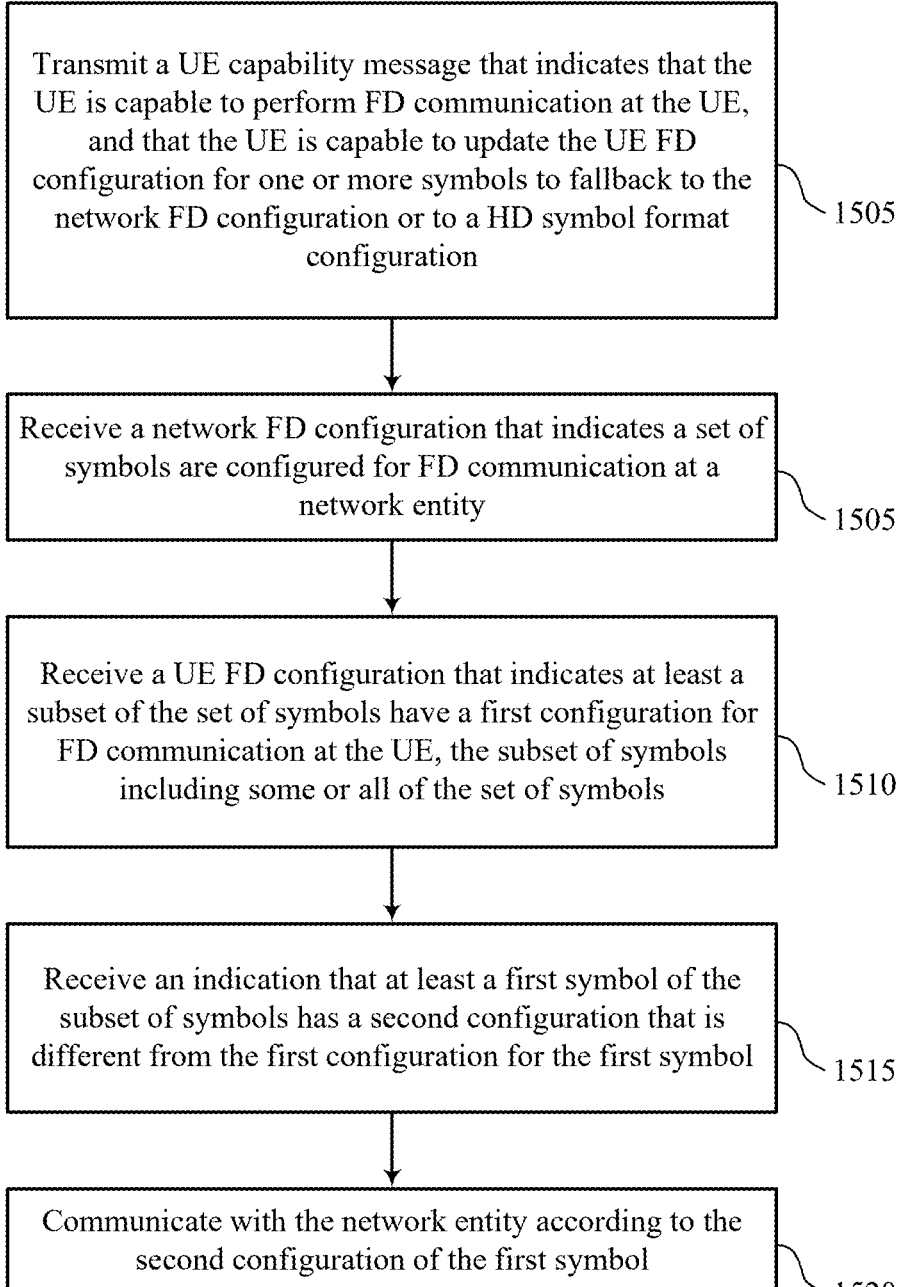

Transmit a UE capability message that indicates that the UE is capable to perform FD communication at the UE, and that the UE is capable to update the UE FD configuration for one or more symbols to fallback to the network FD configuration or to a HD symbol format configuration

1505

Receive a network FD configuration that indicates a set of symbols are configured for FD communication at a network entity

1505

Receive a UE FD configuration that indicates at least a subset of the set of symbols have a first configuration for FD communication at the UE, the subset of symbols including some or all of the set of symbols

1510

Receive an indication that at least a first symbol of the subset of symbols has a second configuration that is different from the first configuration for the first symbol

1515

Communicate with the network entity according to the second configuration of the first symbol

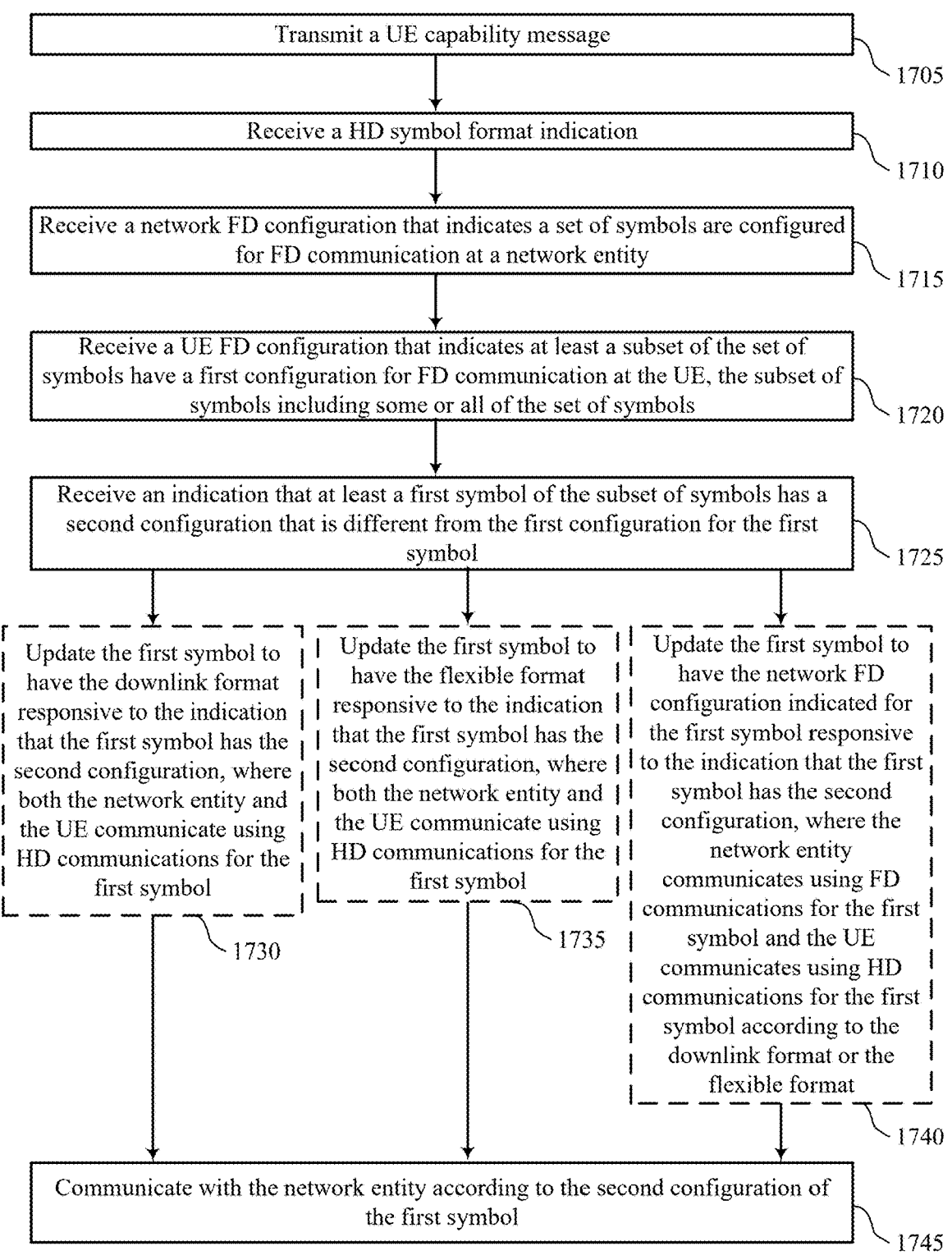

Transmit a UE capability message
1705

Receive a HD symbol format indication
1710

Receive a network FD configuration that indicates a set of symbols are configured for FD communication at a network entity
1715

Receive a UE FD configuration that indicates at least a subset of the set of symbols have a first configuration for FD communication at the UE, the subset of symbols including some or all of the set of symbols
1720

Receive an indication that at least a first symbol of the subset of symbols has a second configuration that is different from the first configuration for the first symbol
1725

Update the first symbol to have the downlink format responsive to the indication that the first symbol has the second configuration, where both the network entity and the UE communicate using HD communications for the first symbol
1730

Update the first symbol to have the flexible format responsive to the indication that the first symbol has the second configuration, where both the network entity and the UE communicate using HD communications for the first symbol
1735

Update the first symbol to have the network FD configuration indicated for the first symbol responsive to the indication that the first symbol has the second configuration, where the network entity communicates using FD communications for the first symbol and the UE communicates using HD communications for the first symbol according to the downlink format or the flexible format
1740

Communicate with the network entity according to the second configuration of the first symbol
1745

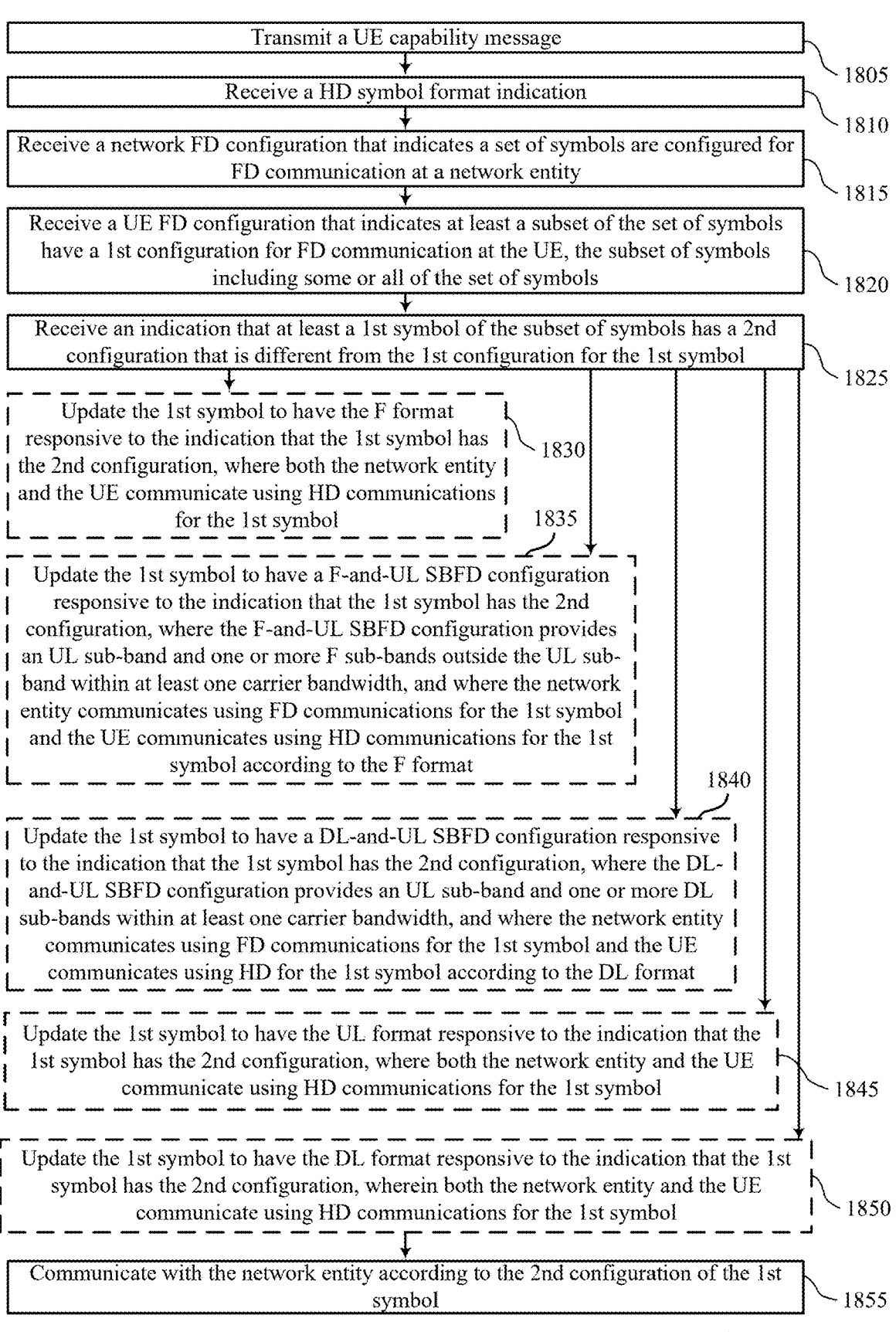

| Transmit a UE capability message | 1805 |

| Receive a HD symbol format indication | 1810 |

| Receive a network FD configuration that indicates a set of symbols are configured for FD communication at a network entity | 1815 |

| Receive a UE FD configuration that indicates at least a subset of the set of symbols have a 1st configuration for FD communication at the UE, the subset of symbols including some or all of the set of symbols | 1820 |

| Receive an indication that at least a 1st symbol of the subset of symbols has a 2nd configuration that is different from the 1st configuration for the 1st symbol | 1825 |

Update the 1st symbol to have the F format responsive to the indication that the 1st symbol has the 2nd configuration, where both the network entity and the UE communicate using HD communications for the 1st symbol — 1830

Update the 1st symbol to have a F-and-UL SBFD configuration responsive to the indication that the 1st symbol has the 2nd configuration, where the F-and-UL SBFD configuration provides an UL sub-band and one or more F sub-bands outside the UL sub-band within at least one carrier bandwidth, and where the network entity communicates using FD communications for the 1st symbol and the UE communicates using HD communications for the 1st symbol according to the F format — 1835

Update the 1st symbol to have a DL-and-UL SBFD configuration responsive to the indication that the 1st symbol has the 2nd configuration, where the DL-and-UL SBFD configuration provides an UL sub-band and one or more DL sub-bands within at least one carrier bandwidth, and where the network entity communicates using FD communications for the 1st symbol and the UE communicates using HD for the 1st symbol according to the DL format — 1840

Update the 1st symbol to have the UL format responsive to the indication that the 1st symbol has the 2nd configuration, where both the network entity and the UE communicate using HD communications for the 1st symbol — 1845

Update the 1st symbol to have the DL format responsive to the indication that the 1st symbol has the 2nd configuration, wherein both the network entity and the UE communicate using HD communications for the 1st symbol — 1850

| Communicate with the network entity according to the 2nd configuration of the 1st symbol | 1855 |

FIG. 18                    1800

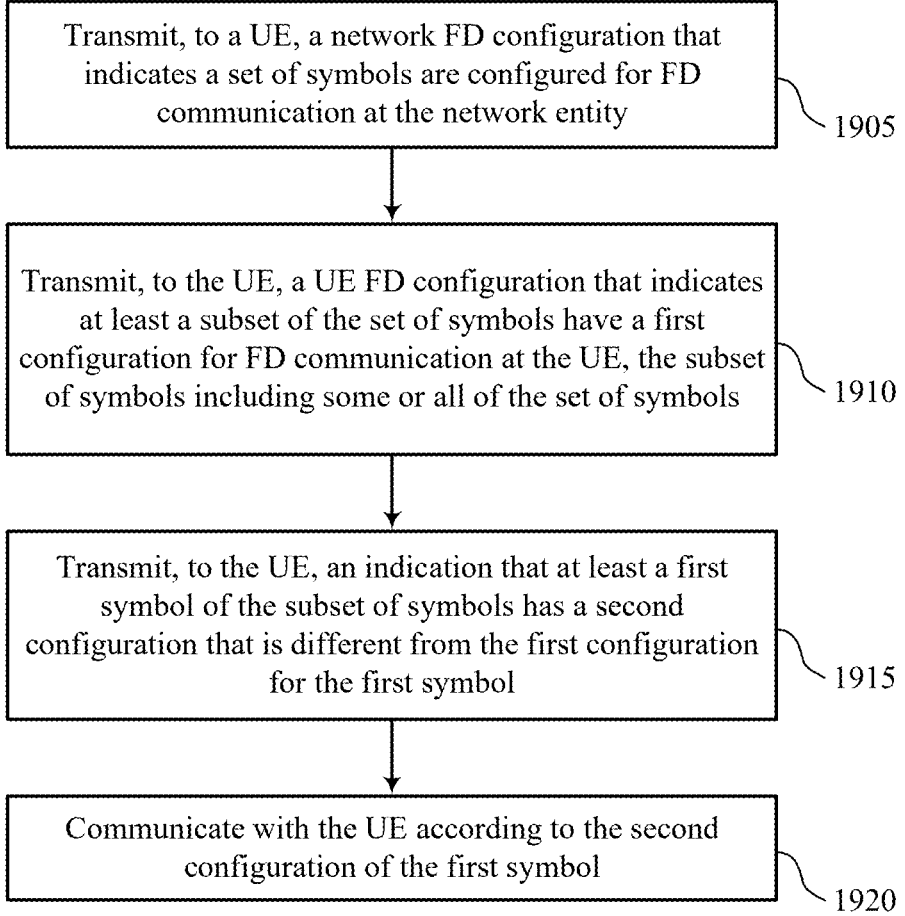

Transmit, to a UE, a network FD configuration that indicates a set of symbols are configured for FD communication at the network entity

1905

Transmit, to the UE, a UE FD configuration that indicates at least a subset of the set of symbols have a first configuration for FD communication at the UE, the subset of symbols including some or all of the set of symbols

1910

Transmit, to the UE, an indication that at least a first symbol of the subset of symbols has a second configuration that is different from the first configuration for the first symbol

1915

Communicate with the UE according to the second configuration of the first symbol

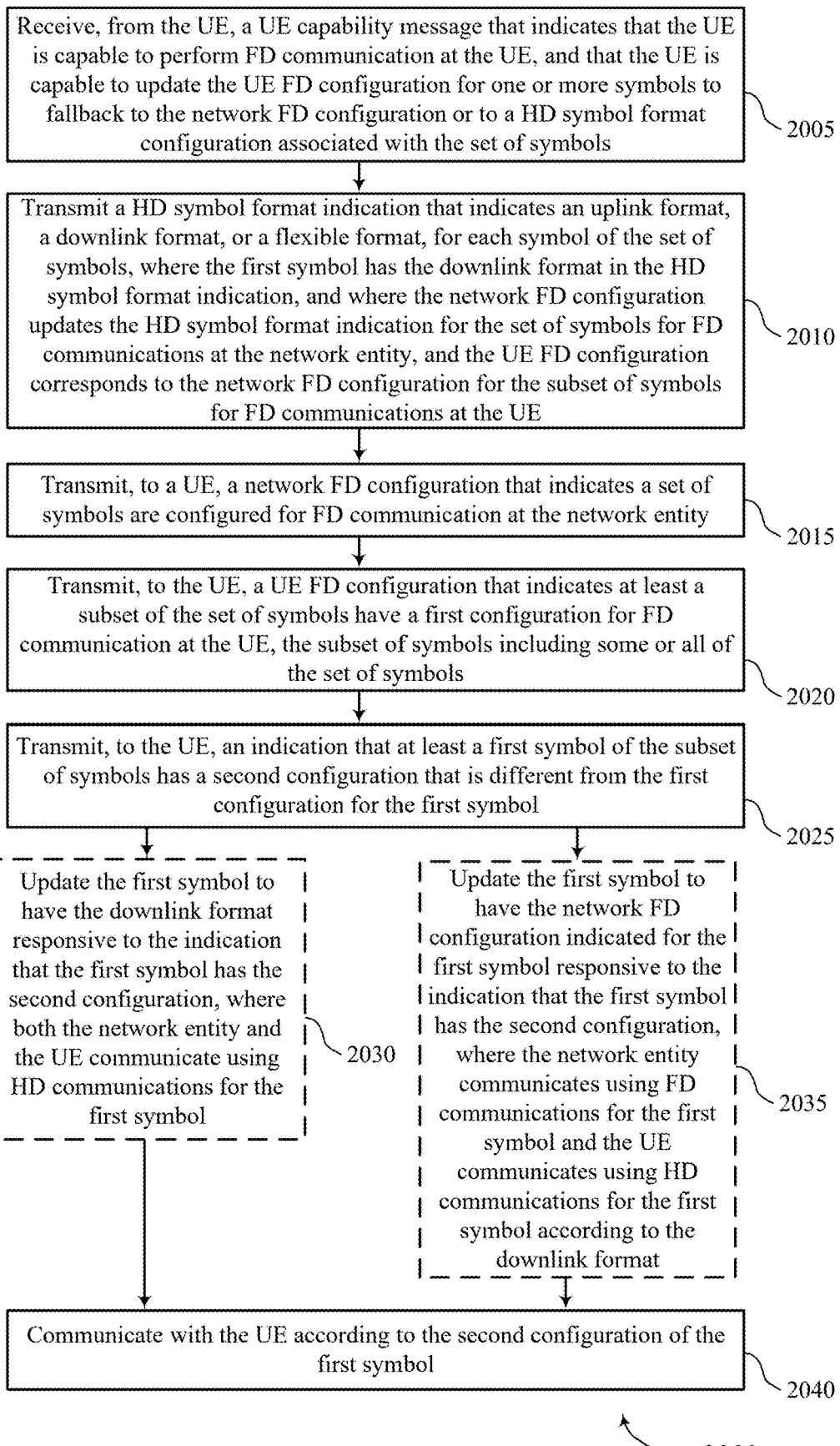

Receive, from the UE, a UE capability message that indicates that the UE is capable to perform FD communication at the UE, and that the UE is capable to update the UE FD configuration for one or more symbols to fallback to the network FD configuration or to a HD symbol format configuration associated with the set of symbols
⎯2005

Transmit a HD symbol format indication that indicates an uplink format, a downlink format, or a flexible format, for each symbol of the set of symbols, where the first symbol has the downlink format in the HD symbol format indication, and where the network FD configuration updates the HD symbol format indication for the set of symbols for FD communications at the network entity, and the UE FD configuration corresponds to the network FD configuration for the subset of symbols for FD communications at the UE
⎯2010

Transmit, to a UE, a network FD configuration that indicates a set of symbols are configured for FD communication at the network entity
⎯2015

Transmit, to the UE, a UE FD configuration that indicates at least a subset of the set of symbols have a first configuration for FD communication at the UE, the subset of symbols including some or all of the set of symbols
⎯2020

Transmit, to the UE, an indication that at least a first symbol of the subset of symbols has a second configuration that is different from the first configuration for the first symbol
⎯2025

Update the first symbol to have the downlink format responsive to the indication that the first symbol has the second configuration, where both the network entity and the UE communicate using HD communications for the first symbol
⎯2030

Update the first symbol to have the network FD configuration indicated for the first symbol responsive to the indication that the first symbol has the second configuration, where the network entity communicates using FD communications for the first symbol and the UE communicates using HD communications for the first symbol according to the downlink format
⎯2035

Communicate with the UE according to the second configuration of the first symbol
⎯2040

FIG. 20                                      ⎯2000

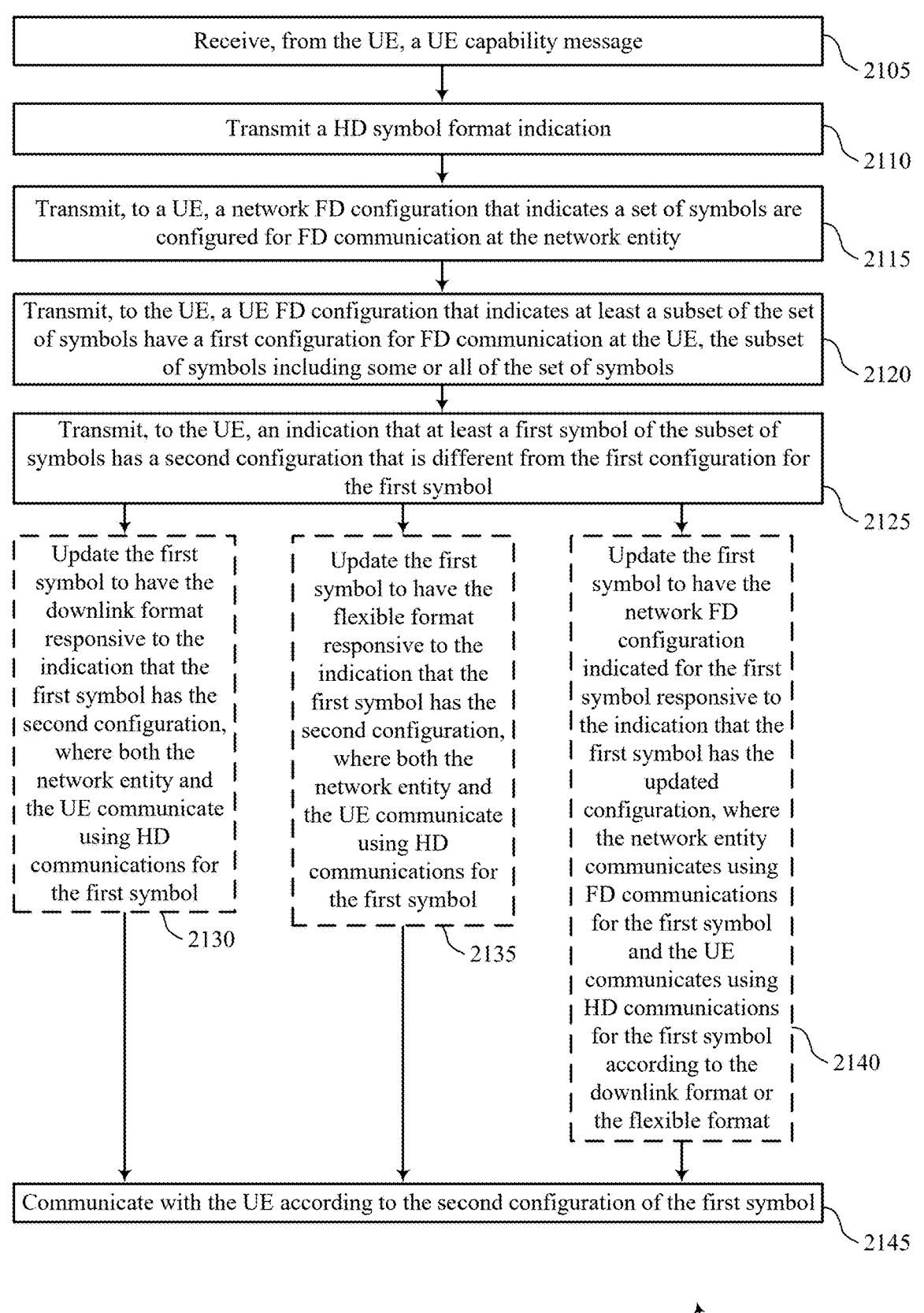

| Receive, from the UE, a UE capability message | 2105 |

| Transmit a HD symbol format indication | 2110 |

Transmit, to a UE, a network FD configuration that indicates a set of symbols are configured for FD communication at the network entity — 2115

Transmit, to the UE, a UE FD configuration that indicates at least a subset of the set of symbols have a first configuration for FD communication at the UE, the subset of symbols including some or all of the set of symbols — 2120

Transmit, to the UE, an indication that at least a first symbol of the subset of symbols has a second configuration that is different from the first configuration for the first symbol — 2125

Update the first symbol to have the downlink format responsive to the indication that the first symbol has the second configuration, where both the network entity and the UE communicate using HD communications for the first symbol — 2130

Update the first symbol to have the flexible format responsive to the indication that the first symbol has the second configuration, where both the network entity and the UE communicate using HD communications for the first symbol — 2135

Update the first symbol to have the network FD configuration indicated for the first symbol responsive to the indication that the first symbol has the updated configuration, where the network entity communicates using FD communications for the first symbol and the UE communicates using HD communications for the first symbol according to the downlink format or the flexible format — 2140

Communicate with the UE according to the second configuration of the first symbol — 2145

TECHNIQUES FOR USER EQUIPMENT FULL-DUPLEX OPERATION

FIELD OF TECHNOLOGY

The following relates to wireless communications, including techniques for user equipment full-duplex operation.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

In some systems, certain devices (e.g., base stations, transmission-reception points, radio heads, or other network entities) may operate in a full-duplex mode in which the device transmits signals and receives signals using a same set of wireless resources (e.g., a same or overlapping set of time and frequency resources). Efficient techniques for reliable communications when a device is operating in full-duplex mode can help to enhance network efficiency, enhance network throughput, and create an enhanced user experience.

SUMMARY

The described techniques relate to improved methods, systems, devices, and apparatuses that support techniques for user equipment (UE) full-duplex operation. For example, the described techniques provide for full-duplex communications at both a UE and a serving network entity in which the UE, the network entity, or both can dynamically change from full-duplex communications to half-duplex communications. In some aspects, UE full-duplex operation is enabled by providing a network entity full-duplex configuration for a set of symbols (or slots) and a UE full-duplex configuration that indicates a UE full-duplex configuration for some or all of the symbols of the set of symbols. For example, the UE full-duplex configuration may provide a corresponding full-duplex configuration to the network entity full-duplex configuration (e.g., a network entity configuration of downlink-uplink-downlink (D/U/D) for sub-band full-duplex (SBFD) communications corresponds to a UE configuration of D/U/D). In the event that the UE would benefit from a switch to half-duplex communications (e.g., due to self-interference at the UE), the network entity may transmit an indication to switch one or more symbols to a half-duplex configuration. In some aspects, the half-duplex configuration may correspond to an indicated half-duplex configuration in which both the network entity and UE operate in the half-duplex configuration. In other aspects, the half-duplex configuration may correspond to a full-duplex configuration of the network entity in which the UE operates in half-duplex and the network operates in the full-duplex configuration (e.g., transmitting downlink communications to a first UE and receiving uplink communications from a second UE).

In some aspects, the dynamic full-duplex signaling to indicate the updated configuration for the one or more symbols may be provided through downlink control information (DCI), such as a scheduling or non-scheduling DCI. Additionally, or alternatively, dynamic full-duplex signaling to indicate the updated configuration for the one or more symbols may be provided through a medium access control (MAC) control element (CE). The indication of the update to the one or more symbols may be provided by a bitmap, a predefined pattern ID, an offset/length that identifies updated symbols, or any combinations thereof. In some aspects, updates to the full-duplex symbols may be started based on a receipt time of the indication, based on an acknowledgment time of an acknowledgment of the indication, based on a configured time (e.g., configured in radio resource control signaling), based on a time indicated by a UE capability message, or any combinations thereof. In some aspects, updates to the full-duplex configuration of the one or more symbols may apply to one or more component carriers.

A method for wireless communications by a user equipment (UE) is described. The method may include receiving a network full-duplex configuration that indicates a set of symbols are configured for full-duplex communication at a network entity, receiving a UE full-duplex configuration that indicates at least a subset of the set of symbols have a first configuration for full-duplex communication at the UE, the subset of symbols including some or all of the set of symbols, receiving an indication that at least a first symbol of the subset of symbols has a second configuration that is different from the first configuration for the first symbol, and communicating with the network entity according to the second configuration of the first symbol.

A UE for wireless communications is described. The UE may include one or more memories storing processor executable code, and one or more processors coupled with the one or more memories. The one or more processors may individually or collectively operable to execute the code to cause the UE to receive a network full-duplex configuration that indicates a set of symbols are configured for full-duplex communication at a network entity, receive a UE full-duplex configuration that indicates at least a subset of the set of symbols have a first configuration for full-duplex communication at the UE, the subset of symbols including some or all of the set of symbols, receive an indication that at least a first symbol of the subset of symbols has a second configuration that is different from the first configuration for the first symbol, and communicate with the network entity according to the second configuration of the first symbol.

Another UE for wireless communications is described. The UE may include means for receiving a network full-duplex configuration that indicates a set of symbols are configured for full-duplex communication at a network entity, means for receiving a UE full-duplex configuration that indicates at least a subset of the set of symbols have a first configuration for full-duplex communication at the UE, the subset of symbols including some or all of the set of symbols, means for receiving an indication that at least a first symbol of the subset of symbols has a second configuration that is different from the first configuration for the first symbol, and means for communicating with the network entity according to the second configuration of the first symbol.

A non-transitory computer-readable medium storing code for wireless communications is described. The code may include instructions executable by a processor to receive a network full-duplex configuration that indicates a set of symbols are configured for full-duplex communication at a network entity, receive a UE full-duplex configuration that indicates at least a subset of the set of symbols have a first configuration for full-duplex communication at the UE, the subset of symbols including some or all of the set of symbols, receive an indication that at least a first symbol of the subset of symbols has a second configuration that is different from the first configuration for the first symbol, and communicate with the network entity according to the second configuration of the first symbol.

Some examples of the method, UEs, and non-transitory computer-readable medium described herein may further include operations, features, means, or instructions for receiving a half-duplex symbol format indication that indicates an uplink format, a downlink format, or a flexible format, for each symbol of the set of symbols, where the first symbol has the downlink format in the half-duplex symbol format indication, and where the network full-duplex configuration updates the half-duplex symbol format indication for the set of symbols for full-duplex communications at the network entity, and the UE full-duplex configuration corresponds to the network full-duplex configuration for the subset of symbols for full-duplex communications at the UE. Some examples of the method, UEs, and non-transitory computer-readable medium described herein may further include operations, features, means, or instructions for updating the first symbol to have the downlink format responsive to the indication that the first symbol has the second configuration, where both the network entity and the UE communicate using half-duplex communications for the first symbol. Some examples of the method, UEs, and non-transitory computer-readable medium described herein may further include operations, features, means, or instructions for updating the first symbol to have the network full-duplex configuration indicated for the first symbol responsive to the indication that the first symbol has the second configuration, where the network entity communicates using full-duplex communications for the first symbol and the UE communicates using half-duplex communications for the first symbol according to the network full-duplex configuration.

In some examples of the method, UEs, and non-transitory computer-readable medium described herein, the network full-duplex configuration is a sub-band full-duplex configurations in which at least a first sub-band of a component carrier bandwidth is configured for downlink communications and at least a second sub-band of the component carrier bandwidth or another component carrier is configured for uplink communications. In some examples of the method, UEs, and non-transitory computer-readable medium described herein, the UE full-duplex configuration is a sub-band full-duplex configuration in which at least a first sub-band of a component carrier bandwidth is configured for downlink communications and at least a second sub-band of the component carrier bandwidth or another component carrier is configured for uplink communications.

Some examples of the method, UEs, and non-transitory computer-readable medium described herein may further include operations, features, means, or instructions for transmitting a UE capability message that indicates that the UE is capable to perform full-duplex communication at the UE, and that the UE is capable to update the UE full-duplex configuration for one or more symbols to fallback to the network full-duplex configuration or to a half-duplex symbol format configuration associated with the set of symbols.

Some examples of the method, UEs, and non-transitory computer-readable medium described herein may further include operations, features, means, or instructions for receiving a half-duplex symbol format indication that indicates an uplink format, a downlink format, or a flexible format, for each symbol of the set of symbols, where the first symbol has the flexible format in the half-duplex symbol format indication and the first symbol has a downlink-and-uplink network full-duplex configuration, and where the network full-duplex configuration updates the half-duplex symbol format for the set of symbols for full-duplex communications at the network entity, and the UE full-duplex configuration corresponds to the network full-duplex configuration for the subset of symbols for full-duplex communications at the UE.

Some examples of the method, UEs, and non-transitory computer-readable medium described herein may further include operations, features, means, or instructions for updating the first symbol to have the downlink format responsive to the indication that the first symbol has the second configuration, where both the network entity and the UE communicate using half-duplex communications for the first symbol. Some examples of the method, UEs, and non-transitory computer-readable medium described herein may further include operations, features, means, or instructions for updating the first symbol to have the flexible format responsive to the indication that the first symbol has the second configuration, where both the network entity and the UE communicate using half-duplex communications for the first symbol. Some examples of the method, UEs, and non-transitory computer-readable medium described herein may further include operations, features, means, or instructions for updating the first symbol to have the network full-duplex configuration indicated for the first symbol responsive to the indication that the first symbol has the second configuration, where the network entity communicates using full-duplex communications for the first symbol and the UE communicates using half-duplex communications for the first symbol according to the downlink format or the flexible format.

Some examples of the method, UEs, and non-transitory computer-readable medium described herein may further include operations, features, means, or instructions for transmitting a UE capability message that indicates that the UE is capable to perform sub-band full-duplex communication at the UE, and that the UE is capable to update the UE full-duplex configuration for one or more symbols to fallback to the network full-duplex configuration, or to the downlink or flexible format half-duplex symbol format configuration associated with the set of symbols.

Some examples of the method, UEs, and non-transitory computer-readable medium described herein may further include operations, features, means, or instructions for receiving a half-duplex symbol format indication that indicates an uplink format, a downlink format, or a flexible format, for each symbol of the set of symbols, where the first symbol has the flexible format in the half-duplex symbol format indication, and where the network full-duplex configuration updates the half-duplex symbol format indication for the set of symbols for sub-band full-duplex communications at the network entity to provide that the first symbol has a flexible-and-uplink network sub-band full-duplex configuration, and the UE full-duplex configuration corresponds to the network full-duplex configuration for the subset of symbols for sub-band full-duplex communications at the UE. Some examples of the method, UEs, and non-transitory computer-readable medium described herein may further include operations, features, means, or instructions for updating the first symbol to have the flexible format responsive to the indication that the first symbol has the second configuration, where both the network entity and the UE communicate using half-duplex communications for the first symbol. Some examples of the method, UEs, and non-transitory computer-readable medium described herein may further include operations, features, means, or instructions for updating the first symbol have a flexible-and-uplink sub-band full-duplex configuration responsive to the indication that the first symbol has the second configuration, where the flexible-and-uplink sub-band full-duplex configuration provides an uplink sub-band and one or more flexible sub-bands outside the uplink sub-band within at least one carrier bandwidth, and where the network entity communicates using full-duplex communications for the first symbol and the UE communicates using half-duplex communications for the first symbol according to the flexible format. Some examples of the method, UEs, and non-transitory computer-readable medium described herein may further include operations, features, means, or instructions for updating the first symbol have a downlink-and-uplink sub-band full-duplex configuration responsive to the indication that the first symbol has the second configuration, where the downlink-and-uplink sub-band full-duplex configuration provides an uplink sub-band and one or more downlink sub-bands within at least one carrier bandwidth, and where the network entity communicates using full-duplex communications for the first symbol and the UE communicates using half-duplex communications for the first symbol according to the downlink format. Some examples of the method, UEs, and non-transitory computer-readable medium described herein may further include operations, features, means, or instructions for updating the first symbol have the uplink format responsive to the indication that the first symbol has the second configuration, where both the network entity and the UE communicate using half-duplex communications for the first symbol. Some examples of the method, UEs, and non-transitory computer-readable medium described herein may further include operations, features, means, or instructions for updating the first symbol have the downlink format responsive to the indication that the first symbol has the second configuration, where both the network entity and the UE communicate using half-duplex communications for the first symbol.

Some examples of the method, UEs, and non-transitory computer-readable medium described herein may further include operations, features, means, or instructions for transmitting a UE capability message that indicates that the UE is capable to perform sub-band full-duplex communication at the UE, and that the UE is capable to update the UE full-duplex configuration for one or more symbols to fall-back to a network a downlink-and-uplink sub-band full-duplex configuration, to a network a flexible-and-uplink sub-band full-duplex configuration, or to the downlink, uplink, or flexible format half-duplex symbol format configuration associated with the set of symbols.

In some examples of the method, UEs, and non-transitory computer-readable medium described herein, the receiving the indication may include operations, features, means, or instructions for receiving a scheduling DCI communication that schedules downlink or uplink communications outside of a sub-band that is configured for downlink or uplink communications in the UE full-duplex configuration for at least the first symbol. In some examples of the method, UEs, and non-transitory computer-readable medium described herein, the receiving the indication may include operations, features, means, or instructions for receiving a non-scheduling DCI communication that indicates whether the first symbol is to be used for UE full-duplex communications or for UE half-duplex communications. In some examples of the method, UEs, and non-transitory computer-readable medium described herein, the receiving the indication may include operations, features, means, or instructions for receiving a MAC-CE that indicates whether the first symbol is to be used for UE full-duplex communications or for UE half-duplex communications. In some examples of the method, UEs, and non-transitory computer-readable medium described herein, the receiving the indication may include operations, features, means, or instructions for receiving DCI that indicates that at least the first symbol has the second configuration, the DCI provided in a group common DCI communication, a DCI communication that schedules data, a DCI communication that does not schedule data, or a prespecified DCI communication associated with full-duplex communications. In some examples of the method, UEs, and non-transitory computer-readable medium described herein, the DCI indicates one or more symbols are updated or indicates the second configuration is valid until a subsequent updated configuration is provided.

In some examples of the method, UEs, and non-transitory computer-readable medium described herein, the receiving the indication may include operations, features, means, or instructions for receiving a MAC-CE that indicates that at least the first symbol has the second configuration, and that indicates one or more symbols that are updated or that the second configuration is valid until a subsequent updated configuration is provided. In some examples of the method, UEs, and non-transitory computer-readable medium described herein, the receiving the indication may include operations, features, means, or instructions for receiving a scheduling DCI communication that schedules a channel or reference signal transmission for one or more symbols, and where the indication that at least the first symbol has the second configuration is based on the channel or reference signal transmission that is scheduled.

In some examples of the method, UEs, and non-transitory computer-readable medium described herein, the indication that at least the first symbol of the subset of symbols has the second configuration provides one or more of a change to a periodic pattern of the UE full-duplex configuration for the subset of symbols, an updated semi-persistent UE full-duplex configuration for the subset of symbols, or the second configuration that is maintained until a subsequent update of the UE full-duplex configuration. In some examples of the method, UEs, and non-transitory computer-readable medium described herein, the indication includes one or more of a bitmap that indicates a pattern of symbols that have the UE full-duplex configuration, a predefined pattern identification that indicates the pattern of symbols that have the UE full-duplex configuration, or an offset and length of the subset of symbols that have the UE full-duplex configuration. In some examples of the method, UEs, and non-transitory computer-readable medium described herein, the indication that at least the first symbol of the subset of symbols has the second configuration provides the second configuration for a single occasion of the subset of symbols, or for multiple occasions of the subset of symbols.

In some examples of the method, UEs, and non-transitory computer-readable medium described herein, the indication provides an identification of one or more symbols associated with the single occasion with the second configuration, or provides a time window during which the multiple occasions of subset of symbols have the second configuration. In some examples of the method, UEs, and non-transitory computer-readable medium described herein, the first symbol is applied based on a time duration from a receipt of the indication, a time duration from transmission of an acknowledgment of the indication, a time duration indicated in configuration or control information signaling, or a time duration indicated in a reported UE capability. In some examples of the method, UEs, and non-transitory computer-readable medium described herein, the indication that at least the first symbol of the subset of symbols has the second configuration is applied to one CC, one or more CCs in a CC list, or in a different CC than a CC used to provide the indication.

A method for wireless communications by a network entity is described. The method may include transmitting, to a UE, a network full-duplex configuration that indicates a set of symbols are configured for full-duplex communication at the network entity, transmitting, to the UE, a UE full-duplex configuration that indicates at least a subset of the set of symbols have a first configuration for full-duplex communication at the UE, the subset of symbols including some or all of the set of symbols, transmitting, to the UE, an indication that at least a first symbol of the subset of symbols has a second configuration that is different from the first configuration for the first symbol, and communicating with the UE according to the second configuration of the first symbol.

A network entity for wireless communications is described. The network entity may include one or more memories storing processor executable code, and one or more processors coupled with the one or more memories. The one or more processors may individually or collectively operable to execute the code to cause the network entity to transmit, to a UE, a network full-duplex configuration that indicates a set of symbols are configured for full-duplex communication at the network entity, transmit, to the UE, a UE full-duplex configuration that indicates at least a subset of the set of symbols have a first configuration for full-duplex communication at the UE, the subset of symbols including some or all of the set of symbols, transmit, to the UE, an indication that at least a first symbol of the subset of symbols has a second configuration that is different from the first configuration for the first symbol, and communicate with the UE according to the second configuration of the first symbol.

Another network entity for wireless communications is described. The network entity may include means for transmitting, to a UE, a network full-duplex configuration that indicates a set of symbols are configured for full-duplex communication at the network entity, means for transmitting, to the UE, a UE full-duplex configuration that indicates at least a subset of the set of symbols have a first configuration for full-duplex communication at the UE, the subset of symbols including some or all of the set of symbols, means for transmitting, to the UE, an indication that at least a first symbol of the subset of symbols has a second configuration that is different from the first configuration for the first symbol, and means for communicating with the UE according to the second configuration of the first symbol.

A non-transitory computer-readable medium storing code for wireless communications is described. The code may include instructions executable by a processor to transmit, to a UE, a network full-duplex configuration that indicates a set of symbols are configured for full-duplex communication at the network entity, transmit, to the UE, a UE full-duplex configuration that indicates at least a subset of the set of symbols have a first configuration for full-duplex communication at the UE, the subset of symbols including some or all of the set of symbols, transmit, to the UE, an indication that at least a first symbol of the subset of symbols has a second configuration that is different from the first configuration for the first symbol, and communicate with the UE according to the second configuration of the first symbol.

Some examples of the method, network entities, and non-transitory computer-readable medium described herein may further include operations, features, means, or instructions for transmitting a half-duplex symbol format indication that indicates an uplink format, a downlink format, or a flexible format, for each symbol of the set of symbols, where the first symbol has the downlink format in the half-duplex symbol format indication, and where the network full-duplex configuration updates the half-duplex symbol format indication for the set of symbols for full-duplex communications at the network entity, and the UE full-duplex configuration corresponds to the network full-duplex configuration for the subset of symbols for full-duplex communications at the UE. Some examples of the method, network entities, and non-transitory computer-readable medium described herein may further include operations, features, means, or instructions for updating the first symbol have the downlink format responsive to the indication that the first symbol has the second configuration, where both the network entity and the UE communicate using half-duplex communications for the first symbol. Some examples of the method, network entities, and non-transitory computer-readable medium described herein may further include operations, features, means, or instructions for updating the first symbol have the network full-duplex configuration indicated for the first symbol responsive to the indication that the first symbol has the second configuration, where the network entity communicates using full-duplex communications for the first symbol and the UE communicates using half-duplex communications for the first symbol according to the downlink format.

In some examples of the method, network entities, and non-transitory computer-readable medium described herein, the network full-duplex configuration is a sub-band full-duplex configuration in which at least a first sub-band of a component carrier bandwidth is configured for downlink communications and at least a second sub-band of the component carrier bandwidth is configured form uplink communications. In some examples of the method, network entities, and non-transitory computer-readable medium described herein, the UE full-duplex configuration is a sub-band full-duplex configuration in which at least a first sub-band of a component carrier bandwidth is configured for downlink communications and at least a second sub-band of the component carrier bandwidth or another component carrier is configured for uplink communications.

Some examples of the method, network entities, and non-transitory computer-readable medium described herein may further include operations, features, means, or instructions for receiving, from the UE, a UE capability message that indicates that the UE is capable to perform full-duplex communication at the UE, and that the UE is capable to update the UE full-duplex configuration for one or more symbols to fallback to the network full-duplex configuration or to a half-duplex symbol format configuration associated with the set of symbols.

Some examples of the method, network entities, and non-transitory computer-readable medium described herein may further include operations, features, means, or instructions for transmitting a half-duplex symbol format indication that indicates an uplink format, a downlink format, or a flexible format, for each symbol of the set of symbols, and where the network full-duplex configuration updates the half-duplex symbol format for the set of symbols for full-duplex communications at the network entity, and the UE full-duplex configuration corresponds to the network full-duplex configuration for the subset of symbols for full-duplex communications at the UE, and where the first symbol has the flexible format in the half-duplex symbol format indication and the first symbol has a downlink and uplink network full-duplex configuration.

Some examples of the method, network entities, and non-transitory computer-readable medium described herein may further include operations, features, means, or instructions for updating the first symbol have the downlink format responsive to the indication that the first symbol has the second configuration, where both the network entity and the UE communicate using half-duplex communications for the first symbol. Some examples of the method, network entities, and non-transitory computer-readable medium described herein may further include operations, features, means, or instructions for updating the first symbol have the flexible format responsive to the indication that the first symbol has the second configuration, where both the network entity and the UE communicate using half-duplex communications for the first symbol. Some examples of the method, network entities, and non-transitory computer-readable medium described herein may further include operations, features, means, or instructions for updating the first symbol have the network full-duplex configuration indicated for the first symbol responsive to the indication that the first symbol has the updated configuration, where the network entity communicates using full-duplex communications for the first symbol and the UE communicates using half-duplex communications for the first symbol according to the downlink format or the flexible format.

Some examples of the method, network entities, and non-transitory computer-readable medium described herein may further include operations, features, means, or instructions for receiving, from the UE, a UE capability message that indicates that the UE is capable to perform sub-band full-duplex communication at the UE, and that the UE is capable to update the UE full-duplex configuration for one or more symbols to fallback to the network full-duplex configuration, or to the downlink or flexible format half-duplex symbol format configuration associated with the set of symbols.

Some examples of the method, network entities, and non-transitory computer-readable medium described herein may further include operations, features, means, or instructions for transmitting, to the UE, a half-duplex symbol format indication that indicates an uplink format, a downlink format, or a flexible format, for each symbol of the set of symbols, where the network full-duplex configuration updates the half-duplex symbol format indication for the set of symbols for full-duplex communications at the network entity, and the UE full-duplex configuration corresponds to the network full-duplex configuration for the subset of symbols for full-duplex communications at the UE, and where the first symbol has the flexible format in the half-duplex symbol format indication and the first symbol has a flexible-and-uplink network full-duplex configuration.

Some examples of the method, network entities, and non-transitory computer-readable medium described herein may further include operations, features, means, or instructions for updating the first symbol have the flexible format responsive to the indication that the first symbol has the updated configuration, where both the network entity and the UE communicate using half-duplex communications for the first symbol. Some examples of the method, network entities, and non-transitory computer-readable medium described herein may further include operations, features, means, or instructions for updating the first symbol have a flexible-and-uplink sub-band full-duplex configuration responsive to the indication that the first symbol has the second configuration, where the flexible-and-uplink full-duplex configuration provides an uplink sub-band and one or more flexible sub-bands outside the uplink sub-band within at least one carrier bandwidth, and where the network entity communicates using full-duplex communications for the first symbol and the UE communicates using half-duplex communications for the first symbol according to the flexible format. Some examples of the method, network entities, and non-transitory computer-readable medium described herein may further include operations, features, means, or instructions for updating the first symbol have a downlink-and-uplink sub-band full-duplex configuration responsive to the indication that the first symbol has the second configuration, where the downlink-and-uplink sub-band full-duplex configuration provides an uplink sub-band and one or more downlink sub-bands within at least one carrier bandwidth, and where the network entity communicates using full-duplex communications for the first symbol and the UE communicates using half-duplex communications for the first symbol according to the downlink format. Some examples of the method, network entities, and non-transitory computer-readable medium described herein may further include operations, features, means, or instructions for updating the first symbol have the uplink format responsive to the indication that the first symbol has the second configuration, where both the network entity and the UE communicate using half-duplex communications for the first symbol. Some examples of the method, network entities, and non-transitory computer-readable medium described herein may further include operations, features, means, or instructions for updating the first symbol have the downlink format responsive to the indication that the first symbol has the second configuration, where both the network entity and the UE communicate using half-duplex communications for the first symbol.

Some examples of the method, network entities, and non-transitory computer-readable medium described herein may further include operations, features, means, or instructions for receiving, from the UE, a UE capability message that indicates that the UE is capable to perform sub-band full-duplex communication at the UE, and that the UE is capable to update the UE full-duplex configuration for one or more symbols to fallback to a network a downlink-and-uplink sub-band full-duplex configuration, to a network a flexible-and-uplink sub-band full-duplex configuration, or to the downlink, uplink, or flexible format half-duplex symbol format configuration associated with the set of symbols.

In some examples of the method, network entities, and non-transitory computer-readable medium described herein, the transmitting the indication may include operations, features, means, or instructions for transmitting a scheduling DCI communication that schedules downlink or uplink communications outside of a sub-band that is configured for downlink or uplink communications in the UE full-duplex configuration for at least the first symbol. In some examples of the method, network entities, and non-transitory computer-readable medium described herein, the transmitting the indication may include operations, features, means, or instructions for transmitting a non-scheduling DCI communication that indicates whether the first symbol is to be used for UE full-duplex communications or for UE half-duplex communications. In some examples of the method, network entities, and non-transitory computer-readable medium described herein, the transmitting the indication may include operations, features, means, or instructions for transmitting a MAC-CE that indicates whether the first symbol is to be used for UE full-duplex communications or for UE half-duplex communications.

In some examples of the method, network entities, and non-transitory computer-readable medium described herein, the transmitting the indication may include operations, features, means, or instructions for transmitting DCI that indicates that at least the first symbol has the second configuration, the DCI provided in a group common DCI communication, a DCI communication that schedules data, a DCI communication that does not schedule data, or a prespecified DCI communication associated with full-duplex communications. In some examples of the method, network entities, and non-transitory computer-readable medium described herein, the DCI indicates one or more symbols are updated or indicates the second configuration is valid until a subsequent updated configuration is provided.

In some examples of the method, network entities, and non-transitory computer-readable medium described herein, the transmitting the indication may include operations, features, means, or instructions for transmitting a MAC-CE that indicates that at least the first symbol has the second configuration, and that indicates one or more symbols that are updated or that the second configuration is valid until a subsequent updated configuration is provided. In some examples of the method, network entities, and non-transitory computer-readable medium described herein, the transmitting the indication may include operations, features, means, or instructions for transmitting a scheduling DCI communication that schedules a channel or reference signal transmission for one or more symbols, and where the indication that at least the first symbol has the second configuration is based on the channel or reference signal transmission that is scheduled.

In some examples of the method, network entities, and non-transitory computer-readable medium described herein, the indication that at least the first symbol of the subset of symbols has the second configuration provides one or more of a change to a periodic pattern of the UE full-duplex configuration for the subset of symbols, an updated semi-persistent UE full-duplex configuration for the subset of symbols, or the second configuration that is maintained until a subsequent update of the UE full-duplex configuration. In some examples of the method, network entities, and non-transitory computer-readable medium described herein, the indication includes one or more of a bitmap that indicates a pattern of symbols that have the UE full-duplex configuration, a predefined pattern identification that indicates the pattern of symbols that have the UE full-duplex configuration, or an offset and length of the subset of symbols that have the UE full-duplex configuration. In some examples of the method, network entities, and non-transitory computer-readable medium described herein, the indication that at least the first symbol of the subset of symbols has the second configuration provides the second configuration for a single occasion of the subset of symbols, or for multiple occasions of the subset of symbols.

In some examples of the method, network entities, and non-transitory computer-readable medium described herein, the indication provides an identification of one or more symbols associated with the single occasion with the second configuration, or provides a time window during which the multiple occasions of subset of symbols have the second configuration. In some examples of the method, network entities, and non-transitory computer-readable medium described herein, the first symbol is applied based on a time duration from a receipt of the indication, a time duration from transmission of an acknowledgment of the indication, a time duration indicated in configuration or control information signaling, or a time duration indicated in a reported UE capability. In some examples of the method, network entities, and non-transitory computer-readable medium described herein, the indication that at least the first symbol of the subset of symbols has the second configuration is applied to one CC, one or more CCs in a CC list, or in a different CC than a CC used to provide the indication.

BRIEF DESCRIPTION OF THE DRAWINGS

FIGS. 15 through 22 show flowcharts illustrating methods that support techniques for UE full-duplex operation in accordance with one or more aspects of the present disclosure.

DETAILED DESCRIPTION

Figure 1:
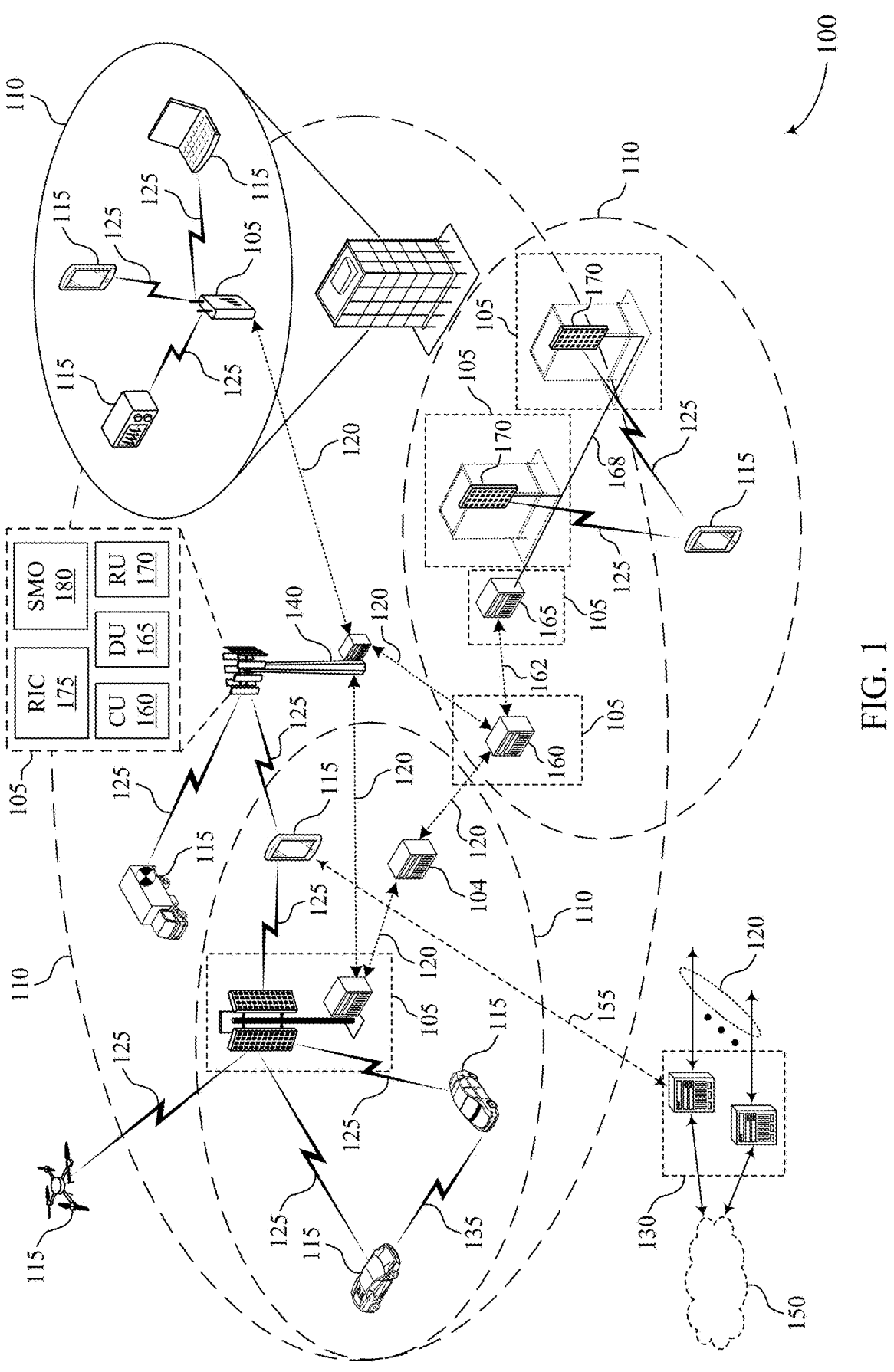
FIG. 1 shows an example of a wireless communications system that supports techniques for user equipment (UE) full-duplex operation in accordance with one or more aspects of the present disclosure.

In some systems, one or more devices, such as a network entity or a user equipment (UE), may operate in a full-duplex mode in which the one or more devices transmit signals and receive signals using a same set of wireless resources (e.g., a same set of time and frequency resources). When a device is operating in full-duplex mode, concurrent transmission and reception may result in self-interference where transmitted signals interfere with signals that are to be concurrently received, cross-link interference (CLI) from other transmitters, or both. Such interference may reduce the likelihood of successful reception and decoding of communications, and various techniques to mitigate such interference may be implemented in order to enhance reliability of communications (e.g., higher transmission power during periods of full-duplex operation, reduced coding rates or modulation orders, beam selection to avoid interfering beams, or any combinations thereof).

In some deployments, full-duplex communication techniques may provide for full-duplex communications at a network entity, and half-duplex communications at UEs. Thus, a network entity may transmit downlink communications to a first UE while receiving uplink communications from a second UE. In other deployments, one or more UEs, or both a UE and network entity, may operate using full-duplex communications. Further, some deployments may use sub-band full duplex (SBFD) in which a bandwidth part may be configured for full-duplex communications. In SBFD, the bandwidth part may be divided into downlink frequency resources and uplink frequency resources. For example, one or more frequency sub-bands may be for uplink communications and one or more other frequency sub-bands may be for downlink communications. In some cases, the uplink frequency sub-band(s) and the downlink frequency sub-band(s) may be non-overlapping, although techniques as discussed herein may be used in cases where downlink and uplink frequency sub-bands may be partially or fully overlapping.

As discussed, in some cases, interference may be present in full-duplex communications that may impact communications reliability. For example, clutter in a vicinity of a full-duplex device may result in reflections of transmitted signals that may interfere with reception of concurrent signals that are to be received at the full-duplex device, which may result in self-interference that may impact communications reliability. Further, in cases where a UE may use full-duplex communications to transmit and receive signals concurrently in a same frequency band, mobility of the UE may result in interference that changes more than interference that may be observed at a network entity (e.g., a radio head) that remains in a stationary position. Thus, in cases where a UE implements full-duplex operation, it may be beneficial in some circumstances for the UE to switch to half-duplex operation, such as if self-interference or cross-link interference is present at the UE due to mobility or environmental changes that causes a change in interference at the UE.

In accordance with various aspects discussed herein, efficient techniques for enabling UE full-duplex operation and fallback to half-duplex operation are provided that may enhance communications efficiency and reliability. In some aspects, both a UE and a network entity may be configured for full-duplex communications, in which communications are transmitted and received concurrently using a same frequency band. In some aspects, dynamic UE full-duplex operation is enabled by providing a network entity full-duplex configuration for a set of symbols (or slots, where descriptions related to symbols are equally applicable to slots), and a UE full-duplex configuration that indicates a UE full-duplex configuration for some or all of the symbols of the network entity full-duplex configuration. In some aspects, the UE full-duplex configuration may provide a corresponding full-duplex configuration to the network entity full-duplex configuration (e.g., a network entity sub-band full-duplex (SBFD) configuration of downlink/uplink/downlink (D/U/D) may corresponds to a UE SBFD configuration of D/U/D). In the event that the UE would benefit from a switch to half-duplex communications (e.g., due to self-interference presence at the UE), the network entity may transmit an indication to switch one or more symbols to a half-duplex configuration. In accordance with various aspects, different alternatives are provided for UE behavior when switching to half-duplex operation. For example, if a half-duplex symbol configuration (e.g., a half-duplex configuration provided in a time division duplexing (TDD) slot format indication that defines which symbols in a slot are uplink, downlink, or flexible symbols) indicates a symbol is a downlink (D) symbol, the UE may switch from the UE full-duplex configuration to a half-duplex downlink configuration for the symbol, and if the half-duplex configuration is a flexible symbol, the UE may switch to a flexible or downlink half-duplex configuration depending on the network entity full-duplex configuration. In some aspects, dynamic signaling may be provided to the UE to indicate the updated configuration for the one or more symbols, such as through downlink control information (DCI) (e.g., a scheduling or non-scheduling DCI), a medium access control (MAC) control element (CE), or any combinations thereof. The indication of the updated UE full-duplex symbols may be provided by a bitmap, a predefined pattern ID, an offset/length that identifies updated symbols, or any combinations thereof. Additionally, or alternatively, updates to the UE full-duplex symbol configuration may be started based on a receipt time of the indication, based on an acknowledgment time of an acknowledgment of the indication, based on radio resource control (RRC) configuration, based on a time indicated by a UE capability message, or any combinations thereof. In some aspects, a UE may be configured with two or more component carriers (CCs) that are configured for UE full-duplex communications, and updates to the UE full-duplex configuration may apply to one or more of the CCs.

Techniques as discussed herein may thus provide for enhanced resource utilization and communications efficiency related to full-duplex communications at a UE. Such techniques may help to enhance reliability of transmissions in full-duplex communications (e.g., to allow a UE to switch to half-duplex communications in the event of increased interference). Such techniques thus enhance network efficiency through reduced overhead, enhance reliability, enhance throughput, reduce power consumption (e.g., through reduced retransmissions), and provide for enhanced user experience.

Aspects of the disclosure are initially described in the context of wireless communications systems. Aspects of the disclosure are further illustrated by and described with reference to full-duplex and half-duplex operation modes and configurations, process flows, apparatus diagrams, system diagrams, and flowcharts that relate to techniques for UE full-duplex operation.

FIG. 1 shows an example of a wireless communications system 100 that supports techniques for UE full-duplex operation in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115)

within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support techniques for UE full-duplex operation as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing (Δf) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (STTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

In some cases, full-duplex communications may be configured at both a UE 115 and a serving network entity 105 in which the UE 115, the network entity 105, or both can dynamically change from full-duplex communications to half-duplex communications. In some aspects, UE full-duplex operation is enabled by providing a network entity full-duplex configuration for a set of symbols (or slots) and a UE full-duplex configuration that indicates a UE full-duplex configuration for some or all of the symbols of the set of symbols. For example, the UE full-duplex configuration may provide a corresponding full-duplex configuration to the network entity full-duplex configuration (e.g., a network entity configuration of D/U/D for SBFD communications corresponds to a UE configuration of D/U/D). In the event that the UE 115 would benefit from a switch to half-duplex communications (e.g., due to self-interference at the UE 115), the network entity 105 may transmit an indication to switch one or more symbols to a half-duplex configuration. In some aspects, the half-duplex configuration may correspond to an indicated half-duplex configuration in which both the network entity 105 and UE 115 operate in the half-duplex configuration. In other aspects, the half-duplex configuration may correspond to a full-duplex configuration of the network entity 105 in which the UE 115 operates in half-duplex and the network entity 105 operates in the full-duplex configuration.

Figure 2:
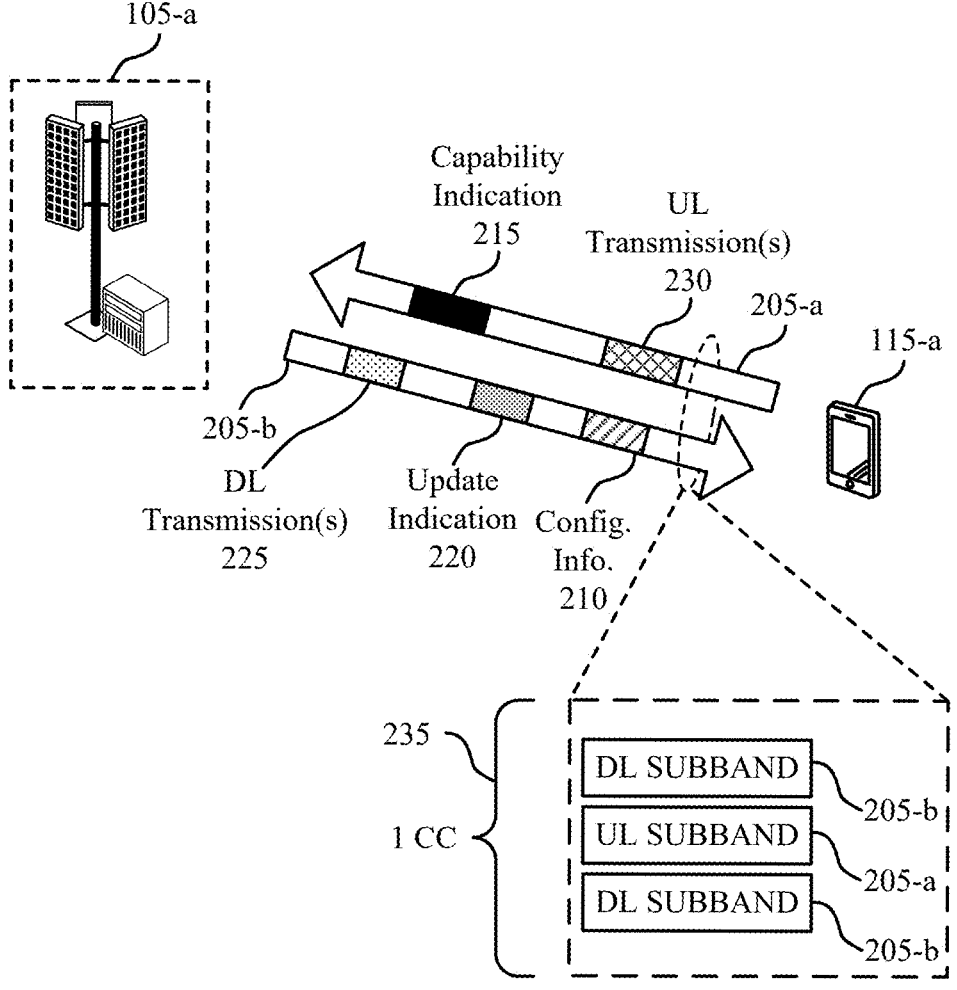
FIG. 2 shows an example of a wireless communications system that supports techniques for UE full-duplex operation in accordance with one or more aspects of the present disclosure.

FIG. 2 shows an example of a wireless communications system 200 that supports techniques for UE full-duplex operation in accordance with one or more aspects of the present disclosure. The wireless communications system 200 may include a network entity 105-*a*, and a UE 115-*a*, which may represent examples of a network entity 105 and UE 115 as described with reference to FIG. 1.

In this example, the UE 115-*a* may communicate with the network entity 105-*a* via downlink transmissions on one or more downlink sub-bands 205-*a* and uplink transmissions on one or more uplink sub-bands 205-*b* that may use a same component carrier using TDD, or that may use different carriers (e.g., using FDD). In the example of FIG. 2, the network entity 105-*a* and UE 115-*a*, for at least some communications, may operate in a full-duplex mode in which a first set of resources may be used for both uplink and downlink communications. For example, a downlink transmission to the UE 115-*a* may be transmitted contemporaneously with receipt of uplink transmissions from the UE 115-*a* (e.g., contemporaneous communications using a same frequency band).

As discussed herein, the full-duplex communications at the network entity 105-*a* and at the UE 115-*a* (e.g., SBFD or in-band full-duplex (IBFD)) may be performed in which a full-duplex configuration for one or more symbols may be switched to a half-duplex configuration at the UE 115-*a*, network entity 105-*a*, or both. In some aspects, the network entity 105-*a* may provide configuration information 210 to the UE 115-*a*. The configuration information 210 may provide a network full-duplex configuration and a UE full-duplex configuration. In some aspects, the configuration information 210 may provide for fallback at the UE 115-*a*, network entity 105-*a*, or both, to half-duplex operation, based on dynamic signaling that may update a configuration for one or more symbols. In some aspects, the UE full-duplex configuration information and related fallback behavior may be based on a capability indication 215 that is provided by the UE 115-*a*. In some aspects, the UE 115-*a* and network entity 105-*a* may communicate in accordance with their respective full-duplex configurations, in which downlink transmissions 225 may be transmitted concurrently with uplink transmissions 230 in accordance with the full-duplex configuration, such as a SBFD configuration in which a CC 235 may have two downlink sub-bands 205-*b* and one uplink sub-band 205-*a*. In accordance with various aspects discussed herein, an update indication 220 may be transmitted from the network entity 105-*a* to the UE 115-*a* that indicates a changed configuration for one or more symbols, and associated downlink transmissions 225 and uplink transmissions 230 may be communicated in accordance with the changed configuration. FIGS. 3 through 6 provide examples of full-duplex configurations and operation based on an update indication 220 for various aspects.

Figure 3:
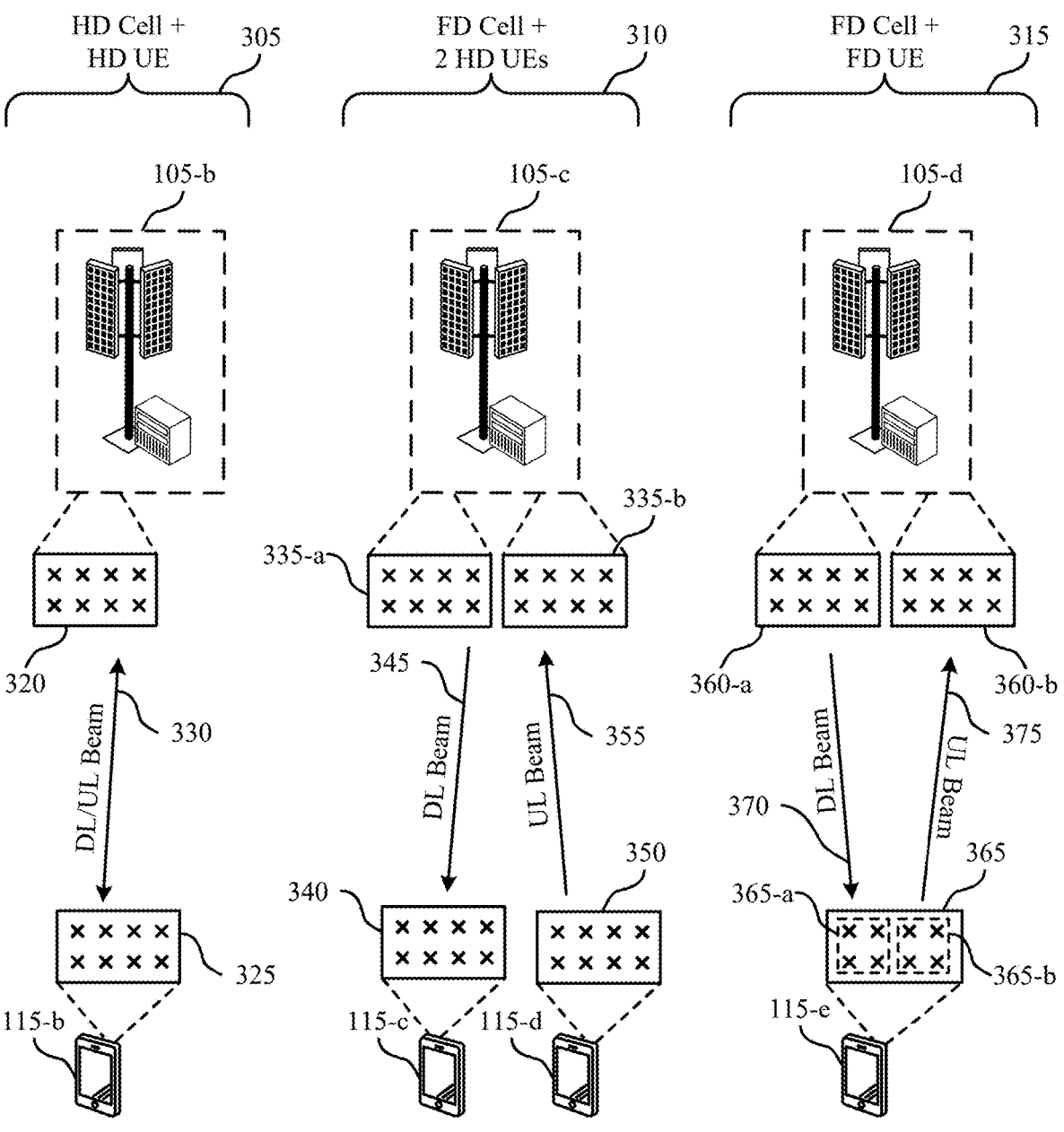
FIG. 3 shows an example of half-duplex and full-duplex operation modes that support techniques for UE full-duplex operation in accordance with one or more aspects of the present disclosure.

FIG. 3 shows examples of half-duplex and full-duplex operation modes 300 that support techniques for UE full-duplex operation in accordance with one or more aspects of the present disclosure. The half-duplex and full-duplex operation modes 300 may provide communications between network entities 105-*b*, 105-*c*, and 105-*d* and UEs 115-*b*, 115-*c*, 115-*d*, and 115-*e*, which may represent examples of network entities 105 and UEs 115 as described with reference to FIGS. 1 and 2.

In a first example 305, a half-duplex mode is illustrated in which both a network entity 105-*b* and a UE 115-*b* perform half-duplex communications using a downlink or uplink beam 330. In the first example 305, the network entity 105-*b* may use a first antenna panel 320 (or subset of antenna elements of an antenna panel), and the UE 115-*b* may use a UE antenna panel 325 for transmission or reception using the downlink or uplink beam 330. Such a half-duplex mode may use an entire bandwidth part for communications (e.g., an entire frequency bandwidth of a CC).

In a second example 310, a network entity 105-*c* may operate in a full-duplex mode to concurrently communicate with a first UE 115-*c* using downlink beam 345 and with a second UE 115-*d* using uplink beam 355. Each of the first UE 115-*c* and the second UE 115-*d* may operate in a half-duplex mode using a portion of a BWP that is configured for uplink or downlink communications in accordance with the full-duplex configuration of the network entity 105-*c*. For example, the network entity 105-*c* may operate in a SBFD mode in which a BWP has three sub-bands in a downlink/uplink/downlink (D/U/D) or flexible/uplink/flexible (F/U/F) configuration (e.g., which may be referred to as pattern 1). In other examples, the SBFD mode may have a BWP configured with two sub-bands in a downlink/uplink (D/U) or flexible/uplink (F/U) configuration (e.g., which may be referred to as pattern 2). In some cases, a guard band with a certain number of resource blocks (RBs) may be present between downlink and uplink sub-bands. While various examples discussed herein use SBFD, techniques provided herein are also applicable to IBFD, in which downlink and uplink bandwidths partially or fully overlap. In the second example 310, the network entity 105-*c* may use a first antenna panel 335-*a* (or a first subset of antenna elements of one or more antenna panels) for downlink communications to the first UE 115-*c*, and may use a second antenna panel 335-*b* (or a second subset of antenna elements of one or more antenna panels) for uplink communications from the second UE 115-*d*. In this example, each of the first UE 115-*c* and the second UE 115-*d* operate in a half-duplex mode, with the first UE 115-*c* using a first UE antenna panel 340 and the second UE 115-*d* using a second UE antenna panel 350.

In a third example 315, a network entity 105-*d* may operate in a full-duplex mode to concurrently communicate uplink and downlink communications with a full-duplex UE 115-*e*, using downlink beam 370 and uplink beam 375. In this third example 315, both the full-duplex UE 115-*e* and the network entity 105-*d* may operate in a SBFD mode, in which the network entity 105-*c* may use a first antenna panel 360-*a* (or a first subset of antenna elements of one or more antenna panels) for downlink communications to the full-duplex UE 115-*e*, and may use a second antenna panel 360-*b* (or a second subset of antenna elements of one or more antenna panels) for uplink communications from the full-duplex UE 115-*e*. In this example, the full-duplex UE 115-*e* may use a first subset of antenna elements 365-*a* for downlink communications and may use a second subset of antenna elements 365-*b* for uplink communications. In some cases, the different subsets of antenna elements 365-*a* and 365-*b* may be on a same antenna panel, or may be on different antenna panels, at the full-duplex UE 115-*e*.

Such full-duplex techniques may be implemented in a TDD carrier or may be intra-band carrier aggregation (CA) based, and may increase the uplink duty cycle. Such an increased uplink duty-cycle may lead to, for example, latency reduction (e.g., it is possible to transmit an uplink signal in an uplink subband of a symbol that would otherwise be downlink only or flexible, or to receive a downlink signal in downlink subband(s) in symbols that would otherwise be uplink only, which can reduce latency), uplink coverage improvements, enhanced system capacity, enhanced resource utilization, enhanced spectrum efficiency, enablement of flexible and dynamic uplink/downlink resource adaptation according to real-time uplink/downlink traffic, or any combinations thereof. In accordance with various aspects discussed herein, UE 115 and network entity 105 full-duplex communication technique may be dynamically changed based on current conditions at UEs 115, network entities 105, or both, which may further enhance the reliability and efficiency of communications when full-duplex communications are configured.

Figure 4:
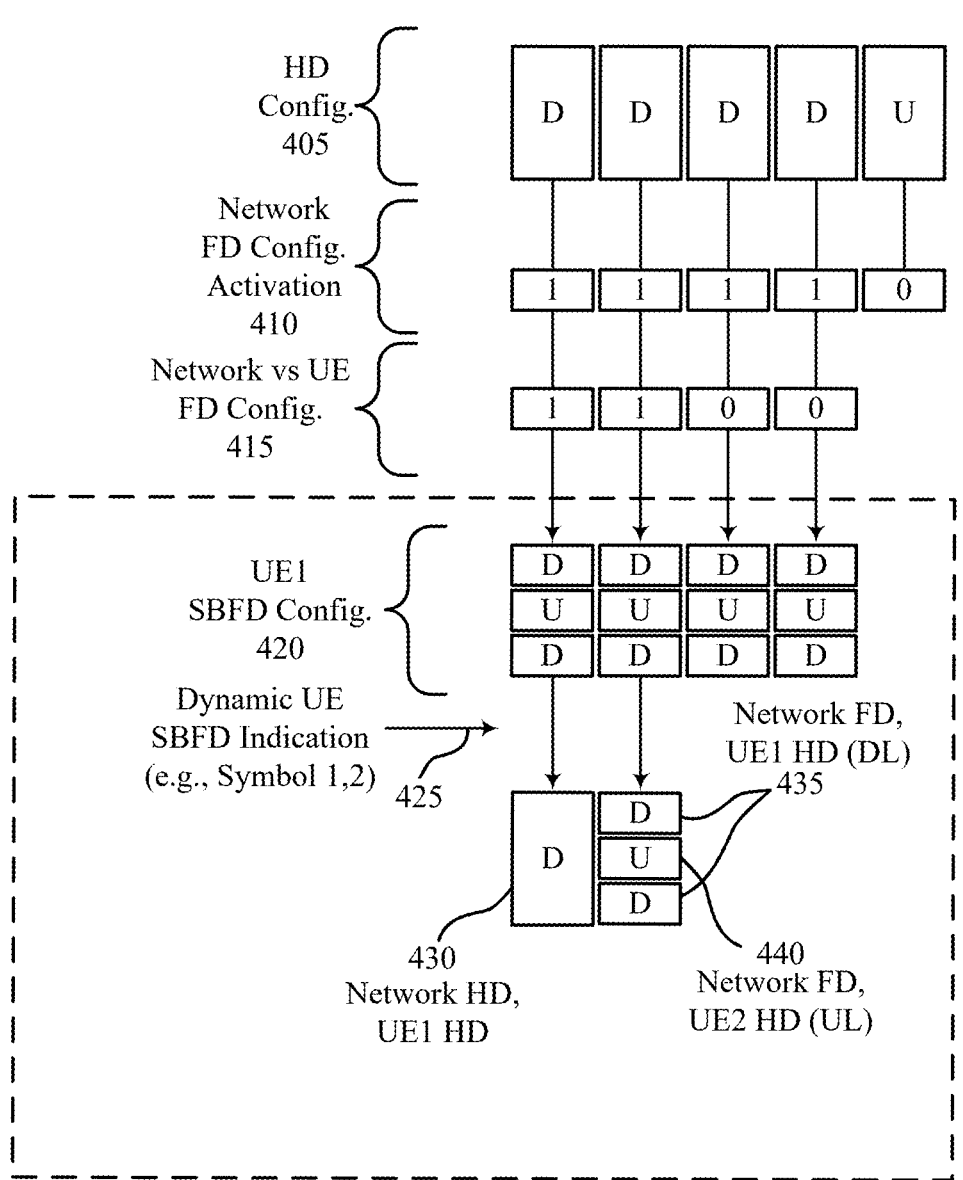
FIGS. 4 and 5 show examples of network and UE configurations that support techniques for UE full-duplex operation in accordance with one or more aspects of the present disclosure.

FIG. 4 shows an example of a network and UE configuration 400 that supports techniques for UE full-duplex operation in accordance with one or more aspects of the present disclosure. The example of FIG. 4 may be used for full-duplex communications between one or more UEs and a network entity, which may be examples of UEs 115 and network entities 105 as described with reference to FIGS. 1 through 3. In some examples, a network entity may transmit configuration information to one or more UEs that indicates full-duplex communications techniques are to be used.

Figure 5:
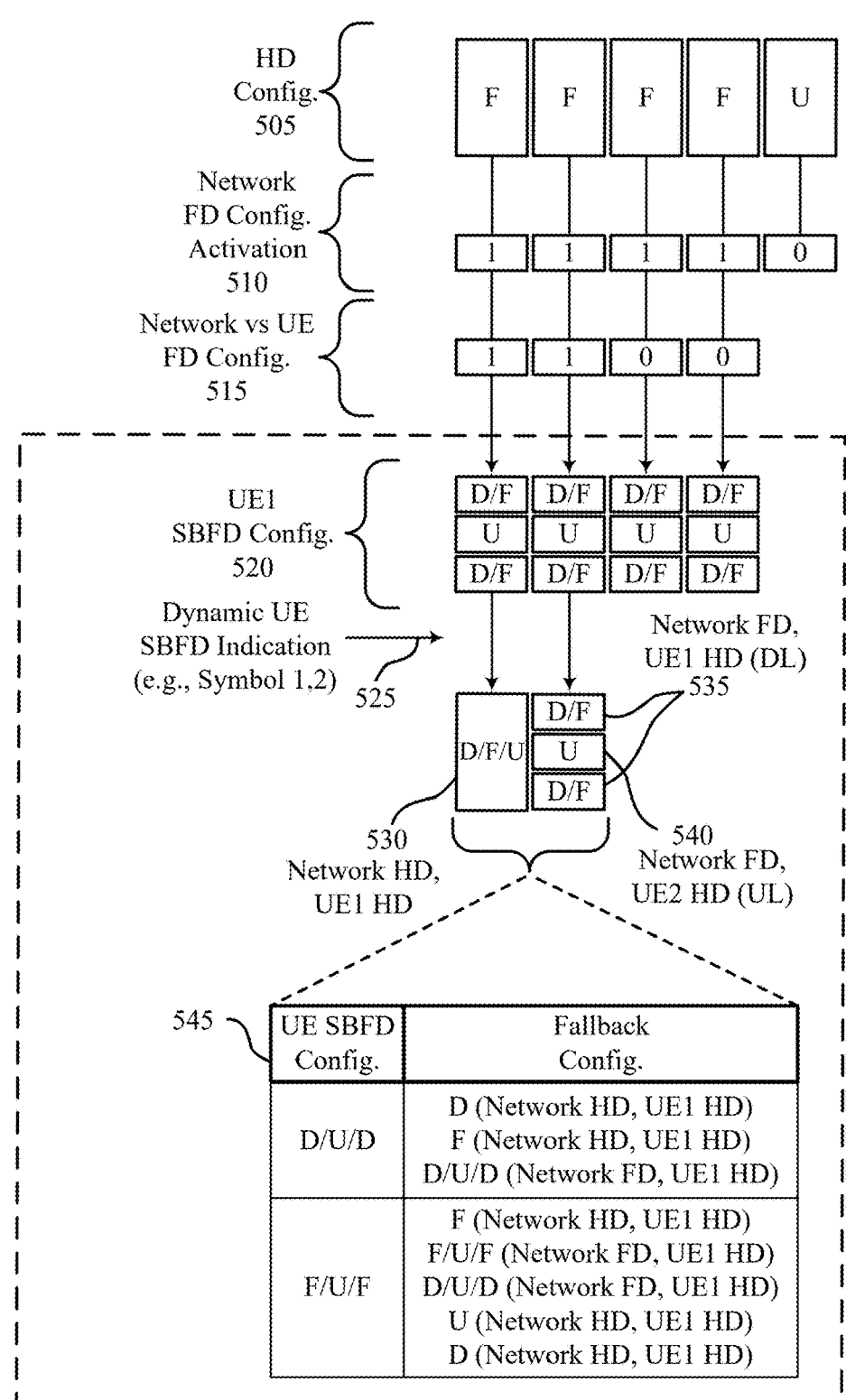

In the example of FIG. 4, a network entity may provide a half-duplex configuration 405 that indicates half-duplex format for a set of symbols. The half-duplex configuration 405 may provide a slot format index, for example, that is mapped to a D/U/F format for the set of symbols (e.g., a slot format indication as described in section 11.1.1 of 3GPP TS 38.213). The half-duplex configuration 405 may be referred to herein as a legacy half-duplex configuration. In the example of FIG. 4, the half-duplex configuration 405 for five symbols is illustrated, in which the first four symbols are configured as downlink symbols and the fifth symbol is configured as an uplink symbol. It is to be understood that the examples discussed in FIGS. 4 and 5 are provided for purposes of discussion and illustration, and that techniques as discussed herein may be used for numerous different combinations of uplink and downlink symbols, and numerous different combinations of SBFD of IBFD symbol formats. In some aspects, the network entity may provide a network full-duplex configuration (e.g., a SBFD configuration that indicates uplink and downlink sub-bands that are configured at the network entity for full-duplex communications. The network entity may activate the network full-duplex configuration in a network full-duplex configuration activation 410, which may indicate a set of symbols on which the network SBFD configuration is activated. In the example of FIG. 4, the network SBFD configuration is activated on the first four symbols.

In accordance with some aspects, the network entity may provide a network versus UE full-duplex configuration 415 to a served UE (e.g., a first UE) that may activate a first UE SBFD configuration 420 for one or more symbols of the set of symbols that are configured for network SBFD. In the example of FIG. 4, the first two symbols may be activated for UE SBFD communications by the network versus UE full-duplex configuration 415. In this example, the first UE SBFD configuration 420 may provide that the first UE performs full-duplex communications according to a D/U/D SBFD configuration, in which the first UE may concurrently transmit uplink communications using the uplink sub-band while receiving downlink communications using the downlink sub-bands. In some cases, the UE SBFD configuration may match the network SBFD configuration, such that a serving network entity may concurrently transmit and receive uplink and downlink communications with the first UE.

In accordance with various aspects, the network entity may transmit a dynamic UE SBFD indication 425 that indicates that the first UE is to switch away from the UE SBFD configuration and to a different configuration for one or more symbols. In some cases, the dynamic UE SBFD indication 425 may be transmitted by the network entity in response to a measurement report from the UE that indicates interference is present. In other cases, the network entity may transmit the dynamic UE SBFD indication 425 based on a pattern of NACKs that may be associated with certain symbols that are receiving interference (e.g., due to presence of periodic CLI). In the example of FIG. 4, the dynamic UE SBFD indication 425 may indicate that the UE is to fall back to half-duplex operation for the first two symbols in which the UE would otherwise use full-duplex in accordance with the network versus UE full-duplex configuration 415. In some cases, both the UE and the network entity may fallback to half-duplex communications, as illustrated at 430, in which the configuration of the legacy half-duplex configuration 405 is used for the associated symbol. In other cases, the network entity may continue to operate in accordance with the network full-duplex configuration, and the first UE may fallback to half-duplex communications to receive downlink communications on the downlink sub-bands of the network full-duplex configuration, as indicated at 435, where a second UE may operate in half-duplex and use the uplink sub-band of the network full-duplex configuration, as indicated at 440.

Techniques such as described herein may thus support dynamic UE SBFD operation to allow the UE to update the UE SBFD configuration to the legacy half-duplex configuration. Such techniques may provide that, for example, with conditional SBFD UE capability, UE may desire to fallback to half-duplex mode if UE leaked self-interference or clutter increases due to environmental change or mobility. Such dynamic SBFD also may provide for more efficient adaptation to uplink and downlink resource requirements based on traffic loads.

In some aspects, UE behavior may be different based on a configuration of a symbol (or slot). For example, if the UE SBFD symbol is configured on a legacy half-duplex configuration downlink symbol, the UE SBFD symbol may (1) fallback to a legacy D symbol, in which both the network entity and UE operate in half-duplex mode for the symbol, or (2) fallback to the network entity SBFD symbol format, in which the UE may operate in half-duplex mode and the network entity operate in SBFD mode. In some cases, the UE may transmit capability signaling that indicates whether the UE supports UE full-duplex operation, and which fallback behavior(s) the UE supports.

FIG. 5 shows another example of a network and UE configuration 500 that supports techniques for UE full-duplex operation in accordance with one or more aspects of the present disclosure. The example of FIG. 5 may be used for full-duplex communications between one or more UEs and a network entity, which may be examples of UEs 115 and network entities 105 as described with reference to FIGS. 1 through 3. In some examples, a network entity may transmit configuration information to one or more UEs that indicates full-duplex communications techniques are to be used.

In the example of FIG. 5, a network entity may provide a half-duplex configuration 505 that indicates half-duplex format for a set of symbols. The half-duplex configuration 505 may provide a slot format index, for example, that is mapped to a D/U/F format for the set of symbols, similarly as discussed with reference to FIG. 4. In the example of FIG.

5, the half-duplex configuration 505 for five symbols is illustrated, in which the first four symbols are configured as flexible symbols and the fifth symbol is configured as an uplink symbol. In some aspects, the network entity may provide a network full-duplex configuration (e.g., a SBFD configuration that indicates uplink and downlink sub-bands that are configured at the network entity for full-duplex communications. The network entity may activate the network full-duplex configuration in a network full-duplex configuration activation 510, which may indicate a set of symbols on which the network SBFD configuration is activated. In the example of FIG. 5, the network SBFD configuration is activated on the first four symbols.

In accordance with some aspects, the network entity may provide a network versus UE full-duplex configuration 515 to a served UE (e.g., a first UE) that may activate a first UE SBFD configuration 520 for one or more symbols of the set of symbols that are configured for network SBFD. In the example of FIG. 5, the first two symbols may be activated for UE SBFD communications by the network versus UE full-duplex configuration 515. In this example, the first UE SBFD configuration 520 may provide that the first UE performs full-duplex communications according to a F/U/F SBFD configuration or a D/U/D SBFD configuration, in which the first UE may concurrently transmit uplink communications using the uplink sub-band while communicating in accordance with the downlink or flexible format using the downlink or flexible sub-bands. In some cases, the UE SBFD configuration may match the network SBFD configuration, such that a serving network entity may concurrently transmit and receive uplink and downlink communications with the first UE.

Similarly as discussed with reference to FIG. 4, the network entity may transmit a dynamic UE SBFD indication 525 that indicates that the first UE is to switch away from the UE SBFD configuration and to a different configuration for one or more symbols. In the example of FIG. 5, the dynamic UE SBFD indication 525 may indicate that the UE is to fall back to half-duplex operation for the first two symbols in which the UE would otherwise use full-duplex in accordance with the network versus UE full-duplex configuration 515. In some cases, both the UE and the network entity may fallback to half-duplex communications, as illustrated at 530, in which the downlink or flexible configuration of the legacy half-duplex configuration 505 is used for the associated symbol. In other cases, the network entity may continue to operate in accordance with the network full-duplex configuration (e.g., D/U/D), and the first UE may fallback to half-duplex communications for the indicated symbols, as indicated at 535, where a second UE may operate in half-duplex and use the uplink sub-band of the network full-duplex configuration, as indicated at 540.

For example, if the UE SBFD symbol is configured on a legacy half-duplex flexible symbol, and D/U/D or D/U is configured for the network entity SBFD operation and the UE SBFD operation on the flexible symbol, the UE SBFD symbol may (1) fallback to a legacy D symbol, in which both the network entity and UE operate in half-duplex mode for the symbol; (2) fallback to a legacy F symbol, in which both the network entity and UE operate in half-duplex mode for the symbol; or (3) fallback to the network entity SBFD symbol format, in which the UE may operate in half-duplex mode and the network entity operate in SBFD mode. Table 545 in FIG. 5 illustrates these options. In some cases, the UE may transmit capability signaling that indicates whether the UE supports UE full-duplex operation, and which fallback behavior(s) the UE supports when the legacy half-duplex symbol has a flexible configuration.

In another example, if the UE SBFD symbol is configured on a legacy half-duplex flexible symbol, and F/U/F or F/U is configured for the network entity SBFD operation on the flexible symbol, the UE SBFD symbol may (1) fallback to a legacy F symbol, in which both the network entity and UE operate in half-duplex mode for the symbol; (2) fallback to the network entity SBFD symbol format (e.g., F/U/F), in which the UE may operate in half-duplex mode and the network entity operate in SBFD mode; (3) fallback to the network entity SBFD symbol format D/U/D, in which the UE may operate in half-duplex mode and the network entity operate in SBFD mode; (4) update to a legacy U symbol, in which both the network entity and UE operate in half-duplex mode for the symbol; or (5) update to a legacy D symbol, in which both the network entity and UE operate in half-duplex mode for the symbol. Table 545 in FIG. 5 illustrates these options. In some cases, the UE may transmit capability signaling that indicates whether the UE supports UE full-duplex operation, and which fallback behavior(s) the UE supports when the legacy half-duplex symbol has a flexible configuration and the network SBFD configuration is F/U/F or F/U.

In some aspects, the dynamic UE SBFD indication may be provided by signaling from the network entity. In some cases, the dynamic UE SBFD indication may be provided by a scheduling DCI which is used to schedule downlink receptions outside of a semi-statically configured SBFD downlink sub-band and/or uplink transmission outside semi-statically configured SBFD uplink subband. In some cases, the dynamic UE SBFD indication may be provided by a non-scheduling DCI which indicates whether a symbol is a SBFD symbol or not. Such a non-scheduling DCI may include DCI that does not schedule data or group common DCI (e.g., slot format indicator (SFI)). In some cases, the dynamic UE SBFD indication may be provided by a MAC-CE that indicates whether a symbol is SBFD symbol or not.

In some aspects, the signaling from the network entity may provide an explicit indication of symbols that are updated. Such an indication may be provided, for example via group common DCI (e.g., SFI). In other cases, the indication may be provided DCI that does not schedule data (e.g., that may have more bits available for the indication), via DCI that schedules data, or via DCI that is provided for indication of full-duplex updates. OR a new defined DCI. Such DCI indications may provide an update for one slot or multiple slots, or may provide updates that are valid until a subsequent update, which may be referred to as sticky updates. In other cases, additionally, or alternatively, the indication may be provided via a MAC-CE. In some cases, the MAC-CE may provide sticky updates that are valid until a subsequent MAC-CE provides a further update, or may provide that the updates are to be applied for an indicated time period where, the SBFD configuration or a default or preconfigured format is resumed after the time period.

In some aspects, the signaling from the network entity may provide an implied indication of symbols that are to be updated. In some cases, the updated symbols may be implied by a scheduled channel or reference signal (e.g., a dynamic scheduled PDSCH with an indication that scheduled symbols are to be updated). For example, a DCI scheduling data may include a one-bit indication that a common pattern indication for the scheduled channel or reference signal symbols are to be updated (e.g., fallback to half-duplex D). In some cases, such an indication may only apply to the scheduled slot, or the scheduled multiple slots if a single DCI schedules multiple PDSCH/PUSCH transmissions.

In some aspects, the update indication can change a periodic, semi-persistent, or sticky pattern of symbols. In some cases, the indication may provide a bitmap that carries a detailed pattern of bits. For example, such a bitmap can change the original configured semi-static UE SBFD pattern, where the bits in the bitmap correspond to semi-static UE SBFD symbols configured by network entity, which may to reduce overhead (e.g., each bit corresponds to a UE SBFD symbol where 0 indicates no change and 1 indicates fallback to D). In another example, such a bitmap may redefine a periodic pattern to, for example, add more UE SBFD symbols. In such a case, the bits in the bitmap may correspond to all symbols, not only the semi-static UE SBFD symbol configured by the network entity. In some cases, the indication may provide a predefined periodic pattern ID, where different pattern IDs are mapped to different patterns of symbols, such as discussed for the bitmap indication.

In a further example, the indication, for each cycle, may indicate an offset and a length of updated symbols (e.g., the offset may be relative to a receipt symbol of the indication, may be relative to a subset of symbols that are updated, or may be an absolute offset). In some aspects, the indication can change one or multiple occasions (e.g., updated occasions may be aperiodic). For example, the indication may indicate a time window for the updated symbols (e.g., the indication will apply after x ms from the indication DCI and last y slots), where a bitmap can be used in the window to indicate updated symbols (e.g., as discussed above), or where all slots in the window are updated to a certain configuration. Additionally, or alternatively, the indication may provide an offset and a length of updated symbols within the window. In some further aspects, the indication may be provided for an individual occasion location. For example, the indication DCI may be sent on slot n and indicate an offset value of 5 slots/symbols, meaning that on slot/symbol n+5, UE SBFD fallbacks to half-duplex slot/symbol.

In some aspects, the UE full-duplex symbol update application time may be determined for when an indicated update is to be applied for communications between the UE and the network entity. In some cases, the application time may be a specified fixed time from the receipt of the indication (e.g., N symbols or K ms from the receipt of the indication in DCI or MAC-CE). In other cases, the application time may be a specified could be fixed from an acknowledgment (ACK) of the indication (e.g., N symbols or K ms from the receipt of an acknowledgment of the DCI or MAC-CE). In some cases, for N symbols, the subcarrier spacing (SCS) of the symbols may depend on the SCS of the DCI or MAC-CE, the SCS of the ACK, or the applied downlink/uplink bandwidth part SCS. In further cases, the application time may be indicated by RRC or a scheduling DCI. In still other cases, the application time may be based on a UE capability indication (e.g., a filter retune time indication).

In some aspects, the UE full-duplex symbol initial semi-static indication or dynamic update indication may apply to one or more CCs. For example, an indicated pattern may apply to one CC, or may apply to multiple CCs with a CC list (e.g., each CC has a same UE SBFD configuration). In some cases, the CC list may include all activated CCs and deactivated CCs where the UE only applies the pattern to activated CCs, or the CC list may include only activated CCs. In other cases, CCs on the CC list may be explicitly indicated by the network entity. Further, the network entity may signal the indication via a primary or reference CC, but the indication may be for one or more secondary CCs.

Figure 6:
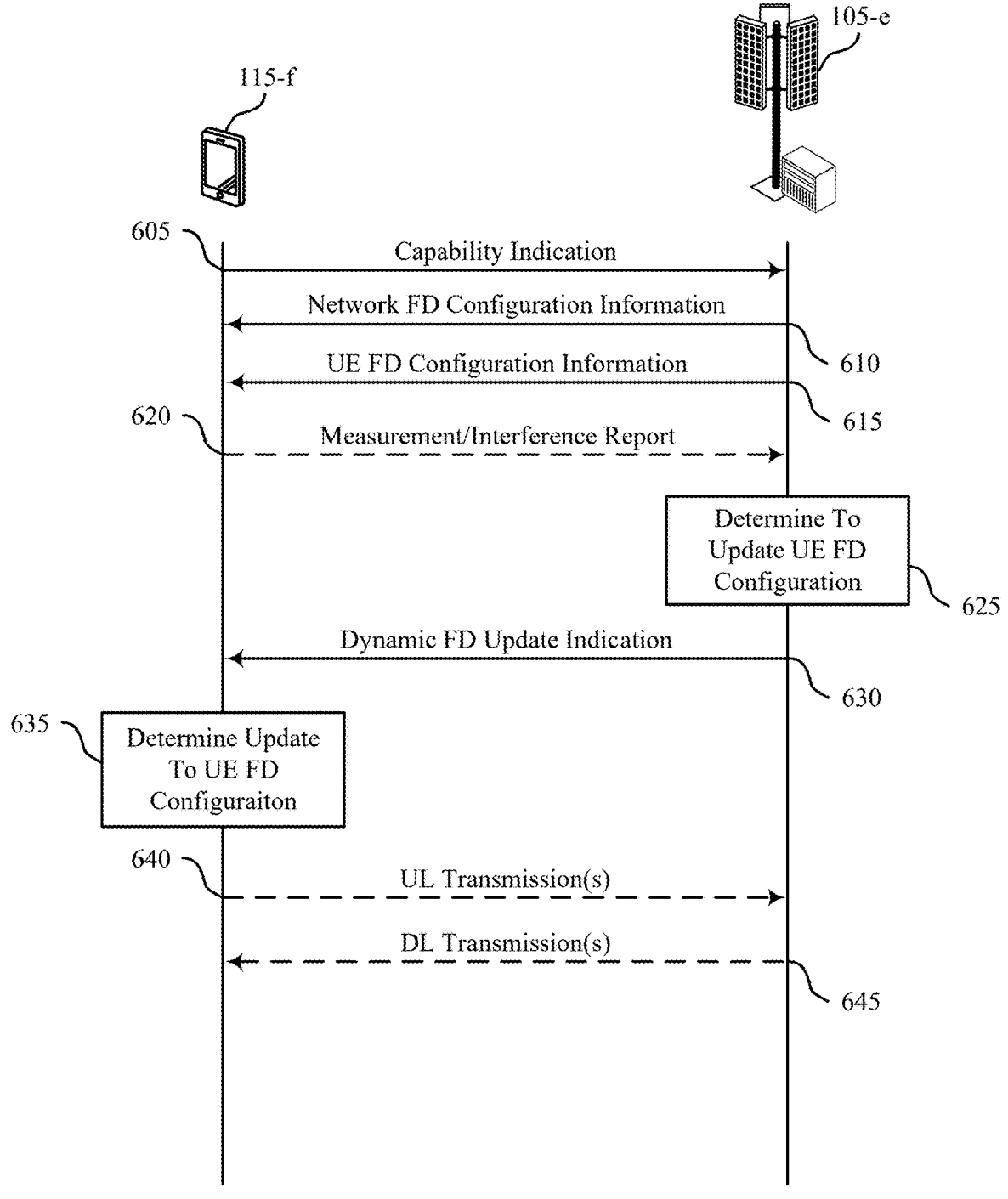
FIG. 6 shows an example of a process flow that supports techniques for UE full-duplex operation in accordance with one or more aspects of the present disclosure.

FIG. 6 shows an example of a process flow 600 that supports techniques for UE full-duplex operation in accordance with one or more aspects of the present disclosure. The process flow 600 may include various aspects of the present disclosure described with reference to FIGS. 1 through 5. For example, the process flow 600 may illustrate techniques for full-duplex communications between a UE 115-*f*, and a network entity 105-*e*, which may be examples of corresponding devices as described with reference to FIGS. 1 through 5. Alternative examples of the following may be implemented, where some steps are performed in a different order than described or are not performed at all. In some cases, a step may include additional features not mentioned below, or further steps may be added.

At 605, the UE 115-*f* may transmit, and the network entity 105-*e* may receive, a capability indication that indicates one or more UE 115-*f* capabilities. For example, the capability indication may provide UE capabilities to perform UE full-duplex communications, and associated fallback capabilities of the UE. Further, the capability indication may provide timing capabilities of the UE, such as an amount of time needed at the UE to implement changes to a full-duplex configuration.

At 610, the network entity 105-*e* may transmit, and the UE 115-*f* may receive, network full-duplex configuration information. In some cases, the network full-duplex configuration information may update a half-duplex configuration provided by a slot format indication, to provide that a set of symbols are configured for network full-duplex operation (e.g., for network entity SBFD communications in which the network entity transmits downlink communications on one or more downlink sub-bands contemporaneously with receipt of uplink communications on one or more uplink sub-bands).

At 615, the network entity 105-*e* may transmit, and the UE 115-*f* may receive, UE full-duplex configuration information. In some cases, the UE full-duplex configuration information may update the network full-duplex configuration, to provide that a subset of the set of symbols are configured for UE full-duplex communications (e.g., for UE SBFD communications in which the UE receives downlink communications on one or more downlink sub-bands contemporaneously with transmission of uplink communications on one or more uplink sub-bands).

Optionally, at 620, the UE 115-*f* may transmit, and the network entity 105-*e* may receive, a measurement or interference report. The measurement or interference report may, for example, indicate conditions at the UE 115-*f* that may be used to determine whether full-duplex communications at the UE can be reliably performed. In some cases, the UE 115-*f* may request that one or more symbols, or a pattern of symbols, be configured for half-duplex or full-duplex communications at the UE. At 625, the network entity 105-*e* may determine to update the UE full-duplex configuration. In some cases, the determination to update the UE full-duplex configuration may be based on channel conditions associated with the UE (e.g., as measured at the network entity, as reported by the UE, or both), based on traffic loads (e.g., an amount of downlink or uplink data to be communicated with the UE, or with one or more other UEs), based on a type of traffic (e.g., higher priority traffic may benefit from reduced latency of full-duplex communications), or any combinations thereof.

At 630, the network entity 105-*e* may transmit, and the UE 115-*f* may receive, a dynamic full-duplex update indi-cation. Such a full-duplex update indication may update one or more UE full-duplex symbols to a half-duplex configuration, in accordance with various aspects as discussed herein. At 635, the UE 115-*f* may determine to update the UE full-duplex configuration for one or more symbols based on the full-duplex update indication. Optionally, at 640, the UE 115-*f* may transmit, and the network entity 105-*e* may receive, one or more uplink transmissions in accordance with the updated full-duplex configuration. Optionally, at 645, the network entity 105-*e* may transmit, and the UE 115-*f* may receive, one or more downlink transmissions in accordance with the updated full-duplex configuration.

Figure 7:
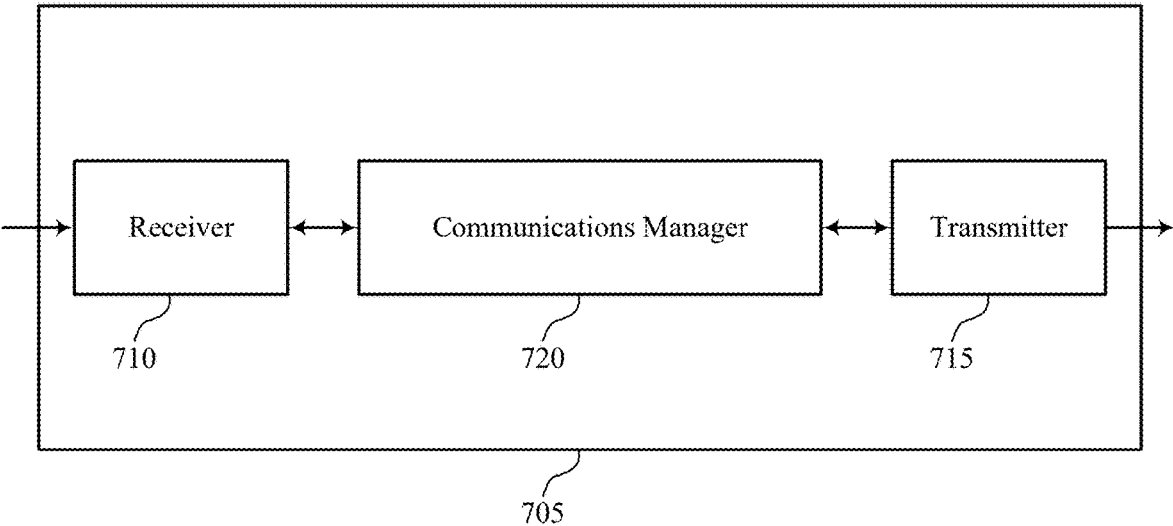
FIGS. 7 and 8 show block diagrams of devices that support techniques for UE full-duplex operation in accordance with one or more aspects of the present disclosure.

FIG. 7 shows a block diagram 700 of a device 705 that supports techniques for UE full-duplex operation in accordance with one or more aspects of the present disclosure. The device 705 may be an example of aspects of a UE 115 as described herein. The device 705 may include a receiver 710, a transmitter 715, and a communications manager 720. The device 705, or one or more components of the device 705 (e.g., the receiver 710, the transmitter 715, and the communications manager 720), may include at least one processor, which may be coupled with at least one memory, to, individually or collectively, support or enable the described techniques. Each of these components may be in communication with one another (e.g., via one or more buses).

The receiver 710 may provide a means for receiving information such as packets, user data, control information, or any combination thereof associated with various information channels (e.g., control channels, data channels, information channels related to techniques for UE full-duplex operation). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to techniques for UE full-duplex operation). In some examples, the transmitter 715 may be co-located with a receiver 710 in a transceiver module. The transmitter 715 may utilize a single antenna or a set of multiple antennas.

The communications manager 720, the receiver 710, the transmitter 715, or various combinations thereof or various components thereof may be examples of means for performing various aspects of techniques for UE full-duplex operation as described herein. For example, the communications manager 720, the receiver 710, the transmitter 715, or various combinations or components thereof may be capable of performing one or more of the functions described herein.

In some examples, the communications manager 720, the receiver 710, the transmitter 715, or various combinations or components thereof may be implemented in hardware (e.g., in communications management circuitry). The hardware may include at least one of a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 720, the receiver 710, the transmitter 715, or various combinations or components thereof may be implemented in code (e.g., as communications management software or firmware) executed by at least one processor. If implemented in code executed by at least one processor, the functions of the communications manager 720, the receiver 710, the transmitter 715, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 720 may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The communications manager 720 may support wireless communications in accordance with examples as disclosed herein. For example, the communications manager 720 is capable of, configured to, or operable to support a means for receiving a network full-duplex configuration that indicates a set of symbols are configured for full-duplex communication at a network entity. The communications manager 720 is capable of, configured to, or operable to support a means for receiving a UE full-duplex configuration that indicates at least a subset of the set of symbols have a first configuration for full-duplex communication at the UE, the subset of symbols including some or all of the set of symbols. The communications manager 720 is capable of, configured to, or operable to support a means for receiving an indication that at least a first symbol of the subset of symbols has a second configuration that is different from the first configuration for the first symbol. The communications manager 720 is capable of, configured to, or operable to support a means for communicating with the network entity according to the second configuration of the first symbol.

By including or configuring the communications manager 720 in accordance with examples as described herein, the device 705 (e.g., at least one processor controlling or otherwise coupled with the receiver 710, the transmitter 715, the communications manager 720, or a combination thereof) may support techniques for full-duplex communications that provide for enhanced resource utilization and communications efficiency, and updates to full-duplex configurations may help to enhance reliability of transmissions in full-duplex communications, enhance network efficiency through reduced overhead, enhance throughput, reduce power consumption, and provide for enhanced user experience.

Figure 8:
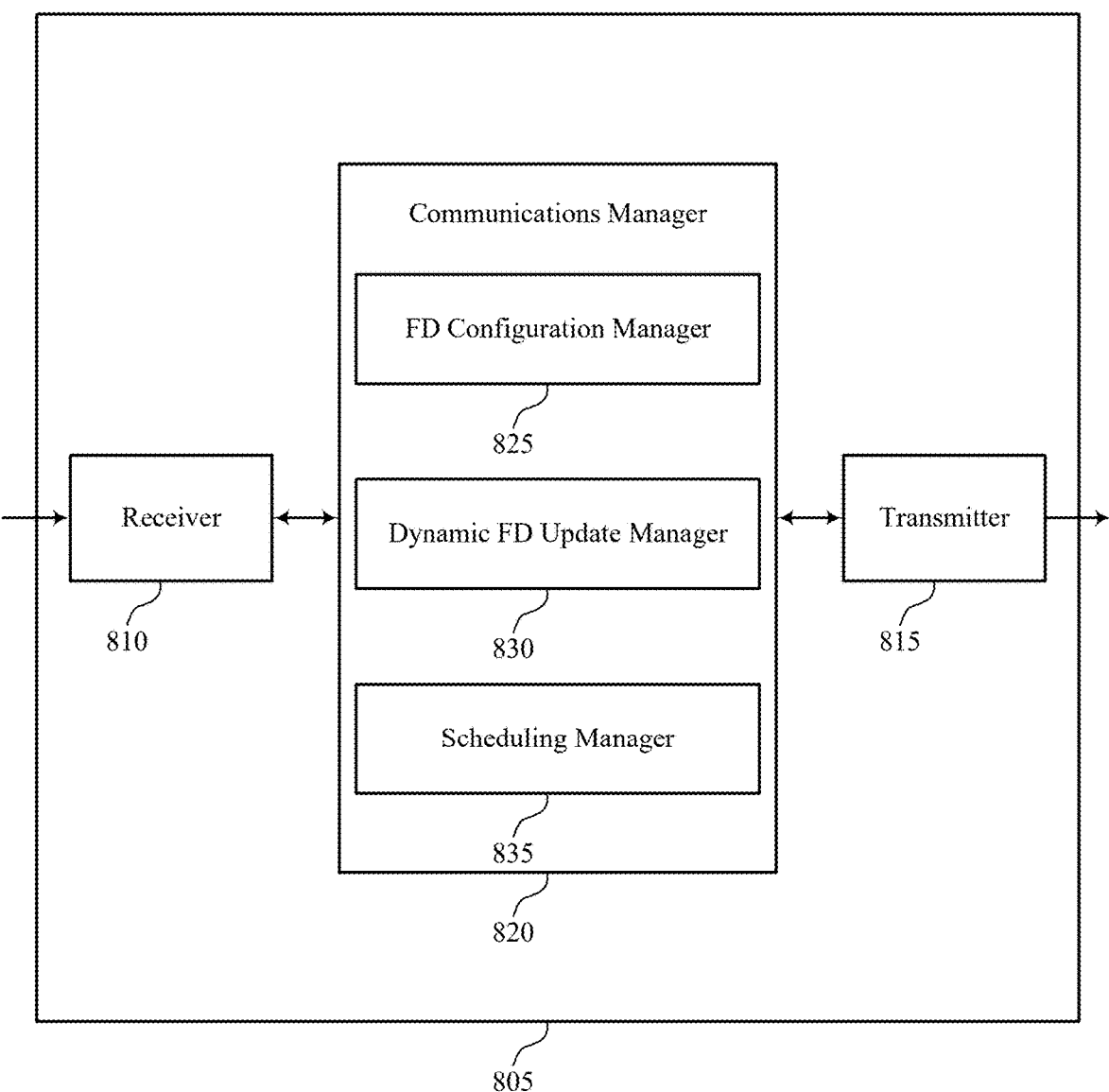

FIG. 8 shows a block diagram 800 of a device 805 that supports techniques for UE full-duplex operation in accordance with one or more aspects of the present disclosure. The device 805 may be an example of aspects of a device 705 or a UE 115 as described herein. The device 805 may include a receiver 810, a transmitter 815, and a communications manager 820. The device 805, or one or more components of the device 805 (e.g., the receiver 810, the transmitter 815, and the communications manager 820), may include at least one processor, which may be coupled with at least one memory, to support the described techniques. Each of these components may be in communication with one another (e.g., via one or more buses).

The receiver 810 may provide a means for receiving information such as packets, user data, control information, or any combination thereof associated with various information channels (e.g., control channels, data channels, information channels related to techniques for UE full-duplex operation). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to techniques for UE full-duplex operation). In some examples, the transmitter 815 may be co-located with a receiver 810 in a transceiver module. The transmitter 815 may utilize a single antenna or a set of multiple antennas.

The device 805, or various components thereof, may be an example of means for performing various aspects of techniques for UE full-duplex operation as described herein. For example, the communications manager 820 may include an FD configuration manager 825, a dynamic FD update manager 830, a scheduling manager 835, or any combination thereof. The communications manager 820 may be an example of aspects of a communications manager 720 as described herein. In some examples, the communications manager 820, or various components thereof, may be configured to perform various operations (e.g., receiving, obtaining, monitoring, outputting, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to obtain information, output information, or perform various other operations as described herein.

The communications manager 820 may support wireless communications in accordance with examples as disclosed herein. The FD configuration manager 825 is capable of, configured to, or operable to support a means for receiving a network full-duplex configuration that indicates a set of symbols are configured for full-duplex communication at a network entity. The FD configuration manager 825 is capable of, configured to, or operable to support a means for receiving a UE full-duplex configuration that indicates at least a subset of the set of symbols have a first configuration for full-duplex communication at the UE, the subset of symbols including some or all of the set of symbols. The dynamic FD update manager 830 is capable of, configured to, or operable to support a means for receiving an indication that at least a first symbol of the subset of symbols has a second configuration that is different from the first configuration for the first symbol. The scheduling manager 835 is capable of, configured to, or operable to support a means for communicating with the network entity according to the second configuration of the first symbol.

Figure 9:
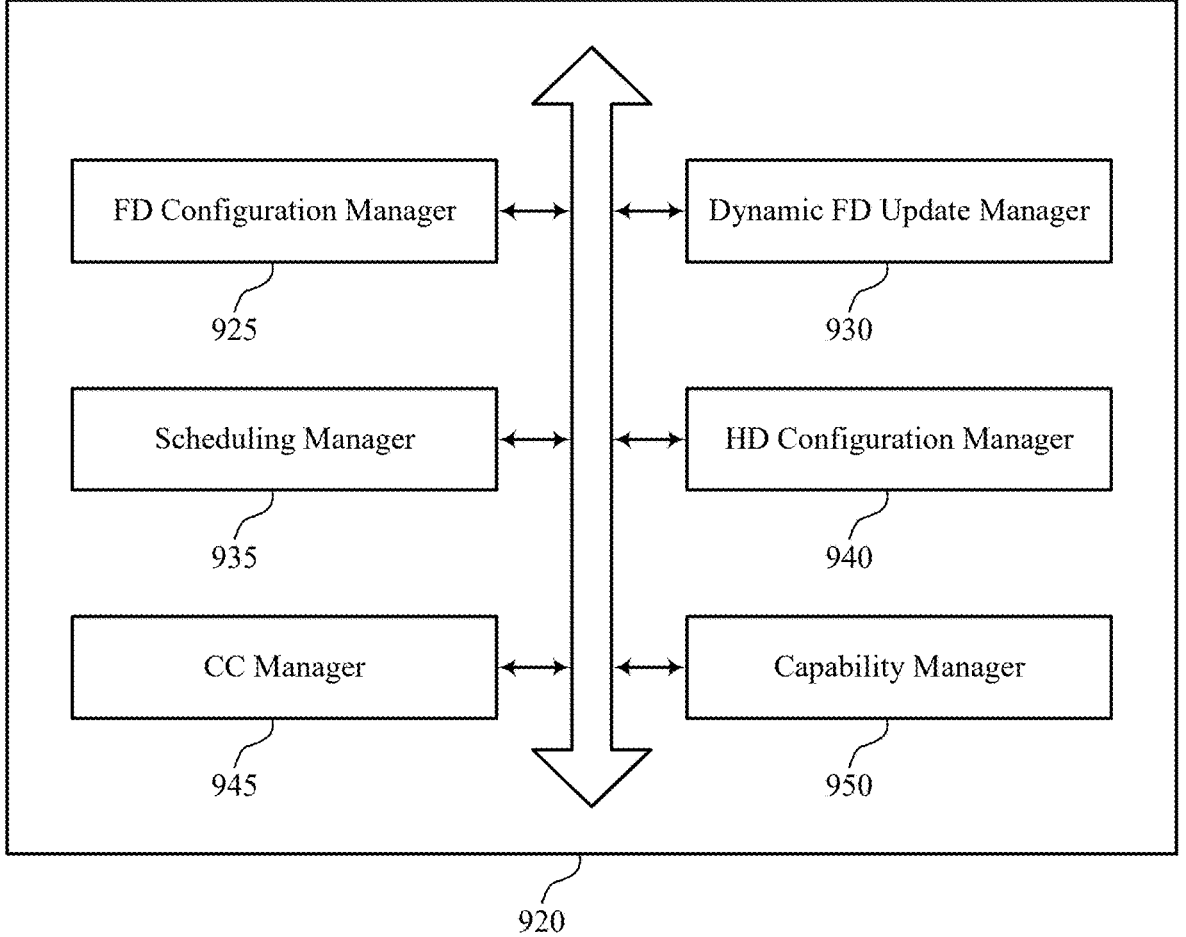
FIG. 9 shows a block diagram of a communications manager that supports techniques for UE full-duplex operation in accordance with one or more aspects of the present disclosure.

FIG. 9 shows a block diagram 900 of a communications manager 920 that supports techniques for UE full-duplex operation in accordance with one or more aspects of the present disclosure. The communications manager 920 may be an example of aspects of a communications manager 720, a communications manager 820, or both, as described herein. The communications manager 920, or various components thereof, may be an example of means for performing various aspects of techniques for UE full-duplex operation as described herein. For example, the communications manager 920 may include an FD configuration manager 925, a dynamic FD update manager 930, a scheduling manager 935, an HD configuration manager 940, a CC manager 945, a capability manager 950, or any combination thereof. Each of these components, or components or subcomponents thereof (e.g., one or more processors, one or more memories), may communicate, directly or indirectly, with one another (e.g., via one or more buses).

The communications manager 920 may support wireless communications in accordance with examples as disclosed herein. The FD configuration manager 925 is capable of, configured to, or operable to support a means for receiving a network full-duplex configuration that indicates a set of symbols are configured for full-duplex communication at a network entity. In some examples, the FD configuration manager 925 is capable of, configured to, or operable to support a means for receiving a UE full-duplex configuration that indicates at least a subset of the set of symbols have a first configuration for full-duplex communication at the UE, the subset of symbols including some or all of the set of symbols. The dynamic FD update manager 930 is capable of, configured to, or operable to support a means for receiving an indication that at least a first symbol of the subset of symbols has a second configuration that is different from the first configuration for the first symbol. The scheduling manager 935 is capable of, configured to, or operable to support a means for communicating with the network entity according to the second configuration of the first symbol.

In some examples, the HD configuration manager 940 is capable of, configured to, or operable to support a means for receiving a half-duplex symbol format indication that indicates an uplink format, a downlink format, or a flexible format, for each symbol of the set of symbols, where the first symbol has the downlink format in the half-duplex symbol format indication, and where the network full-duplex configuration updates the half-duplex symbol format indication for the set of symbols for full-duplex communications at the network entity, and the UE full-duplex configuration corresponds to the network full-duplex configuration for the subset of symbols for full-duplex communications at the UE.

In some examples, the dynamic FD update manager 930 is capable of, configured to, or operable to support a means for updating the first symbol to have the downlink format responsive to the indication that the first symbol has the second configuration, where both the network entity and the UE communicate using half-duplex communications for the first symbol. In some examples, the dynamic FD update manager 930 is capable of, configured to, or operable to support a means for updating the first symbol to have the network full-duplex configuration indicated for the first symbol responsive to the indication that the first symbol has the second configuration, where the network entity communicates using full-duplex communications for the first symbol and the UE communicates using half-duplex communications for the first symbol according to the network full-duplex configuration. In some examples, the network full-duplex configuration is a SBFD configuration in which at least a first sub-band of a component carrier bandwidth is configured for downlink communications and at least a second sub-band of the component carrier bandwidth or another component carrier is configured for uplink communications.

In some examples, the capability manager 950 is capable of, configured to, or operable to support a means for transmitting a UE capability message that indicates that the UE is capable to perform full-duplex communication at the UE, and that the UE is capable to update the UE full-duplex configuration for one or more symbols to fallback to the network full-duplex configuration or to a half-duplex symbol format configuration associated with the set of symbols.

In some examples, the HD configuration manager 940 is capable of, configured to, or operable to support a means for receiving a half-duplex symbol format indication that indicates an uplink format, a downlink format, or a flexible format, for each symbol of the set of symbols, where the first symbol has the flexible format in the half-duplex symbol format indication and the first symbol has a downlink-and-uplink network full-duplex configuration, and where the network full-duplex configuration updates the half-duplex symbol format for the set of symbols for full-duplex communications at the network entity, and the UE full-duplex configuration corresponds to the network full-duplex configuration for the subset of symbols for full-duplex communications at the UE.

In some examples, the dynamic FD update manager 930 is capable of, configured to, or operable to support a means for updating the first symbol to have the downlink format responsive to the indication that the first symbol has the second configuration, where both the network entity and the UE communicate using half-duplex communications for the first symbol. In some examples, the dynamic FD update manager 930 is capable of, configured to, or operable to support a means for updating the first symbol to have the flexible format responsive to the indication that the first symbol has the second configuration, where both the network entity and the UE communicate using half-duplex communications for the first symbol. In some examples, the dynamic FD update manager 930 is capable of, configured to, or operable to support a means for updating the first symbol to have the network full-duplex configuration indicated for the first symbol responsive to the indication that the first symbol has the second configuration, where the network entity communicates using full-duplex communications for the first symbol and the UE communicates using half-duplex communications for the first symbol according to the downlink format or the flexible format.

In some examples, the capability manager 950 is capable of, configured to, or operable to support a means for transmitting a UE capability message that indicates that the UE is capable to perform SBFD communication at the UE, and that the UE is capable to update the UE full-duplex configuration for one or more symbols to fallback to the network full-duplex configuration, or to the downlink or flexible format half-duplex symbol format configuration associated with the set of symbols.

In some examples, the HD configuration manager 940 is capable of, configured to, or operable to support a means for receiving a half-duplex symbol format indication that indicates an uplink format, a downlink format, or a flexible format, for each symbol of the set of symbols, where the first symbol has the flexible format in the half-duplex symbol format indication, and where the network full-duplex configuration updates the half-duplex symbol format indication for the set of symbols for SBFD communications at the network entity to provide that the first symbol has a flexibleand-uplink network SBFD configuration, and the UE full-duplex configuration corresponds to the network full-duplex configuration for the subset of symbols for SBFD communications at the UE.

In some examples, the dynamic FD update manager 930 is capable of, configured to, or operable to support a means for updating the first symbol to have the flexible format responsive to the indication that the first symbol has the second configuration, where both the network entity and the UE communicate using half-duplex communications for the first symbol. In some examples, the dynamic FD update manager 930 is capable of, configured to, or operable to support a means for updating the first symbol to have a flexible-and-uplink SBFD configuration responsive to the indication that the first symbol has the second configuration, where the flexible-and-uplink SBFD configuration provides an uplink sub-band and one or more flexible sub-bands outside the uplink sub-band within at least one carrier bandwidth, and where the network entity communicates using full-duplex communications for the first symbol and the UE communicates using half-duplex communications for the first symbol according to the flexible format. In some examples, the dynamic FD update manager 930 is capable of, configured to, or operable to support a means for updating the first symbol to have a downlink-and-uplink SBFD configuration responsive to the indication that the first symbol has the second configuration, where the downlink-and-uplink SBFD configuration provides an uplink sub-band and one or more downlink sub-bands within at least one carrier bandwidth, and where the network entity communicates using full-duplex communications for the first symbol and the UE communicates using half-duplex communications for the first symbol according to the downlink format.

In some examples, the dynamic FD update manager 930 is capable of, configured to, or operable to support a means for updating the first symbol to have the uplink format responsive to the indication that the first symbol has the second configuration, where both the network entity and the UE communicate using half-duplex communications for the first symbol. In some examples, the dynamic FD update manager 930 is capable of, configured to, or operable to support a means for updating the first symbol to have the downlink format responsive to the indication that the first symbol has the second configuration, where both the network entity and the UE communicate using half-duplex communications for the first symbol.

In some examples, the capability manager 950 is capable of, configured to, or operable to support a means for transmitting a UE capability message that indicates that the UE is capable to perform SBFD communication at the UE, and that the UE is capable to update the UE full-duplex configuration for one or more symbols to fallback to a network a downlink-and-uplink SBFD configuration, to a network a flexible-and-uplink SBFD configuration, or to the downlink, uplink, or flexible format half-duplex symbol format configuration associated with the set of symbols.

In some examples, to support receiving the indication, the dynamic FD update manager 930 is capable of, configured to, or operable to support a means for receiving a scheduling DCI communication that schedules downlink or uplink communications outside of a sub-band that is configured for downlink or uplink communications in the UE full-duplex configuration for at least the first symbol. In some examples, to support receiving the indication, the dynamic FD update manager 930 is capable of, configured to, or operable to support a means for receiving a non-scheduling DCI communication that indicates whether the first symbol is to be used for UE full-duplex communications or for UE half-duplex communications. In some examples, to support receiving the indication, the dynamic FD update manager 930 is capable of, configured to, or operable to support a means for receiving a MAC-CE that indicates whether the first symbol is to be used for UE full-duplex communications or for UE half-duplex communications.

In some examples, to support receiving the indication, the dynamic FD update manager 930 is capable of, configured to, or operable to support a means for receiving DCI that indicates that at least the first symbol has the second configuration, the DCI provided in a group common DCI communication, a DCI communication that schedules data, a DCI communication that does not schedule data, or a prespecified DCI communication associated with full-duplex communications. In some examples, the DCI indicates one or more symbols are updated or indicates the second configuration is valid until a subsequent updated configuration is provided. In some examples, to support receiving the indication, the dynamic FD update manager 930 is capable of, configured to, or operable to support a means for receiving a MAC-CE that indicates that at least the first symbol has the second configuration, and that indicates one or more symbols that are updated or that the second configuration is valid until a subsequent updated configuration is provided.

In some examples, to support receiving the indication, the dynamic FD update manager 930 is capable of, configured to, or operable to support a means for receiving a scheduling DCI communication that schedules a channel or reference signal transmission for one or more symbols, and where the indication that at least the first symbol has the second configuration is based on the channel or reference signal transmission that is scheduled. In some examples, the indication that at least the first symbol of the subset of symbols has the second configuration provides one or more of a change to a periodic pattern of the UE full-duplex configuration for the subset of symbols, an updated semi-persistent UE full-duplex configuration for the subset of symbols, or the second configuration that is maintained until a subsequent update of the UE full-duplex configuration. In some examples, the indication includes one or more of a bitmap that indicates a pattern of symbols that have the UE full-duplex configuration, a predefined pattern identification that indicates the pattern of symbols that have the UE full-duplex configuration, or an offset and length of the subset of symbols that have the UE full-duplex configuration.

In some examples, the indication that at least the first symbol of the subset of symbols has the second configuration provides the second configuration for a single occasion of the subset of symbols, or for multiple occasions of the subset of symbols. In some examples, the indication provides an identification of one or more symbols associated with the single occasion with the second configuration, or provides a time window during which the multiple occasions of subset of symbols have the second configuration. In some examples, the first symbol is applied based on a time duration from a receipt of the indication, a time duration from transmission of an acknowledgment of the indication, a time duration indicated in configuration or control information signaling, or a time duration indicated in a reported UE capability.

In some examples, the indication that at least the first symbol of the subset of symbols has the second configuration is applied to one component carrier (CC), one or more CCs in a CC list, or in a different CC than a CC used to provide the indication.

Figure 10:
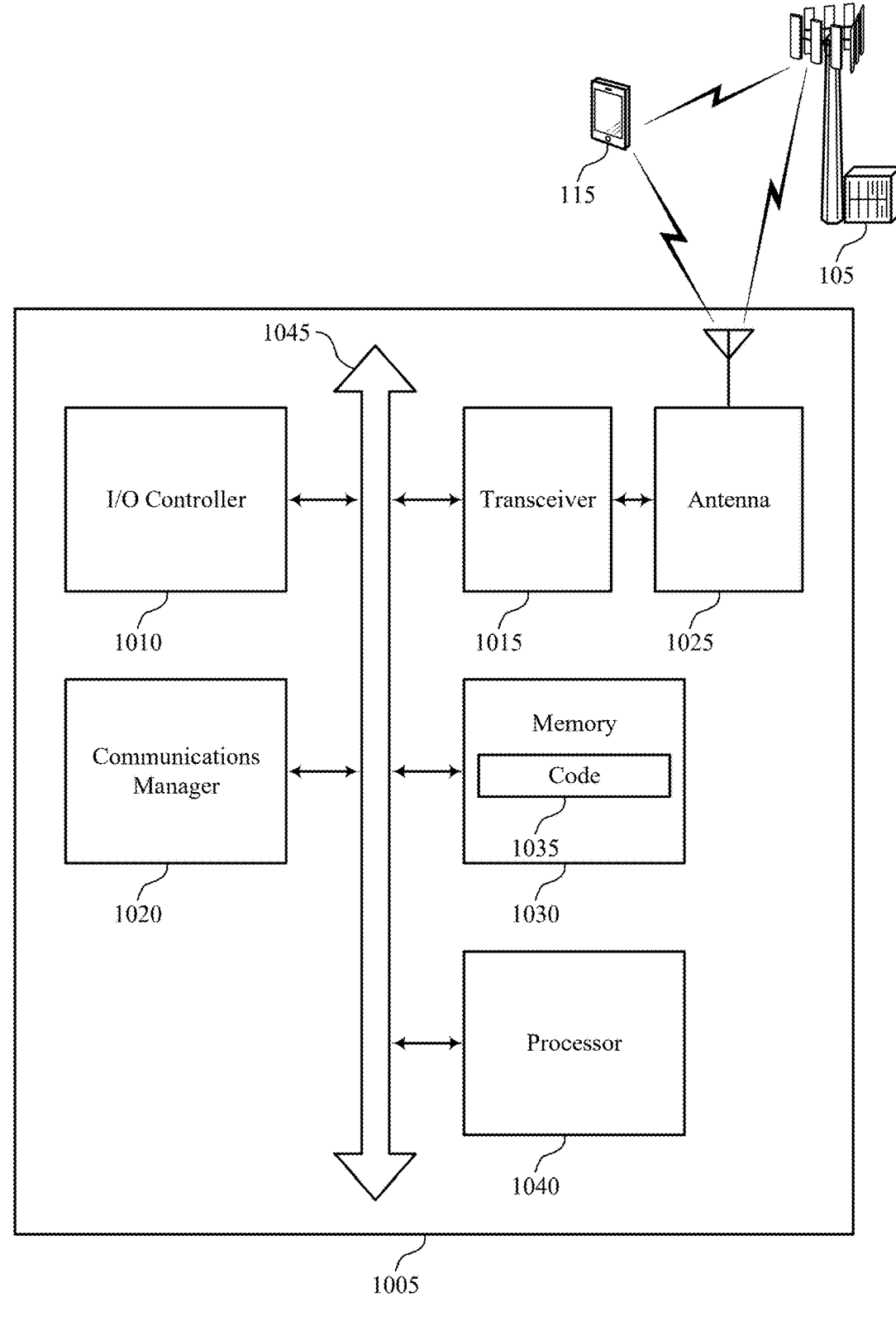
FIG. 10 shows a diagram of a system including a device that supports techniques for UE full-duplex operation in accordance with one or more aspects of the present disclosure.

FIG. 10 shows a diagram of a system 1000 including a device 1005 that supports techniques for UE full-duplex operation in accordance with one or more aspects of the present disclosure. The device 1005 may be an example of or include the components of a device 705, a device 805, or a UE 115 as described herein. The device 1005 may communicate (e.g., wirelessly) with one or more network entities 105, one or more UEs 115, or any combination thereof. The device 1005 may include components for bi-directional voice and data communications including components for transmitting and receiving communications, such as a communications manager 1020, an input/output (I/O) controller 1010, a transceiver 1015, an antenna 1025, at least one memory 1030, code 1035, and at least one processor 1040. These components may be in electronic communication or otherwise coupled (e.g., operatively, communicatively, functionally, electronically, electrically) via one or more buses (e.g., a bus 1045).

The I/O controller 1010 may manage input and output signals for the device 1005. The I/O controller 1010 may also manage peripherals not integrated into the device 1005. In some cases, the I/O controller 1010 may represent a physical connection or port to an external peripheral. In some cases, the I/O controller 1010 may utilize an operating system such as iOS®, ANDROID®, MS-DOS®, MS-WINDOWS®, OS/2®, UNIX®, LINUX®, or another known operating system. Additionally, or alternatively, the I/O controller 1010 may represent or interact with a modem, a keyboard, a mouse, a touchscreen, or a similar device. In some cases, the I/O controller 1010 may be implemented as part of one or more processors, such as the at least one processor 1040. In some cases, a user may interact with the device 1005 via the I/O controller 1010 or via hardware components controlled by the I/O controller 1010.

In some cases, the device 1005 may include a single antenna 1025. However, in some other cases, the device 1005 may have more than one antenna 1025, which may be capable of concurrently transmitting or receiving multiple wireless transmissions. The transceiver 1015 may communicate bi-directionally, via the one or more antennas 1025, wired, or wireless links as described herein. For example, the transceiver 1015 may represent a wireless transceiver and may communicate bi-directionally with another wireless transceiver. The transceiver 1015 may also include a modem to modulate the packets, to provide the modulated packets to one or more antennas 1025 for transmission, and to demodulate packets received from the one or more antennas 1025. The transceiver 1015, or the transceiver 1015 and one or more antennas 1025, may be an example of a transmitter 715, a transmitter 815, a receiver 710, a receiver 810, or any combination thereof or component thereof, as described herein.

The at least one memory 1030 may include random access memory (RAM) and read-only memory (ROM). The at least one memory 1030 may store computer-readable, computer-executable code 1035 including instructions that, when executed by the at least one processor 1040, cause the device 1005 to perform various functions described herein. The code 1035 may be stored in a non-transitory computer-readable medium such as system memory or another type of memory. In some cases, the code 1035 may not be directly executable by the at least one processor 1040 but may cause a computer (e.g., when compiled and executed) to perform functions described herein. In some cases, the at least one memory 1030 may contain, among other things, a basic I/O system (BIOS) which may control basic hardware or software operation such as the interaction with peripheral components or devices.

The at least one processor 1040 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the at least one processor 1040 may be configured to operate a memory array using a memory controller. In some other cases, a memory controller may be integrated into the at least one processor 1040. The at least one processor 1040 may be configured to execute computer-readable instructions stored in a memory (e.g., the at least one memory 1030) to cause the device 1005 to perform various functions (e.g., functions or tasks supporting techniques for UE full-duplex operation). For example, the device 1005 or a component of the device 1005 may include at least one processor 1040 and at least one memory 1030 coupled with or to the at least one processor 1040, the at least one processor 1040 and at least one memory 1030 configured to perform various functions described herein. In some examples, the at least one processor 1040 may include multiple processors and the at least one memory 1030 may include multiple memories. One or more of the multiple processors may be coupled with one or more of the multiple memories, which may, individually or collectively, be configured to perform various functions herein. In some examples, the at least one processor 1040 may be a component of a processing system, which may refer to a system (such as a series) of machines, circuitry (including, for example, one or both of processor circuitry (which may include the at least one processor 1040) and memory circuitry (which may include the at least one memory 1030)), or components, that receives or obtains inputs and processes the inputs to produce, generate, or obtain a set of outputs. The processing system may be configured to perform one or more of the functions described herein. As such, the at least one processor 1040 or a processing system including the at least one processor 1040 may be configured to, configurable to, or operable to cause the device 1005 to perform one or more of the functions described herein. Further, as described herein, being "configured to," being "configurable to," and being "operable to" may be used interchangeably and may be associated with a capability, when executing code stored in the at least one memory 1030 or otherwise, to perform one or more of the functions described herein.

The communications manager 1020 may support wireless communications in accordance with examples as disclosed herein. For example, the communications manager 1020 is capable of, configured to, or operable to support a means for receiving a network full-duplex configuration that indicates a set of symbols are configured for full-duplex communication at a network entity. The communications manager 1020 is capable of, configured to, or operable to support a means for receiving a UE full-duplex configuration that indicates at least a subset of the set of symbols have a first configuration for full-duplex communication at the UE, the subset of symbols including some or all of the set of symbols. The communications manager 1020 is capable of, configured to, or operable to support a means for receiving an indication that at least a first symbol of the subset of symbols has a second configuration that is different from the first configuration for the first symbol. The communications manager 1020 is capable of, configured to, or operable to support a means for communicating with the network entity according to the second configuration of the first symbol.

By including or configuring the communications manager 1020 in accordance with examples as described herein, the device 1005 may support techniques for full-duplex communications that provide for enhanced resource utilization and communications efficiency, and updates to full-duplex configurations may help to enhance reliability of transmissions in full-duplex communications, enhance network efficiency through reduced overhead, enhance throughput, reduce power consumption, and provide for enhanced user experience.

In some examples, the communications manager 1020 may be configured to perform various operations (e.g., receiving, monitoring, transmitting) using or otherwise in cooperation with the transceiver 1015, the one or more antennas 1025, or any combination thereof. Although the communications manager 1020 is illustrated as a separate component, in some examples, one or more functions described with reference to the communications manager 1020 may be supported by or performed by the at least one processor 1040, the at least one memory 1030, the code 1035, or any combination thereof. For example, the code 1035 may include instructions executable by the at least one processor 1040 to cause the device 1005 to perform various aspects of techniques for UE full-duplex operation as described herein, or the at least one processor 1040 and the at least one memory 1030 may be otherwise configured to, individually or collectively, perform or support such operations.

Figure 11:
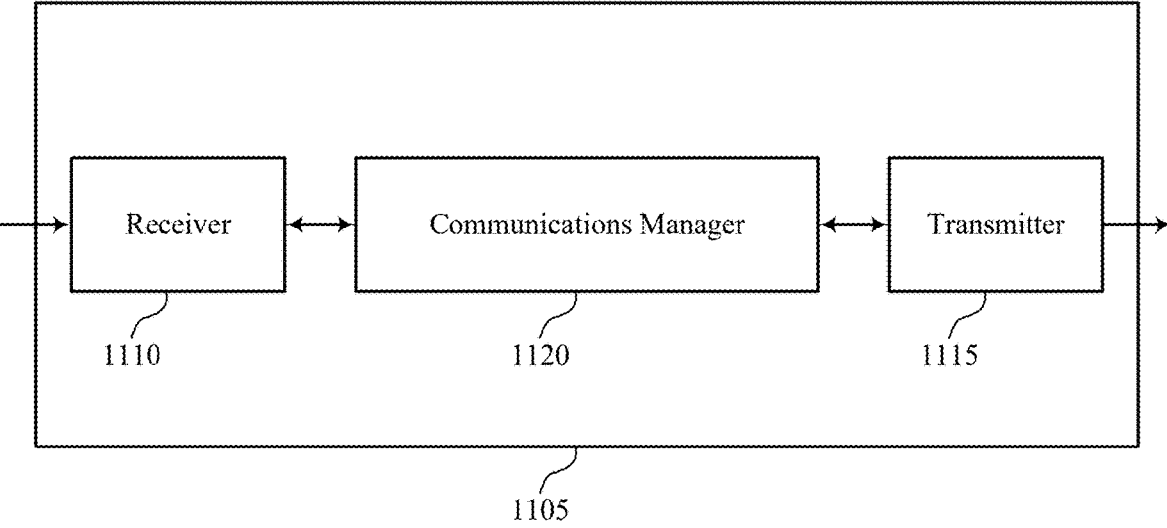
FIGS. 11 and 12 show block diagrams of devices that support techniques for UE full-duplex operation in accordance with one or more aspects of the present disclosure.

FIG. 11 shows a block diagram 1100 of a device 1105 that supports techniques for UE full-duplex operation in accordance with one or more aspects of the present disclosure. The device 1105 may be an example of aspects of a network entity 105 as described herein. The device 1105 may include a receiver 1110, a transmitter 1115, and a communications manager 1120. The device 1105, or one or more components of the device 1105 (e.g., the receiver 1110, the transmitter 1115, and the communications manager 1120), may include at least one processor, which may be coupled with at least one memory, to, individually or collectively, support or enable the described techniques. Each of these components may be in communication with one another (e.g., via one or more buses).

The receiver 1110 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1105. In some examples, the receiver 1110 may support obtaining information by receiving signals via one or more antennas. Additionally, or alternatively, the receiver 1110 may support obtaining information by receiving signals via one or more wired (e.g., electrical, fiber optic) interfaces, wireless interfaces, or any combination thereof.

The transmitter 1115 may provide a means for outputting (e.g., transmitting, providing, conveying, sending) information generated by other components of the device 1105. For example, the transmitter 1115 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1115 may support outputting information by transmitting signals via one or more antennas. Additionally, or alternatively, the transmitter 1115 may support outputting information by transmitting signals via one or more wired (e.g., electrical, fiber optic) interfaces, wireless interfaces, or any combination thereof. In some examples, the transmitter 1115 and the receiver 1110 may be co-located in a transceiver, which may include or be coupled with a modem.

The communications manager 1120, the receiver 1110, the transmitter 1115, or various combinations thereof or various components thereof may be examples of means for performing various aspects of techniques for UE full-duplex operation as described herein. For example, the communications manager 1120, the receiver 1110, the transmitter 1115, or various combinations or components thereof may be capable of performing one or more of the functions described herein.

In some examples, the communications manager 1120, the receiver 1110, the transmitter 1115, or various combinations or components thereof may be implemented in hardware (e.g., in communications management circuitry). The hardware may include at least one of a processor, a DSP, a CPU, an ASIC, an FPGA or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 1120, the receiver 1110, the transmitter 1115, or various combinations or components thereof may be implemented in code (e.g., as communications management software or firmware) executed by at least one processor. If implemented in code executed by at least one processor, the functions of the communications manager 1120, the receiver 1110, the transmitter 1115, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 1120 may be configured to perform various operations (e.g., receiving, obtaining, monitoring, outputting, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to obtain information, output information, or perform various other operations as described herein.

The communications manager 1120 may support wireless communications in accordance with examples as disclosed herein. For example, the communications manager 1120 is capable of, configured to, or operable to support a means for transmitting, to a UE, a network full-duplex configuration that indicates a set of symbols are configured for full-duplex communication at the network entity. The communications manager 1120 is capable of, configured to, or operable to support a means for transmitting, to the UE, a UE full-duplex configuration that indicates at least a subset of the set of symbols have a first configuration for full-duplex communication at the UE, the subset of symbols including some or all of the set of symbols. The communications manager

1120 is capable of, configured to, or operable to support a means for transmitting, to the UE, an indication that at least a first symbol of the subset of symbols has a second configuration that is different from the first configuration for the first symbol. The communications manager 1120 is capable of, configured to, or operable to support a means for communicating with the UE according to the second configuration of the first symbol.

By including or configuring the communications manager 1120 in accordance with examples as described herein, the device 1105 (e.g., at least one processor controlling or otherwise coupled with the receiver 1110, the transmitter 1115, the communications manager 1120, or a combination thereof) may support techniques for full-duplex communications that provide for enhanced resource utilization and communications efficiency, and updates to full-duplex configurations may help to enhance reliability of transmissions in full-duplex communications, enhance network efficiency through reduced overhead, enhance throughput, reduce power consumption, and provide for enhanced user experience.

Figure 12:
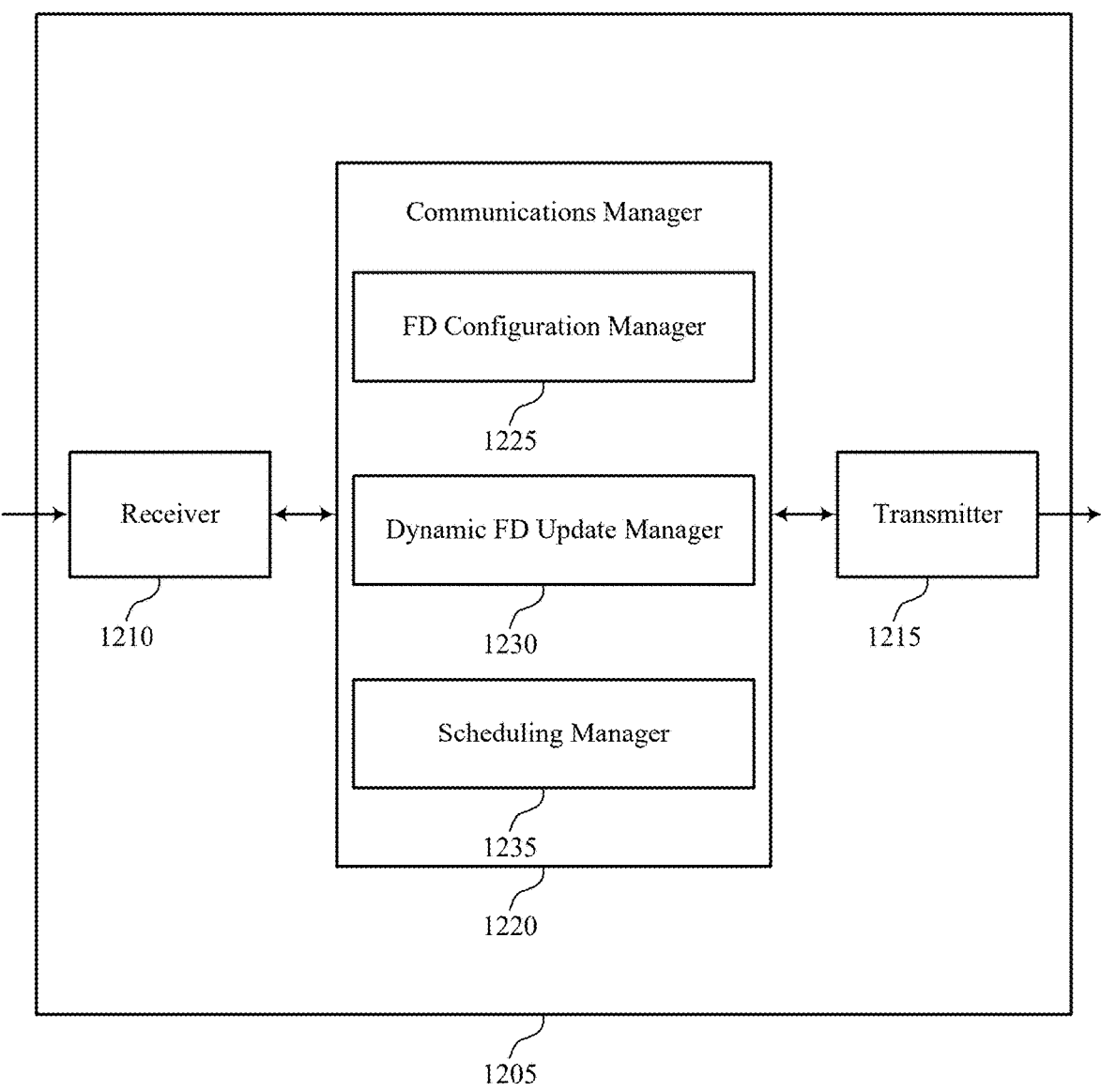

FIG. 12 shows a block diagram 1200 of a device 1205 that supports techniques for UE full-duplex operation in accordance with one or more aspects of the present disclosure. The device 1205 may be an example of aspects of a device 1105 or a network entity 105 as described herein. The device 1205 may include a receiver 1210, a transmitter 1215, and a communications manager 1220. The device 1205, or one or more components of the device 1205 (e.g., the receiver 1210, the transmitter 1215, and the communications manager 1220), may include at least one processor, which may be coupled with at least one memory, to support the described techniques. Each of these components may be in communication with one another (e.g., via one or more buses).

The receiver 1210 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1205. In some examples, the receiver 1210 may support obtaining information by receiving signals via one or more antennas. Additionally, or alternatively, the receiver 1210 may support obtaining information by receiving signals via one or more wired (e.g., electrical, fiber optic) interfaces, wireless interfaces, or any combination thereof.

The transmitter 1215 may provide a means for outputting (e.g., transmitting, providing, conveying, sending) information generated by other components of the device 1205. For example, the transmitter 1215 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1215 may support outputting information by transmitting signals via one or more antennas. Additionally, or alternatively, the transmitter 1215 may support outputting information by transmitting signals via one or more wired (e.g., electrical, fiber optic) interfaces, wireless interfaces, or any combination thereof. In some examples, the transmitter 1215 and the receiver 1210 may be co-located in a transceiver, which may include or be coupled with a modem.

The device 1205, or various components thereof, may be an example of means for performing various aspects of techniques for UE full-duplex operation as described herein. For example, the communications manager 1220 may include an FD configuration manager 1225, a dynamic FD update manager 1230, a scheduling manager 1235, or any combination thereof. The communications manager 1220 may be an example of aspects of a communications manager 1120 as described herein. In some examples, the communications manager 1220, or various components thereof, may be configured to perform various operations (e.g., receiving, obtaining, monitoring, outputting, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to obtain information, output information, or perform various other operations as described herein.

The communications manager 1220 may support wireless communications in accordance with examples as disclosed herein. The FD configuration manager 1225 is capable of, configured to, or operable to support a means for transmitting, to a UE, a network full-duplex configuration that indicates a set of symbols are configured for full-duplex communication at the network entity. The FD configuration manager 1225 is capable of, configured to, or operable to support a means for transmitting, to the UE, a UE full-duplex configuration that indicates at least a subset of the set of symbols have a first configuration for full-duplex communication at the UE, the subset of symbols including some or all of the set of symbols. The dynamic FD update manager 1230 is capable of, configured to, or operable to support a means for transmitting, to the UE, an indication that at least a first symbol of the subset of symbols has a second configuration that is different from the first configuration for the first symbol. The scheduling manager 1235 is capable of, configured to, or operable to support a means for communicating with the UE according to the second configuration of the first symbol.

Figure 13:
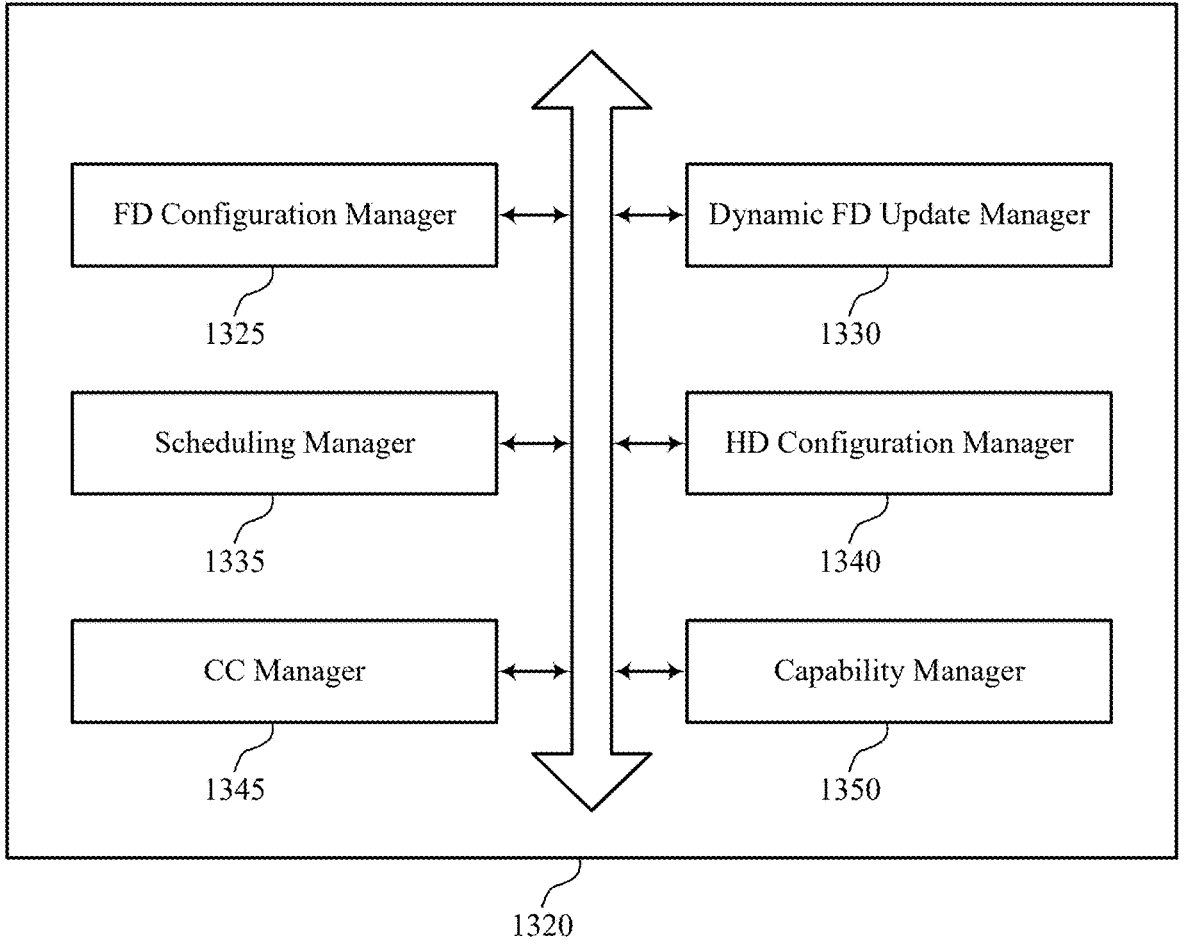
FIG. 13 shows a block diagram of a communications manager that supports techniques for UE full-duplex operation in accordance with one or more aspects of the present disclosure.

FIG. 13 shows a block diagram 1300 of a communications manager 1320 that supports techniques for UE full-duplex operation in accordance with one or more aspects of the present disclosure. The communications manager 1320 may be an example of aspects of a communications manager 1120, a communications manager 1220, or both, as described herein. The communications manager 1320, or various components thereof, may be an example of means for performing various aspects of techniques for UE full-duplex operation as described herein. For example, the communications manager 1320 may include an FD configuration manager 1325, a dynamic FD update manager 1330, a scheduling manager 1335, an HD configuration manager 1340, a CC manager 1345, a capability manager 1350, or any combination thereof. Each of these components, or components or subcomponents thereof (e.g., one or more processors, one or more memories), may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1320 may support wireless communications in accordance with examples as disclosed herein. The FD configuration manager 1325 is capable of, configured to, or operable to support a means for transmitting, to a UE, a network full-duplex configuration that indicates a set of symbols are configured for full-duplex communication at the network entity. In some examples, the FD configuration manager 1325 is capable of, configured to, or operable to support a means for transmitting, to the UE, a UE full-duplex configuration that indicates at least a subset of the set of symbols have a first configuration for full-duplex communication at the UE, the subset of symbols including some or all of the set of symbols. The dynamic FD update manager 1330 is capable of, configured to, or operable to support a means for transmitting, to the UE, an indication that at least a first symbol of the subset of symbols has a second configuration that is different from the first configuration for the first symbol. The scheduling manager 1335 is capable of, configured to, or operable to support a means for communicating with the UE according to the second configuration of the first symbol.

In some examples, the HD configuration manager 1340 is capable of, configured to, or operable to support a means for transmitting a half-duplex symbol format indication that indicates an uplink format, a downlink format, or a flexible format, for each symbol of the set of symbols, where the first symbol has the downlink format in the half-duplex symbol format indication, and where the network full-duplex configuration updates the half-duplex symbol format indication for the set of symbols for full-duplex communications at the network entity, and the UE full-duplex configuration corresponds to the network full-duplex configuration for the subset of symbols for full-duplex communications at the UE.

In some examples, the dynamic FD update manager 1330 is capable of, configured to, or operable to support a means for updating the first symbol to have the downlink format responsive to the indication that the first symbol has the second configuration, where both the network entity and the UE communicate using half-duplex communications for the first symbol.

In some examples, the dynamic FD update manager 1330 is capable of, configured to, or operable to support a means for updating the first symbol to have the network full-duplex configuration indicated for the first symbol responsive to the indication that the first symbol has the second configuration, where the network entity communicates using full-duplex communications for the first symbol and the UE communicates using half-duplex communications for the first symbol according to the downlink format.

In some examples, the network full-duplex configuration is a SBFD configuration in which at least a first sub-band of a component carrier bandwidth is configured for downlink communications and at least a second sub-band of the component carrier bandwidth is configured form uplink communications. In some examples, the UE full-duplex configuration is a SBFD configuration in which at least a first sub-band of a component carrier bandwidth is configured for downlink communications and at least a second sub-band of the component carrier bandwidth or another component carrier is configured for uplink communications.

In some examples, the capability manager 1350 is capable of, configured to, or operable to support a means for receiving, from the UE, a UE capability message that indicates that the UE is capable to perform full-duplex communication at the UE, and that the UE is capable to update the UE full-duplex configuration for one or more symbols to fallback to the network full-duplex configuration or to a half-duplex symbol format configuration associated with the set of symbols.

In some examples, the HD configuration manager 1340 is capable of, configured to, or operable to support a means for transmitting a half-duplex symbol format indication that indicates an uplink format, a downlink format, or a flexible format, for each symbol of the set of symbols, and where the network full-duplex configuration updates the half-duplex symbol format for the set of symbols for full-duplex communications at the network entity, and the UE full-duplex configuration corresponds to the network full-duplex configuration for the subset of symbols for full-duplex communications at the UE, and where the first symbol has the flexible format in the half-duplex symbol format indication and the first symbol has a downlink and uplink network full-duplex configuration.

In some examples, the dynamic FD update manager 1330 is capable of, configured to, or operable to support a means for updating the first symbol to have the downlink format responsive to the indication that the first symbol has the second configuration, where both the network entity and the UE communicate using half-duplex communications for the first symbol. In some examples, the dynamic FD update manager 1330 is capable of, configured to, or operable to support a means for updating the first symbol to have the flexible format responsive to the indication that the first symbol has the second configuration, where both the network entity and the UE communicate using half-duplex communications for the first symbol. In some examples, the dynamic FD update manager 1330 is capable of, configured to, or operable to support a means for updating the first symbol to have the network full-duplex configuration indicated for the first symbol responsive to the indication that the first symbol has the updated configuration, where the network entity communicates using full-duplex communications for the first symbol and the UE communicates using half-duplex communications for the first symbol according to the downlink format or the flexible format.

In some examples, the capability manager 1350 is capable of, configured to, or operable to support a means for receiving, from the UE, a UE capability message that indicates that the UE is capable to perform SBFD communication at the UE, and that the UE is capable to update the UE full-duplex configuration for one or more symbols to fallback to the network full-duplex configuration, or to the downlink or flexible format half-duplex symbol format configuration associated with the set of symbols.

In some examples, the HD configuration manager 1340 is capable of, configured to, or operable to support a means for transmitting, to the UE, a half-duplex symbol format indication that indicates an uplink format, a downlink format, or a flexible format, for each symbol of the set of symbols, where the network full-duplex configuration updates the half-duplex symbol format indication for the set of symbols for full-duplex communications at the network entity, and the UE full-duplex configuration corresponds to the network full-duplex configuration for the subset of symbols for full-duplex communications at the UE, and where the first symbol has the flexible format in the half-duplex symbol format indication and the first symbol has a flexible-and-uplink network full-duplex configuration.

In some examples, the dynamic FD update manager 1330 is capable of, configured to, or operable to support a means for updating the first symbol to have the flexible format responsive to the indication that the first symbol has the updated configuration, where both the network entity and the UE communicate using half-duplex communications for the first symbol. In some examples, the dynamic FD update manager 1330 is capable of, configured to, or operable to support a means for updating the first symbol to have a flexible-and-uplink SBFD configuration responsive to the indication that the first symbol has the second configuration, where the flexible-and-uplink full-duplex configuration provides an uplink sub-band and one or more flexible sub-bands outside the uplink sub-band within at least one carrier bandwidth, and where the network entity communicates using full-duplex communications for the first symbol and the UE communicates using half-duplex communications for the first symbol according to the flexible format.

In some examples, the dynamic FD update manager 1330 is capable of, configured to, or operable to support a means for updating the first symbol to have a downlink-and-uplink SBFD configuration responsive to the indication that the first symbol has the second configuration, where the downlink-and-uplink SBFD configuration provides an uplink sub-band and one or more downlink sub-bands within at least one carrier bandwidth, and where the network entity communicates using full-duplex communications for the first symbol and the UE communicates using half-duplex communications for the first symbol according to the downlink format.

In some examples, the dynamic FD update manager 1330 is capable of, configured to, or operable to support a means for updating the first symbol to have the uplink format responsive to the indication that the first symbol has the second configuration, where both the network entity and the UE communicate using half-duplex communications for the first symbol. In some examples, the dynamic FD update manager 1330 is capable of, configured to, or operable to support a means for updating the first symbol to have the downlink format responsive to the indication that the first symbol has the second configuration, where both the network entity and the UE communicate using half-duplex communications for the first symbol.

In some examples, the capability manager 1350 is capable of, configured to, or operable to support a means for receiving, from the UE, a UE capability message that indicates that the UE is capable to perform SBFD communication at the UE, and that the UE is capable to update the UE full-duplex configuration for one or more symbols to fallback to a network a downlink-and-uplink SBFD configuration, to a network a flexible-and-uplink SBFD configuration, or to the downlink, uplink, or flexible format half-duplex symbol format configuration associated with the set of symbols.

In some examples, to support transmitting the indication, the dynamic FD update manager 1330 is capable of, configured to, or operable to support a means for transmitting a scheduling DCI communication that schedules downlink or uplink communications outside of a sub-band that is configured for downlink or uplink communications in the UE full-duplex configuration for at least the first symbol.

In some examples, to support transmitting the indication, the dynamic FD update manager 1330 is capable of, configured to, or operable to support a means for transmitting a non-scheduling DCI communication that indicates whether the first symbol is to be used for UE full-duplex communications or for UE half-duplex communications. In some examples, to support transmitting the indication, the dynamic FD update manager 1330 is capable of, configured to, or operable to support a means for transmitting a MAC-CE that indicates whether the first symbol is to be used for UE full-duplex communications or for UE half-duplex communications.

In some examples, to support transmitting the indication, the dynamic FD update manager 1330 is capable of, configured to, or operable to support a means for transmitting DCI that indicates that at least the first symbol has the second configuration, the DCI provided in a group common DCI communication, a DCI communication that schedules data, a DCI communication that does not schedule data, or a prespecified DCI communication associated with full-duplex communications. In some examples, the DCI indicates one or more symbols are updated or indicates the second configuration is valid until a subsequent updated configuration is provided.

In some examples, to support transmitting the indication, the dynamic FD update manager 1330 is capable of, configured to, or operable to support a means for transmitting a medium access control (MAC) control element (CE) that indicates that at least the first symbol has the second configuration, and that indicates one or more symbols that are updated or that the second configuration is valid until a subsequent updated configuration is provided.

In some examples, to support transmitting the indication, the dynamic FD update manager 1330 is capable of, configured to, or operable to support a means for transmitting a scheduling DCI communication that schedules a channel or reference signal transmission for one or more symbols, and where the indication that at least the first symbol has the second configuration is based on the channel or reference signal transmission that is scheduled.

In some examples, the indication that at least the first symbol of the subset of symbols has the updated configuration provides one or more of a change to a periodic pattern of the UE full-duplex configuration for the subset of symbols, an updated semi-persistent UE full-duplex configuration for the subset of symbols, or the second configuration that is maintained until a subsequent update of the UE full-duplex configuration. In some examples, the indication includes one or more of a bitmap that indicates a pattern of symbols that have the UE full-duplex configuration, a predefined pattern identification that indicates the pattern of symbols that have the UE full-duplex configuration, or an offset and length of the subset of symbols that have the UE full-duplex configuration.

In some examples, the indication that at least the first symbol of the subset of symbols has the second configuration provides the second configuration for a single occasion of the subset of symbols, or for multiple occasions of the subset of symbols. In some examples, the indication provides an identification of one or more symbols associated with the single occasion with the second configuration, or provides a time window during which the multiple occasions of subset of symbols have the second configuration. In some examples, the first symbol is applied based on a time duration from a receipt of the indication, a time duration from transmission of an acknowledgment of the indication, a time duration indicated in configuration or control information signaling, or a time duration indicated in a reported UE capability.

In some examples, the indication that at least the first symbol of the subset of symbols has the second configuration is applied to one CC, one or more CCs in a CC list, or in a different CC than a CC used to provide the indication.

Figure 14:
FIG. 14 shows a diagram of a system including a device that supports techniques for UE full-duplex operation in accordance with one or more aspects of the present disclosure.

FIG. 14 shows a diagram of a system 1400 including a device 1405 that supports techniques for UE full-duplex operation in accordance with one or more aspects of the present disclosure. The device 1405 may be an example of or include the components of a device 1105, a device 1205, or a network entity 105 as described herein. The device 1405 may communicate with one or more network entities 105, one or more UEs 115, or any combination thereof, which may include communications over one or more wired interfaces, over one or more wireless interfaces, or any combination thereof. The device 1405 may include components that support outputting and obtaining communications, such as a communications manager 1420, a transceiver 1410, an antenna 1415, at least one memory 1425, code 1430, and at least one processor 1435. These components may be in electronic communication or otherwise coupled (e.g., operatively, communicatively, functionally, electronically, electrically) via one or more buses (e.g., a bus 1440).

The transceiver 1410 may support bi-directional communications via wired links, wireless links, or both as described herein. In some examples, the transceiver 1410 may include a wired transceiver and may communicate bi-directionally with another wired transceiver. Additionally, or alternatively, in some examples, the transceiver 1410 may include a wireless transceiver and may communicate bi-directionally with another wireless transceiver. In some examples, the device 1405 may include one or more antennas 1415, which may be capable of transmitting or receiving wireless transmissions (e.g., concurrently). The transceiver 1410 may also include a modem to modulate signals, to provide the modulated signals for transmission (e.g., by one or more antennas 1415, by a wired transmitter), to receive modulated signals (e.g., from one or more antennas 1415, from a wired receiver), and to demodulate signals. In some implementations, the transceiver 1410 may include one or more interfaces, such as one or more interfaces coupled with the one or more antennas 1415 that are configured to support various receiving or obtaining operations, or one or more interfaces coupled with the one or more antennas 1415 that are configured to support various transmitting or outputting operations, or a combination thereof. In some implementations, the transceiver 1410 may include or be configured for coupling with one or more processors or one or more memory components that are operable to perform or support operations based on received or obtained information or signals, or to generate information or other signals for transmission or other outputting, or any combination thereof. In some implementations, the transceiver 1410, or the transceiver 1410 and the one or more antennas 1415, or the transceiver 1410 and the one or more antennas 1415 and one or more processors or one or more memory components (e.g., the at least one processor 1435, the at least one memory 1425, or both), may be included in a chip or chip assembly that is installed in the device 1405. In some examples, the transceiver 1410 may be operable to support communications via one or more communications links (e.g., a communication link 125, a backhaul communication link 120, a midhaul communication link 162, a fronthaul communication link 168).

The at least one memory 1425 may include RAM, ROM, or any combination thereof. The at least one memory 1425 may store computer-readable, computer-executable code 1430 including instructions that, when executed by one or more of the at least one processor 1435, cause the device 1405 to perform various functions described herein. The code 1430 may be stored in a non-transitory computer-readable medium such as system memory or another type of memory. In some cases, the code 1430 may not be directly executable by a processor of the at least one processor 1435 but may cause a computer (e.g., when compiled and executed) to perform functions described herein. In some cases, the at least one memory 1425 may contain, among other things, a BIOS which may control basic hardware or software operation such as the interaction with peripheral components or devices. In some examples, the at least one processor 1435 may include multiple processors and the at least one memory 1425 may include multiple memories. One or more of the multiple processors may be coupled with one or more of the multiple memories which may, individually or collectively, be configured to perform various functions herein (for example, as part of a processing system).

The at least one processor 1435 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the at least one processor 1435 may be configured to operate a memory array using a memory controller. In some other cases, a memory controller may be integrated into one or more of the at least one processor 1435. The at least one processor 1435 may be configured to execute computer-readable instructions stored in a memory (e.g., one or more of the at least one memory 1425) to cause the device 1405 to perform various functions (e.g., functions or tasks supporting techniques for UE full-duplex operation). For example, the device 1405 or a component of the device 1405 may include at least one processor 1435 and at least one memory 1425 coupled with one or more of the at least one processor 1435, the at least one processor 1435 and the at least one memory 1425 configured to perform various functions described herein. The at least one processor 1435 may be an example of a cloud-computing platform (e.g., one or more physical nodes and supporting software such as operating systems, virtual machines, or container instances) that may host the functions (e.g., by executing code 1430) to perform the functions of the device 1405. The at least one processor 1435 may be any one or more suitable processors capable of executing scripts or instructions of one or more software programs stored in the device 1405 (such as within one or more of the at least one memory 1425). In some examples, the at least one processor 1435 may include multiple processors and the at least one memory 1425 may include multiple memories. One or more of the multiple processors may be coupled with one or more of the multiple memories, which may, individually or collectively, be configured to perform various functions herein. In some examples, the at least one processor 1435 may be a component of a processing system, which may refer to a system (such as a series) of machines, circuitry (including, for example, one or both of processor circuitry (which may include the at least one processor 1435) and memory circuitry (which may include the at least one memory 1425)), or components, that receives or obtains inputs and processes the inputs to produce, generate, or obtain a set of outputs. The processing system may be configured to perform one or more of the functions described herein. As such, the at least one processor 1435 or a processing system including the at least one processor 1435 may be configured to, configurable to, or operable to cause the device 1405 to perform one or more of the functions described herein. Further, as described herein, being "configured to," being "configurable to," and being "operable to" may be used interchangeably and may be associated with a capability, when executing code stored in the at least one memory 1425 or otherwise, to perform one or more of the functions described herein.

In some examples, a bus 1440 may support communications of (e.g., within) a protocol layer of a protocol stack. In some examples, a bus 1440 may support communications associated with a logical channel of a protocol stack (e.g., between protocol layers of a protocol stack), which may include communications performed within a component of the device 1405, or between different components of the device 1405 that may be co-located or located in different locations (e.g., where the device 1405 may refer to a system in which one or more of the communications manager 1420, the transceiver 1410, the at least one memory 1425, the code 1430, and the at least one processor 1435 may be located in one of the different components or divided between different components).

In some examples, the communications manager 1420 may manage aspects of communications with a core network 130 (e.g., via one or more wired or wireless backhaul links). For example, the communications manager 1420 may manage the transfer of data communications for client devices, such as one or more UEs 115. In some examples, the communications manager 1420 may manage communications with other network entities 105, and may include a controller or scheduler for controlling communications with UEs 115 in cooperation with other network entities 105. In some examples, the communications manager 1420 may support an X2 interface within an LTE/LTE-A wireless communications network technology to provide communication between network entities 105.

The communications manager 1420 may support wireless communications in accordance with examples as disclosed herein. For example, the communications manager 1420 is capable of, configured to, or operable to support a means for transmitting, to a UE, a network full-duplex configuration that indicates a set of symbols are configured for full-duplex communication at the network entity. The communications manager 1420 is capable of, configured to, or operable to support a means for transmitting, to the UE, a UE full-duplex configuration that indicates at least a subset of the set of symbols have a first configuration for full-duplex communication at the UE, the subset of symbols including some or all of the set of symbols. The communications manager 1420 is capable of, configured to, or operable to support a means for transmitting, to the UE, an indication that at least a first symbol of the subset of symbols has a second configuration that is different from the first configuration for the first symbol. The communications manager 1420 is capable of, configured to, or operable to support a means for communicating with the UE according to the second configuration of the first symbol.

By including or configuring the communications manager 1420 in accordance with examples as described herein, the device 1405 may support techniques for full-duplex communications that provide for enhanced resource utilization and communications efficiency, and updates to full-duplex configurations may help to enhance reliability of transmissions in full-duplex communications, enhance network efficiency through reduced overhead, enhance throughput, reduce power consumption, and provide for enhanced user experience.

In some examples, the communications manager 1420 may be configured to perform various operations (e.g., receiving, obtaining, monitoring, outputting, transmitting) using or otherwise in cooperation with the transceiver 1410, the one or more antennas 1415 (e.g., where applicable), or any combination thereof. Although the communications manager 1420 is illustrated as a separate component, in some examples, one or more functions described with reference to the communications manager 1420 may be supported by or performed by the transceiver 1410, one or more of the at least one processor 1435, one or more of the at least one memory 1425, the code 1430, or any combination thereof (for example, by a processing system including at least a portion of the at least one processor 1435, the at least one memory 1425, the code 1430, or any combination thereof). For example, the code 1430 may include instructions executable by one or more of the at least one processor 1435 to cause the device 1405 to perform various aspects of techniques for UE full-duplex operation as described herein, or the at least one processor 1435 and the at least one memory 1425 may be otherwise configured to, individually or collectively, perform or support such operations.

FIG. 15 shows a flowchart illustrating a method 1500 that supports techniques for UE full-duplex operation in accordance with aspects of the present disclosure. The operations of the method 1500 may be implemented by a UE or its components as described herein. For example, the operations of the method 1500 may be performed by a UE 115 as described with reference to FIGS. 1 through 10. In some examples, a UE may execute a set of instructions to control the functional elements of the UE to perform the described functions. Additionally, or alternatively, the UE may perform aspects of the described functions using special-purpose hardware.

Optionally, at 1505, the method may include transmitting a UE capability message that indicates that the UE is capable to perform full-duplex communication at the UE, and that the UE is capable to update the UE full-duplex configuration for one or more symbols to fallback to the network full-duplex configuration or to a half-duplex symbol format configuration. The operations of block 1505 may be performed in accordance with examples as disclosed herein. In some examples, aspects of the operations of 1505 may be performed by capability manager 950 as described with reference to FIG. 9.

At 1510, the method may include receiving a network full-duplex configuration that indicates a set of symbols are configured for full-duplex communication at a network entity. The operations of block 1510 may be performed in accordance with examples as disclosed herein. In some examples, aspects of the operations of 1510 may be performed by an FD configuration manager 925 as described with reference to FIG. 9.

At 1515, the method may include receiving a UE full-duplex configuration that indicates at least a subset of the set of symbols have a first configuration for full-duplex communication at the UE, the subset of symbols including some or all of the set of symbols. The operations of block 1515 may be performed in accordance with examples as disclosed herein. In some examples, aspects of the operations of 1515 may be performed by an FD configuration manager 925 as described with reference to FIG. 9.

At 1520, the method may include receiving an indication that at least a first symbol of the subset of symbols has a second configuration that is different from the first configuration for the first symbol. The operations of block 1520 may be performed in accordance with examples as disclosed herein. In some examples, aspects of the operations of 1520 may be performed by a dynamic FD update manager 930 as described with reference to FIG. 9.

At 1525, the method may include communicating with the network entity according to the second configuration of the first symbol. The operations of block 1525 may be performed in accordance with examples as disclosed herein. In some examples, aspects of the operations of 1525 may be performed by a scheduling manager 935 as described with reference to FIG. 9.

Figure 16:
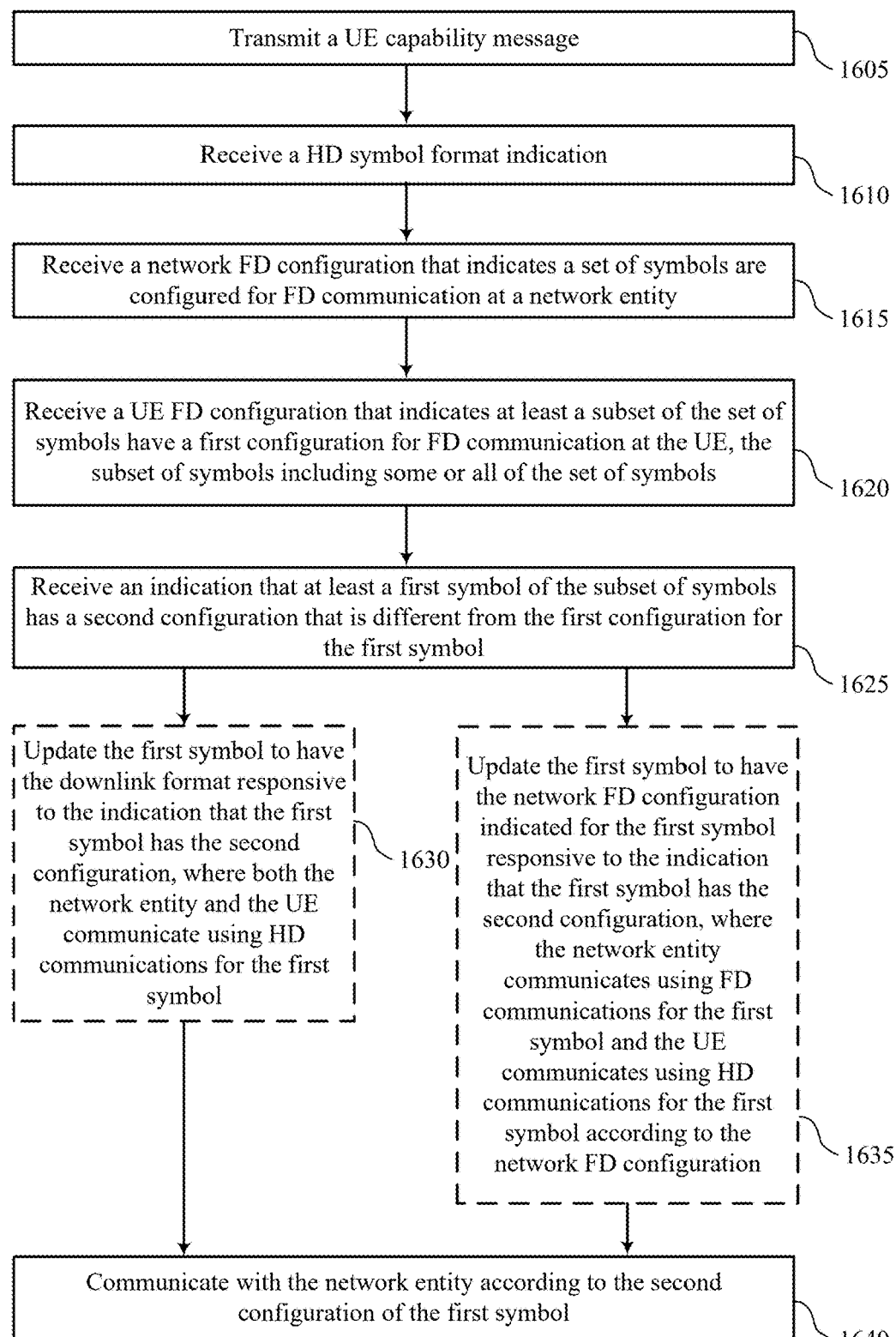

FIG. 16 shows a flowchart illustrating a method 1600 that supports techniques for UE full-duplex operation in accordance with aspects of the present disclosure. The operations of the method 1600 may be implemented by a UE or its components as described herein. For example, the operations of the method 1600 may be performed by a UE 115 as described with reference to FIGS. 1 through 10. In some examples, a UE may execute a set of instructions to control the functional elements of the UE to perform the described functions. Additionally, or alternatively, the UE may perform aspects of the described functions using special-purpose hardware.

At 1605, the method may include transmitting a UE capability message. The UE capability message may indicate that the UE is capable to perform full-duplex communication at the UE, and that the UE is capable to update the UE full-duplex configuration for one or more symbols to fallback to the network full-duplex configuration or to a half-duplex symbol format configuration associated with the set of symbols. The operations of block 1605 may be performed in accordance with examples as disclosed herein. In some examples, aspects of the operations of 1605 may be performed by a capability manager 950 as described with reference to FIG. 9.

At 1610, the method may include receiving a half-duplex symbol format indication. The half-duplex symbol format indication may provide an uplink format, a downlink format, or a flexible format, for each symbol of the set of symbols, where the first symbol has the downlink format in the half-duplex symbol format indication, and where the network full-duplex configuration updates the half-duplex symbol format indication for the set of symbols for full-duplex communications at the network entity, and the UE full-duplex configuration corresponds to the network full-duplex configuration for the subset of symbols for full-duplex communications at the UE. The operations of block 1610 may be performed in accordance with examples as disclosed herein. In some examples, aspects of the operations of 1610 may be performed by an HD configuration manager 940 as described with reference to FIG. 9.

At 1615, the method may include receiving a network full-duplex configuration that indicates a set of symbols are configured for full-duplex communication at a network entity. The operations of block 1615 may be performed in accordance with examples as disclosed herein. In some examples, aspects of the operations of 1615 may be performed by an FD configuration manager 925 as described with reference to FIG. 9.

At 1620, the method may include receiving a UE full-duplex configuration that indicates at least a subset of the set of symbols have a first configuration for full-duplex communication at the UE, the subset of symbols including some or all of the set of symbols. The operations of block 1620 may be performed in accordance with examples as disclosed herein. In some examples, aspects of the operations of 1620 may be performed by an FD configuration manager 925 as described with reference to FIG. 9.

At 1625, the method may include receiving an indication that at least a first symbol of the subset of symbols has a second configuration that is different from the first configuration for the first symbol. The operations of block 1625 may be performed in accordance with examples as disclosed herein. In some examples, aspects of the operations of 1625 may be performed by a dynamic FD update manager 930 as described with reference to FIG. 9.

At 1630, a first alternative of the method may include updating the first symbol to have the downlink format responsive to the indication that the first symbol has the second configuration, where both the network entity and the UE communicate using half-duplex communications for the first symbol. The operations of block 1630 may be performed in accordance with examples as disclosed herein. In some examples, aspects of the operations of 1630 may be performed by a dynamic FD update manager 930 as described with reference to FIG. 9.

At 1635, a second alternative of the method may include updating the first symbol to have the network full-duplex configuration indicated for the first symbol responsive to the indication that the first symbol has the second configuration, where the network entity communicates using full-duplex communications for the first symbol and the UE communicates using half-duplex communications for the first symbol according to the network full-duplex configuration. The operations of block 1635 may be performed in accordance with examples as disclosed herein. In some examples, aspects of the operations of 1635 may be performed by a dynamic FD update manager 930 as described with reference to FIG. 9.

At 1640, the method may include communicating with the network entity according to the second configuration of the first symbol. The operations of block 1640 may be performed in accordance with examples as disclosed herein. In some examples, aspects of the operations of 1640 may be performed by a scheduling manager 935 as described with reference to FIG. 9.

FIG. 17 shows a flowchart illustrating a method 1700 that supports techniques for UE full-duplex operation in accordance with aspects of the present disclosure. The operations of the method 1700 may be implemented by a UE or its components as described herein. For example, the operations of the method 1700 may be performed by a UE 115 as described with reference to FIGS. 1 through 10. In some examples, a UE may execute a set of instructions to control the functional elements of the UE to perform the described functions. Additionally, or alternatively, the UE may perform aspects of the described functions using special-purpose hardware.

At 1705, the method may include transmitting a UE capability message. The UE capability message may provide an indication that the UE is capable to perform SBFD communication at the UE, and that the UE is capable to update the UE full-duplex configuration for one or more symbols to fallback to the network full-duplex configuration, or to the downlink or flexible format half-duplex symbol format configuration associated with the set of symbols. The operations of block 1705 may be performed in accordance with examples as disclosed herein. In some examples, aspects of the operations of 1705 may be performed by a capability manager 950 as described with reference to FIG. 9.

At 1710, the method may include receiving a half-duplex symbol format indication. The half-duplex symbol format indication may provide an uplink format, a downlink format, or a flexible format, for each symbol of the set of symbols, where the first symbol has the flexible format in the half-duplex symbol format indication and the first symbol has a downlink-and-uplink network full-duplex configuration, and where the network full-duplex configuration updates the half-duplex symbol format for the set of symbols for full-duplex communications at the network entity, and the UE full-duplex configuration corresponds to the network full-duplex configuration for the subset of symbols for full-duplex communications at the UE. The operations of block 1710 may be performed in accordance with examples as disclosed herein. In some examples, aspects of the operations of 1710 may be performed by an HD configuration manager 940 as described with reference to FIG. 9.

At 1715, the method may include receiving a network full-duplex configuration that indicates a set of symbols are configured for full-duplex communication at a network entity. The operations of block 1715 may be performed in accordance with examples as disclosed herein. In some examples, aspects of the operations of 1715 may be performed by an FD configuration manager 925 as described with reference to FIG. 9.

At 1720, the method may include receiving a UE full-duplex configuration that indicates at least a subset of the set of symbols have a first configuration for full-duplex communication at the UE, the subset of symbols including some or all of the set of symbols. The operations of block 1720 may be performed in accordance with examples as disclosed herein. In some examples, aspects of the operations of 1720 may be performed by an FD configuration manager 925 as described with reference to FIG. 9.

At 1725, the method may include receiving an indication that at least a first symbol of the subset of symbols has a second configuration that is different from the first configuration for the first symbol. The operations of block 1725 may be performed in accordance with examples as disclosed herein. In some examples, aspects of the operations of 1725 may be performed by a dynamic FD update manager 930 as described with reference to FIG. 9.

At 1730, a first alternative of the method may include updating the first symbol to have the downlink format responsive to the indication that the first symbol has the second configuration, where both the network entity and the UE communicate using half-duplex communications for the first symbol. The operations of block 1730 may be performed in accordance with examples as disclosed herein. In some examples, aspects of the operations of 1730 may be performed by a dynamic FD update manager 930 as described with reference to FIG. 9.

At 1735, a second alternative of the method may include updating the first symbol to have the flexible format responsive to the indication that the first symbol has the second configuration, where both the network entity and the UE communicate using half-duplex communications for the first symbol. The operations of block 1735 may be performed in accordance with examples as disclosed herein. In some examples, aspects of the operations of 1735 may be performed by a dynamic FD update manager 930 as described with reference to FIG. 9.

At 1740, a third alternative of the method may include updating the first symbol to have the network full-duplex configuration indicated for the first symbol responsive to the indication that the first symbol has the second configuration, where the network entity communicates using full-duplex communications for the first symbol and the UE communicates using half-duplex communications for the first symbol according to the downlink format or the flexible format. The operations of block 1740 may be performed in accordance with examples as disclosed herein. In some examples, aspects of the operations of 1740 may be performed by a dynamic FD update manager 930 as described with reference to FIG. 9.

At 1745, the method may include communicating with the network entity according to the second configuration of the first symbol. The operations of block 1745 may be performed in accordance with examples as disclosed herein. In some examples, aspects of the operations of 1745 may be performed by a scheduling manager 935 as described with reference to FIG. 9.

FIG. 18 shows a flowchart illustrating a method 1800 that supports techniques for UE full-duplex operation in accordance with aspects of the present disclosure. The operations of the method 1800 may be implemented by a UE or its components as described herein. For example, the operations of the method 1800 may be performed by a UE 115 as described with reference to FIGS. 1 through 10. In some examples, a UE may execute a set of instructions to control the functional elements of the UE to perform the described functions. Additionally, or alternatively, the UE may perform aspects of the described functions using special-purpose hardware.

At 1805, the method may include transmitting a UE capability message. The UE capability message may indicate that the UE is capable to perform SBFD communication at the UE, and that the UE is capable to update the UE full-duplex configuration for one or more symbols to fall-back to a network a downlink-and-uplink SBFD configuration, to a network a flexible-and-uplink SBFD configuration, or to the downlink, uplink, or flexible format half-duplex symbol format configuration associated with the set of symbols. The operations of block 1805 may be performed in accordance with examples as disclosed herein. In some examples, aspects of the operations of 1805 may be performed by a capability manager 950 as described with reference to FIG. 9.

At 1810, the method may include receiving a half-duplex symbol format indication. The half-duplex symbol format indication may provide an uplink format, a downlink format, or a flexible format, for each symbol of the set of symbols, where the first symbol has the flexible format in the half-duplex symbol format indication, and where the network full-duplex configuration updates the half-duplex symbol format indication for the set of symbols for SBFD communications at the network entity to provide that the first symbol has a flexible-and-uplink network SBFD configuration, and the UE full-duplex configuration corresponds to the network full-duplex configuration for the subset of symbols for SBFD communications at the UE. The operations of block 1810 may be performed in accordance with examples as disclosed herein. In some examples, aspects of the operations of 1810 may be performed by an HD configuration manager 940 as described with reference to FIG. 9.

At 1815, the method may include receiving a network full-duplex configuration that indicates a set of symbols are configured for full-duplex communication at a network entity. The operations of block 1815 may be performed in accordance with examples as disclosed herein. In some examples, aspects of the operations of 1815 may be performed by an FD configuration manager 925 as described with reference to FIG. 9.

At 1820, the method may include receiving a UE full-duplex configuration that indicates at least a subset of the set of symbols have a first configuration for full-duplex communication at the UE, the subset of symbols including some or all of the set of symbols. The operations of block 1820 may be performed in accordance with examples as disclosed herein. In some examples, aspects of the operations of 1820 may be performed by an FD configuration manager 925 as described with reference to FIG. 9.

At 1825, the method may include receiving an indication that at least a first symbol of the subset of symbols has a second configuration that is different from the first configuration for the first symbol. The operations of block 1825 may be performed in accordance with examples as disclosed herein. In some examples, aspects of the operations of 1825 may be performed by a dynamic FD update manager 930 as described with reference to FIG. 9.

At 1830, a first alternative of the method may include updating the first symbol to have the flexible format responsive to the indication that the first symbol has the second configuration, where both the network entity and the UE communicate using half-duplex communications for the first symbol. The operations of block 1830 may be performed in accordance with examples as disclosed herein. In some examples, aspects of the operations of 1830 may be performed by a dynamic FD update manager 930 as described with reference to FIG. 9.

At 1835, a second alternative of the method may include updating the first symbol to have a flexible-and-uplink SBFD configuration responsive to the indication that the first symbol has the second configuration, where the flexible-and-uplink SBFD configuration provides an uplink sub-band and one or more flexible sub-bands outside the uplink sub-band within at least one carrier bandwidth, and where the network entity communicates using full-duplex communications for the first symbol and the UE communicates using half-duplex communications for the first symbol according to the flexible format. The operations of block 1835 may be performed in accordance with examples as disclosed herein. In some examples, aspects of the operations of 1835 may be performed by a dynamic FD update manager 930 as described with reference to FIG. 9.

At 1840, a third alternative of the method may include updating the first symbol to have a downlink-and-uplink SBFD configuration responsive to the indication that the first symbol has the second configuration, where the downlink-and-uplink SBFD configuration provides an uplink sub-band and one or more downlink sub-bands within at least one carrier bandwidth, and where the network entity communicates using full-duplex communications for the first symbol and the UE communicates using half-duplex communications for the first symbol according to the downlink format. The operations of block 1840 may be performed in accordance with examples as disclosed herein. In some examples, aspects of the operations of 1840 may be performed by a dynamic FD update manager 930 as described with reference to FIG. 9.

At 1845, a fourth alternative of the method may include updating the first symbol to have the uplink format responsive to the indication that the first symbol has the second configuration, where both the network entity and the UE communicate using half-duplex communications for the first symbol. The operations of block 1845 may be performed in accordance with examples as disclosed herein. In some examples, aspects of the operations of 1845 may be performed by a dynamic FD update manager 930 as described with reference to FIG. 9.

At 1850, a fifth alternative of the method may include updating the first symbol to have the downlink format responsive to the indication that the first symbol has the second configuration, where both the network entity and the UE communicate using half-duplex communications for the first symbol. The operations of block 1850 may be performed in accordance with examples as disclosed herein. In some examples, aspects of the operations of 1850 may be performed by a dynamic FD update manager 930 as described with reference to FIG. 9.

At 1855, the method may include communicating with the network entity according to the second configuration of the first symbol. The operations of block 1855 may be performed in accordance with examples as disclosed herein. In some examples, aspects of the operations of 1855 may be performed by a scheduling manager 935 as described with reference to FIG. 9.

FIG. 19 shows a flowchart illustrating a method 1900 that supports techniques for UE full-duplex operation in accordance with aspects of the present disclosure. The operations of the method 1900 may be implemented by a network entity or its components as described herein. For example, the operations of the method 1900 may be performed by a network entity as described with reference to FIGS. 1 through 6 and 11 through 14. In some examples, a network entity may execute a set of instructions to control the functional elements of the network entity to perform the described functions. Additionally, or alternatively, the network entity may perform aspects of the described functions using special-purpose hardware.

At 1905, the method may include transmitting, to a UE, a network full-duplex configuration that indicates a set of symbols are configured for full-duplex communication at the network entity. The operations of block 1905 may be performed in accordance with examples as disclosed herein. In some examples, aspects of the operations of 1905 may be performed by an FD configuration manager 1325 as described with reference to FIG. 13.

At 1910, the method may include transmitting, to the UE, a UE full-duplex configuration that indicates at least a subset of the set of symbols have a first configuration for full-duplex communication at the UE, the subset of symbols including some or all of the set of symbols. The operations of block 1910 may be performed in accordance with examples as disclosed herein. In some examples, aspects of the operations of 1910 may be performed by an FD configuration manager 1325 as described with reference to FIG. 13.

At 1915, the method may include transmitting, to the UE, an indication that at least a first symbol of the subset of symbols has a second configuration that is different from the first configuration for the first symbol. The operations of block 1915 may be performed in accordance with examples as disclosed herein. In some examples, aspects of the operations of 1915 may be performed by a dynamic FD update manager 1330 as described with reference to FIG. 13.

At 1920, the method may include communicating with the UE according to the second configuration of the first symbol. The operations of block 1920 may be performed in accordance with examples as disclosed herein. In some examples, aspects of the operations of 1920 may be performed by a scheduling manager 1335 as described with reference to FIG. 13.

FIG. 20 shows a flowchart illustrating a method 2000 that supports techniques for UE full-duplex operation in accordance with aspects of the present disclosure. The operations of the method 2000 may be implemented by a network entity or its components as described herein. For example, the operations of the method 2000 may be performed by a network entity as described with reference to FIGS. 1 through 6 and 11 through 14. In some examples, a network entity may execute a set of instructions to control the functional elements of the network entity to perform the described functions. Additionally, or alternatively, the network entity may perform aspects of the described functions using special-purpose hardware.

At 2005, the method may include receiving, from the UE, a UE capability message that indicates that the UE is capable to perform full-duplex communication at the UE, and that the UE is capable to update the UE full-duplex configuration for one or more symbols to fallback to the network full-duplex configuration or to a half-duplex symbol format configuration associated with the set of symbols. The operations of block 2005 may be performed in accordance with examples as disclosed herein. In some examples, aspects of the operations of 2005 may be performed by a capability manager 1350 as described with reference to FIG. 13.

At 2010, the method may include transmitting a half-duplex symbol format indication that indicates an uplink format, a downlink format, or a flexible format, for each symbol of the set of symbols, where the first symbol has the downlink format in the half-duplex symbol format indication, and where the network full-duplex configuration updates the half-duplex symbol format indication for the set of symbols for full-duplex communications at the network entity, and the UE full-duplex configuration corresponds to the network full-duplex configuration for the subset of symbols for full-duplex communications at the UE. The operations of block 2010 may be performed in accordance with examples as disclosed herein. In some examples, aspects of the operations of 2010 may be performed by an HD configuration manager 1340 as described with reference to FIG. 13.

At 2015, the method may include transmitting, to a UE, a network full-duplex configuration that indicates a set of symbols are configured for full-duplex communication at the network entity. The operations of block 2015 may be performed in accordance with examples as disclosed herein. In some examples, aspects of the operations of 2015 may be performed by an FD configuration manager 1325 as described with reference to FIG. 13.

At 2020, the method may include transmitting, to the UE, a UE full-duplex configuration that indicates at least a subset of the set of symbols have a first configuration for full-duplex communication at the UE, the subset of symbols including some or all of the set of symbols. The operations of block 2020 may be performed in accordance with examples as disclosed herein. In some examples, aspects of the operations of 2020 may be performed by an FD configuration manager 1325 as described with reference to FIG. 13.

At 2025, the method may include transmitting, to the UE, an indication that at least a first symbol of the subset of symbols has a second configuration that is different from the first configuration for the first symbol. The operations of block 2025 may be performed in accordance with examples as disclosed herein. In some examples, aspects of the operations of 2025 may be performed by a dynamic FD update manager 1330 as described with reference to FIG. 13.

At 2030, a first alternative of the method may include updating the first symbol to have the downlink format responsive to the indication that the first symbol has the second configuration, where both the network entity and the UE communicate using half-duplex communications for the first symbol. The operations of block 2030 may be performed in accordance with examples as disclosed herein. In some examples, aspects of the operations of 2030 may be performed by a dynamic FD update manager 1330 as described with reference to FIG. 13.

At 2035, a second alternative of the method may include updating the first symbol to have the network full-duplex configuration indicated for the first symbol responsive to the indication that the first symbol has the second configuration, where the network entity communicates using full-duplex communications for the first symbol and the UE communicates using half-duplex communications for the first symbol according to the downlink format. The operations of block 2035 may be performed in accordance with examples as disclosed herein. In some examples, aspects of the operations of 2035 may be performed by a dynamic FD update manager 1330 as described with reference to FIG. 13.

At 2040, the method may include communicating with the UE according to the second configuration of the first symbol. The operations of block 2040 may be performed in accordance with examples as disclosed herein. In some examples, aspects of the operations of 2040 may be performed by a scheduling manager 1335 as described with reference to FIG. 13.

FIG. 21 shows a flowchart illustrating a method 2100 that supports techniques for UE full-duplex operation in accordance with aspects of the present disclosure. The operations of the method 2100 may be implemented by a network entity or its components as described herein. For example, the operations of the method 2100 may be performed by a network entity as described with reference to FIGS. 1 through 6 and 11 through 14. In some examples, a network entity may execute a set of instructions to control the functional elements of the network entity to perform the described functions. Additionally, or alternatively, the network entity may perform aspects of the described functions using special-purpose hardware.

At 2105, the method may include receiving, from the UE, a UE capability message. The UE capability message may indicate that the UE is capable to perform SBFD communication at the UE, and that the UE is capable to update the UE full-duplex configuration for one or more symbols to fallback to the network full-duplex configuration, or to the downlink or flexible format half-duplex symbol format configuration associated with the set of symbols. The operations of block 2105 may be performed in accordance with examples as disclosed herein. In some examples, aspects of the operations of 2105 may be performed by a capability manager 1350 as described with reference to FIG. 13.

At 2110, the method may include transmitting a half-duplex symbol format indication. The half-duplex symbol format may provide an uplink format, a downlink format, or a flexible format, for each symbol of the set of symbols, and where the network full-duplex configuration updates the half-duplex symbol format for the set of symbols for full-duplex communications at the network entity, and the UE full-duplex configuration corresponds to the network full-duplex configuration for the subset of symbols for full-duplex communications at the UE, and where the first symbol has the flexible format in the half-duplex symbol format indication and the first symbol has a downlink and uplink network full-duplex configuration. The operations of block 2110 may be performed in accordance with examples as disclosed herein. In some examples, aspects of the operations of 2110 may be performed by an HD configuration manager 1340 as described with reference to FIG. 13.

At 2115, the method may include transmitting, to a UE, a network full-duplex configuration that indicates a set of symbols are configured for full-duplex communication at the network entity. The operations of block 2115 may be performed in accordance with examples as disclosed herein. In some examples, aspects of the operations of 2115 may be performed by an FD configuration manager 1325 as described with reference to FIG. 13.

At 2120, the method may include transmitting, to the UE, a UE full-duplex configuration that indicates at least a subset of the set of symbols have a first configuration for full-duplex communication at the UE, the subset of symbols including some or all of the set of symbols. The operations of block 2120 may be performed in accordance with examples as disclosed herein. In some examples, aspects of the operations of 2120 may be performed by an FD configuration manager 1325 as described with reference to FIG. 13.

At 2125, the method may include transmitting, to the UE, an indication that at least a first symbol of the subset of symbols has a second configuration that is different from the first configuration for the first symbol. The operations of block 2125 may be performed in accordance with examples as disclosed herein. In some examples, aspects of the operations of 2125 may be performed by a dynamic FD update manager 1330 as described with reference to FIG. 13.

At 2130, a first alternative of the method may include updating the first symbol to have the downlink format responsive to the indication that the first symbol has the second configuration, where both the network entity and the UE communicate using half-duplex communications for the first symbol. The operations of block 2130 may be performed in accordance with examples as disclosed herein. In some examples, aspects of the operations of 2130 may be performed by a dynamic FD update manager 1330 as described with reference to FIG. 13.

At 2135, a second alternative of the method may include updating the first symbol to have the flexible format responsive to the indication that the first symbol has the second configuration, where both the network entity and the UE communicate using half-duplex communications for the first symbol. The operations of block 2135 may be performed in accordance with examples as disclosed herein. In some examples, aspects of the operations of 2135 may be performed by a dynamic FD update manager 1330 as described with reference to FIG. 13.

At 2140, a third alternative of the method may include updating the first symbol to have the network full-duplex configuration indicated for the first symbol responsive to the indication that the first symbol has the updated configuration, where the network entity communicates using full-duplex communications for the first symbol and the UE communicates using half-duplex communications for the first symbol according to the downlink format or the flexible format. The operations of block 2140 may be performed in accordance with examples as disclosed herein. In some examples, aspects of the operations of 2140 may be performed by a dynamic FD update manager 1330 as described with reference to FIG. 13.

At 2145, the method may include communicating with the UE according to the second configuration of the first symbol. The operations of block 2145 may be performed in accordance with examples as disclosed herein. In some examples, aspects of the operations of 2145 may be performed by a scheduling manager 1335 as described with reference to FIG. 13.

Figure 22:
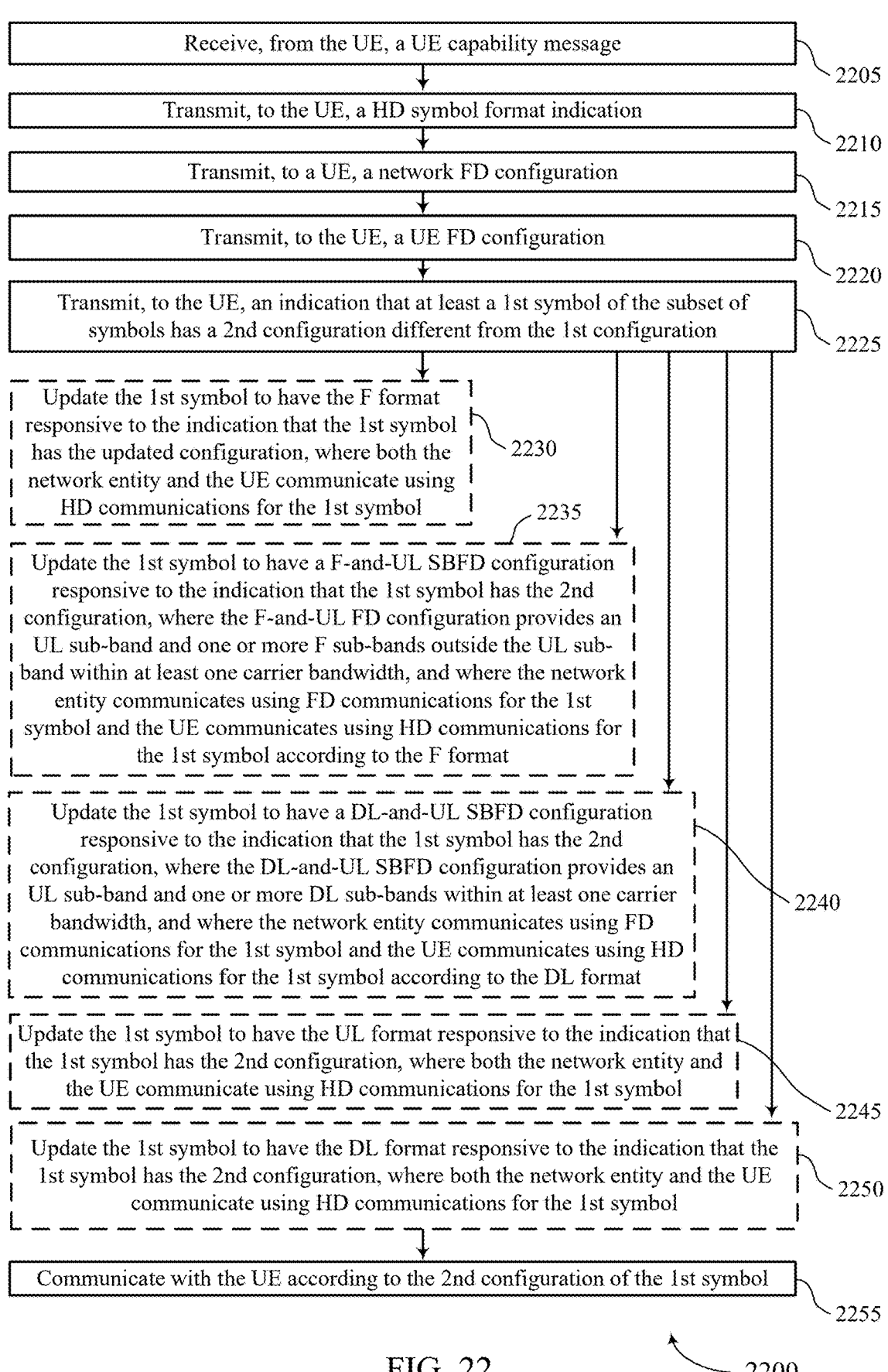

FIG. 22 shows a flowchart illustrating a method 2200 that supports techniques for UE full-duplex operation in accordance with aspects of the present disclosure. The operations of the method 2200 may be implemented by a network entity or its components as described herein. For example, the operations of the method 2200 may be performed by a network entity as described with reference to FIGS. 1 through 6 and 11 through 14. In some examples, a network entity may execute a set of instructions to control the functional elements of the network entity to perform the described functions. Additionally, or alternatively, the network entity may perform aspects of the described functions using special-purpose hardware.

At 2205, the method may include receiving, from the UE, a UE capability message. The UE capability message may indicate that the UE is capable to perform SBFD communication at the UE, and that the UE is capable to update the UE full-duplex configuration for one or more symbols to fallback to a network a downlink-and-uplink SBFD configuration, to a network a flexible-and-uplink SBFD configuration, or to the downlink, uplink, or flexible format half-duplex symbol format configuration associated with the set of symbols. The operations of block 2205 may be performed in accordance with examples as disclosed herein. In some examples, aspects of the operations of 2205 may be performed by a capability manager 1350 as described with reference to FIG. 13.

At 2210, the method may include transmitting, to the UE, a half-duplex symbol format indication. The half-duplex symbol format indication may provide an uplink format, a downlink format, or a flexible format, for each symbol of the set of symbols, where the network full-duplex configuration updates the half-duplex symbol format indication for the set of symbols for full-duplex communications at the network entity, and the UE full-duplex configuration corresponds to the network full-duplex configuration for the subset of symbols for full-duplex communications at the UE, and where the first symbol has the flexible format in the half-duplex symbol format indication and the first symbol has a flexible-and-uplink network full-duplex configuration. The operations of block 2210 may be performed in accordance with examples as disclosed herein. In some examples, aspects of the operations of 2210 may be performed by an HD configuration manager 1340 as described with reference to FIG. 13.

At 2215, the method may include transmitting, to a UE, a network full-duplex configuration. The network full-duplex configuration may indicate a set of symbols are configured for full-duplex communication at the network entity. The operations of block 2215 may be performed in accordance with examples as disclosed herein. In some examples, aspects of the operations of 2215 may be performed by an FD configuration manager 1325 as described with reference to FIG. 13.

At 2220, the method may include transmitting, to the UE, a UE full-duplex configuration. The UE full-duplex configuration may indicate at least a subset of the set of symbols have a first configuration for full-duplex communication at the UE, the subset of symbols including some or all of the set of symbols. The operations of block 2220 may be performed in accordance with examples as disclosed herein. In some examples, aspects of the operations of 2220 may be performed by an FD configuration manager 1325 as described with reference to FIG. 13.

At 2225, the method may include transmitting, to the UE, an indication that at least a first symbol of the subset of symbols has a second configuration that is different from the first configuration for the first symbol. The operations of block 2225 may be performed in accordance with examples as disclosed herein. In some examples, aspects of the operations of 2225 may be performed by a dynamic FD update manager 1330 as described with reference to FIG. 13.

At 2230, a first alternative of the method may include updating the first symbol to have the flexible format responsive to the indication that the first symbol has the updated configuration, where both the network entity and the UE communicate using half-duplex communications for the first symbol. The operations of block 2230 may be performed in accordance with examples as disclosed herein. In some examples, aspects of the operations of 2230 may be performed by a dynamic FD update manager 1330 as described with reference to FIG. 13.

At 2235, a second alternative of the method may include updating the first symbol to have a flexible-and-uplink SBFD configuration responsive to the indication that the first symbol has the second configuration, where the flexibleand-uplink full-duplex configuration provides an uplink sub-band and one or more flexible sub-bands outside the uplink sub-band within at least one carrier bandwidth, and where the network entity communicates using full-duplex communications for the first symbol and the UE communicates using half-duplex communications for the first symbol according to the flexible format. The operations of block 2235 may be performed in accordance with examples as disclosed herein. In some examples, aspects of the operations of 2235 may be performed by a dynamic FD update manager 1330 as described with reference to FIG. 13.

At 2240, a third alternative of the method may include updating the first symbol to have a downlink-and-uplink SBFD configuration responsive to the indication that the first symbol has the second configuration, where the downlink-and-uplink SBFD configuration provides an uplink sub-band and one or more downlink sub-bands within at least one carrier bandwidth, and where the network entity communicates using full-duplex communications for the first symbol and the UE communicates using half-duplex communications for the first symbol according to the downlink format. The operations of block 2240 may be performed in accordance with examples as disclosed herein. In some examples, aspects of the operations of 2240 may be performed by a dynamic FD update manager 1330 as described with reference to FIG. 13.

At 2245, a fourth alternative of the method may include updating the first symbol to have the uplink format responsive to the indication that the first symbol has the second configuration, where both the network entity and the UE communicate using half-duplex communications for the first symbol. The operations of block 2245 may be performed in accordance with examples as disclosed herein. In some examples, aspects of the operations of 2245 may be performed by a dynamic FD update manager 1330 as described with reference to FIG. 13.

At 2250, a fifth alternative of the method may include updating the first symbol to have the downlink format responsive to the indication that the first symbol has the second configuration, where both the network entity and the UE communicate using half-duplex communications for the first symbol. The operations of block 2250 may be performed in accordance with examples as disclosed herein. In some examples, aspects of the operations of 2250 may be performed by a dynamic FD update manager 1330 as described with reference to FIG. 13.

At 2255, the method may include communicating with the UE according to the second configuration of the first symbol. The operations of block 2255 may be performed in accordance with examples as disclosed herein. In some examples, aspects of the operations of 2255 may be performed by a scheduling manager 1335 as described with reference to FIG. 13.

The following provides an overview of aspects of the present disclosure:

Aspect 1: A method for wireless communications at a UE, comprising: receiving a network full-duplex configuration that indicates a set of symbols are configured for full-duplex communication at a network entity; receiving a UE full-duplex configuration that indicates at least a subset of the set of symbols have a first configuration for full-duplex communication at the UE, the subset of symbols including some or all of the set of symbols; receiving an indication that at least a first symbol of the subset of symbols has a second configuration that is different from the first configuration for the first symbol; and communicating with the network entity according to the second configuration of the first symbol.

Aspect 2: The method of aspect 1, further comprising: receiving a half-duplex symbol format indication that indicates an uplink format, a downlink format, or a flexible format, for each symbol of the set of symbols, wherein the first symbol has the downlink format in the half-duplex symbol format indication, and wherein the network full-duplex configuration updates the half-duplex symbol format indication for the set of symbols for full-duplex communications at the network entity, and the UE full-duplex configuration corresponds to the network full-duplex configuration for the subset of symbols for full-duplex communications at the UE.

Aspect 3: The method of aspect 2, further comprising: updating the first symbol to have the downlink format responsive to the indication that the first symbol has the second configuration, wherein both the network entity and the UE communicate using half-duplex communications for the first symbol.

Aspect 4: The method of aspect 2, further comprising: updating the first symbol to have the network full-duplex configuration indicated for the first symbol responsive to the indication that the first symbol has the second configuration, wherein the network entity communicates using full-duplex communications for the first symbol and the UE communicates using half-duplex communications for the first symbol according to the network full-duplex configuration.

Aspect 5: The method of any of aspects 1 through 4, wherein the network full-duplex configuration is a sub-band full-duplex configurations in which at least a first sub-band of a component carrier bandwidth is configured for downlink communications and at least a second sub-band of the component carrier bandwidth or another component carrier is configured for uplink communications.

Aspect 6: The method of any of aspects 1 through 5, wherein the UE full-duplex configuration is a sub-band full-duplex configuration in which at least a first sub-band of a component carrier bandwidth is configured for downlink communications and at least a second sub-band of the component carrier bandwidth or another component carrier is configured for uplink communications.

Aspect 7: The method of any of aspects 1 through 6, further comprising: transmitting a UE capability message that indicates that the UE is capable to perform full-duplex communication at the UE, and that the UE is capable to update the UE full-duplex configuration for one or more symbols to fallback to the network full-duplex configuration or to a half-duplex symbol format configuration associated with the set of symbols.

Aspect 8: The method of aspect 1, further comprising: receiving a half-duplex symbol format indication that indicates an uplink format, a downlink format, or a flexible format, for each symbol of the set of symbols, wherein the first symbol has the flexible format in the half-duplex symbol format indication and the first symbol has a downlink-and-uplink network full-duplex configuration, and wherein the network full-duplex configuration updates the half-duplex symbol format for the set of symbols for full-duplex communications at the network entity, and the UE full-duplex configuration corresponds to the network full-duplex configuration for the subset of symbols for full-duplex communications at the UE.

Aspect 9: The method of aspect 8, further comprising: updating the first symbol to have the downlink format responsive to the indication that the first symbol has the second configuration, wherein both the network entity and the UE communicate using half-duplex communications for the first symbol.

Aspect 10: The method of aspect 8, further comprising: updating the first symbol to have the flexible format responsive to the indication that the first symbol has the second configuration, wherein both the network entity and the UE communicate using half-duplex communications for the first symbol.

Aspect 11: The method of aspect 8, further comprising: updating the first symbol to have the network full-duplex configuration indicated for the first symbol responsive to the indication that the first symbol has the second configuration, wherein the network entity communicates using full-duplex communications for the first symbol and the UE communicates using half-duplex communications for the first symbol according to the downlink format or the flexible format.

Aspect 12: The method of any of aspects 8 through 11, further comprising: transmitting a UE capability message that indicates that the UE is capable to perform sub-band full-duplex communication at the UE, and that the UE is capable to update the UE full-duplex configuration for one or more symbols to fallback to the network full-duplex configuration, or to the downlink or flexible format half-duplex symbol format configuration associated with the set of symbols.

Aspect 13: The method of aspect 1, further comprising: receiving a half-duplex symbol format indication that indicates an uplink format, a downlink format, or a flexible format, for each symbol of the set of symbols, wherein the first symbol has the flexible format in the half-duplex symbol format indication, and wherein the network full-duplex configuration updates the half-duplex symbol format indication for the set of symbols for sub-band full-duplex communications at the network entity to provide that the first symbol has a flexible-and-uplink network sub-band full-duplex configuration, and the UE full-duplex configuration corresponds to the network full-duplex configuration for the subset of symbols for sub-band full-duplex communications at the UE.

Aspect 14: The method of aspect 13, further comprising: updating the first symbol to have the flexible format responsive to the indication that the first symbol has the second configuration, wherein both the network entity and the UE communicate using half-duplex communications for the first symbol.

Aspect 15: The method of aspect 13, further comprising: updating the first symbol to have a flexible-and-uplink sub-band full-duplex configuration responsive to the indication that the first symbol has the second configuration, wherein the flexible-and-uplink sub-band full-duplex configuration provides an uplink sub-band and one or more flexible sub-bands outside the uplink sub-band within at least one carrier bandwidth, and wherein the network entity communicates using full-duplex communications for the first symbol and the UE communicates using half-duplex communications for the first symbol according to the flexible format.

Aspect 16: The method of aspect 13, further comprising: updating the first symbol to have a downlink-and-uplink sub-band full-duplex configuration responsive to the indication that the first symbol has the second configuration, wherein the downlink-and-uplink sub-band full-duplex configuration provides an uplink sub-band and one or more downlink sub-bands within at least one carrier bandwidth, and wherein the network entity communicates using full-duplex communications for the first symbol and the UE communicates using half-duplex communications for the first symbol according to the downlink format.

Aspect 17: The method of aspect 13, further comprising: updating the first symbol to have the uplink format responsive to the indication that the first symbol has the second configuration, wherein both the network entity and the UE communicate using half-duplex communications for the first symbol.

Aspect 18: The method of aspect 13, further comprising: updating the first symbol to have the downlink format responsive to the indication that the first symbol has the second configuration, wherein both the network entity and the UE communicate using half-duplex communications for the first symbol.

Aspect 19: The method of any of aspects 13 through 18, further comprising: transmitting a UE capability message that indicates that the UE is capable to perform sub-band full-duplex communication at the UE, and that the UE is capable to update the UE full-duplex configuration for one or more symbols to fallback to a network a downlink-and-uplink sub-band full-duplex configuration, to a network a flexible-and-uplink sub-band full-duplex configuration, or to the downlink, uplink, or flexible format half-duplex symbol format configuration associated with the set of symbols.

Aspect 20: The method of any of aspects 1 through 19, wherein the receiving the indication comprises: receiving a scheduling DCI communication that schedules downlink or uplink communications outside of a sub-band that is configured for downlink or uplink communications in the UE full-duplex configuration for at least the first symbol.

Aspect 21: The method of any of aspects 1 through 20, wherein the receiving the indication comprises: receiving a non-scheduling DCI communication that indicates whether the first symbol is to be used for UE full-duplex communications or for UE half-duplex communications.

Aspect 22: The method of any of aspects 1 through 21, wherein the receiving the indication comprises: receiving a MAC-CE that indicates whether the first symbol is to be used for UE full-duplex communications or for UE half-duplex communications.

Aspect 23: The method of any of aspects 1 through 22, wherein the receiving the indication comprises: receiving DCI that indicates that at least the first symbol has the second configuration, the DCI provided in a group common DCI communication, a DCI communication that schedules data, a DCI communication that does not schedule data, or a prespecified DCI communication associated with full-duplex communications.

Aspect 24: The method of aspect 23, wherein the DCI indicates one or more symbols are updated or indicates the second configuration is valid until a subsequent updated configuration is provided.

Aspect 25: The method of any of aspects 1 through 24, wherein the receiving the indication comprises: receiving a MAC-CE that indicates that at least the first symbol has the second configuration, and that indicates one or more symbols that are updated or that the second configuration is valid until a subsequent updated configuration is provided.

Aspect 26: The method of any of aspects 1 through 25, wherein the receiving the indication comprises: receiving a scheduling DCI communication that schedules a channel or reference signal transmission for one or more symbols, and wherein the indication that at least the first symbol has the second configuration is based at least in part on the channel or reference signal transmission that is scheduled.

Aspect 27: The method of any of aspects 1 through 26, wherein the indication that at least the first symbol of the subset of symbols has the second configuration provides one or more of a change to a periodic pattern of the UE full-duplex configuration for the subset of symbols, an updated semi-persistent UE full-duplex configuration for the subset of symbols, or the second configuration that is maintained until a subsequent update of the UE full-duplex configuration.

Aspect 28: The method of aspect 27, wherein the indication includes one or more of a bitmap that indicates a pattern of symbols that have the UE full-duplex configuration, a predefined pattern identification that indicates the pattern of symbols that have the UE full-duplex configuration, or an offset and length of the subset of symbols that have the UE full-duplex configuration.

Aspect 29: The method of any of aspects 1 through 28, wherein the indication that at least the first symbol of the subset of symbols has the second configuration provides the second configuration for a single occasion of the subset of symbols, or for multiple occasions of the subset of symbols.

Aspect 30: The method of aspect 29, wherein the indication provides an identification of one or more symbols associated with the single occasion with the second configuration, or provides a time window during which the multiple occasions of subset of symbols have the second configuration.

Aspect 31: The method of any of aspects 1 through 30, wherein the first symbol is applied based at least in part on a time duration from a receipt of the indication, a time duration from transmission of an acknowledgment of the indication, a time duration indicated in configuration or control information signaling, or a time duration indicated in a reported UE capability.

Aspect 32: The method of any of aspects 1 through 31, wherein the indication that at least the first symbol of the subset of symbols has the second configuration is applied to one CC, one or more CCs in a CC list, or in a different CC than a CC used to provide the indication.

Aspect 33: A method for wireless communications at a network entity, comprising: transmitting, to a UE, a network full-duplex configuration that indicates a set of symbols are configured for full-duplex communication at the network entity; transmitting, to the UE, a UE full-duplex configuration that indicates at least a subset of the set of symbols have a first configuration for full-duplex communication at the UE, the subset of symbols including some or all of the set of symbols; transmitting, to the UE, an indication that at least a first symbol of the subset of symbols has a second configuration that is different from the first configuration for the first symbol; and communicating with the UE according to the second configuration of the first symbol.

Aspect 34: The method of aspect 33, further comprising: transmitting a half-duplex symbol format indication that indicates an uplink format, a downlink format, or a flexible format, for each symbol of the set of symbols, wherein the first symbol has the downlink format in the half-duplex symbol format indication, and wherein the network full-duplex configuration updates the half-duplex symbol format indication for the set of symbols for full-duplex communications at the network entity, and the UE full-duplex configuration corresponds to the network full-duplex configuration for the subset of symbols for full-duplex communications at the UE.

Aspect 35: The method of aspect 34, further comprising: updating the first symbol to have the downlink format responsive to the indication that the first symbol has the second configuration, wherein both the network entity and the UE communicate using half-duplex communications for the first symbol.

Aspect 36: The method of aspect 34, further comprising: updating the first symbol to have the network full-duplex configuration indicated for the first symbol responsive to the indication that the first symbol has the second configuration, wherein the network entity communicates using full-duplex communications for the first symbol and the UE communicates using half-duplex communications for the first symbol according to the downlink format.

Aspect 37: The method of any of aspects 33 through 36, wherein the network full-duplex configuration is a sub-band full-duplex configuration in which at least a first sub-band of a component carrier bandwidth is configured for downlink communications and at least a second sub-band of the component carrier bandwidth is configured form uplink communications.

Aspect 38: The method of any of aspects 33 through 37, wherein the UE full-duplex configuration is a sub-band full-duplex configuration in which at least a first sub-band of a component carrier bandwidth is configured for downlink communications and at least a second sub-band of the component carrier bandwidth or another component carrier is configured for uplink communications.

Aspect 39: The method of any of aspects 33 through 38, further comprising: receiving, from the UE, a UE capability message that indicates that the UE is capable to perform full-duplex communication at the UE, and that the UE is capable to update the UE full-duplex configuration for one or more symbols to fallback to the network full-duplex configuration or to a half-duplex symbol format configuration associated with the set of symbols.

Aspect 40: The method of aspect 33, further comprising: transmitting a half-duplex symbol format indication that indicates an uplink format, a downlink format, or a flexible format, for each symbol of the set of symbols, and wherein the network full-duplex configuration updates the half-duplex symbol format for the set of symbols for full-duplex communications at the network entity, and the UE full-duplex configuration corresponds to the network full-duplex configuration for the subset of symbols for full-duplex communications at the UE, and wherein the first symbol has the flexible format in the half-duplex symbol format indication and the first symbol has a downlink and uplink network full-duplex configuration.

Aspect 41: The method of aspect 40, further comprising: updating the first symbol to have the downlink format responsive to the indication that the first symbol has the second configuration, wherein both the network entity and the UE communicate using half-duplex communications for the first symbol.

Aspect 42: The method of aspect 40, further comprising: updating the first symbol to have the flexible format responsive to the indication that the first symbol has the second configuration, wherein both the network entity and the UE communicate using half-duplex communications for the first symbol.

Aspect 43: The method of aspect 40, further comprising: updating the first symbol to have the network full-duplex configuration indicated for the first symbol responsive to the indication that the first symbol has the updated configuration, wherein the network entity communicates using full-duplex communications for the first symbol and the UE communicates using half-duplex communications for the first symbol according to the downlink format or the flexible format.

Aspect 44: The method of any of aspects 40 through 43, further comprising: receiving, from the UE, a UE capability message that indicates that the UE is capable to perform sub-band full-duplex communication at the UE, and that the UE is capable to update the UE full-duplex configuration for one or more symbols to fallback to the network full-duplex configuration, or to the downlink or flexible format half-duplex symbol format configuration associated with the set of symbols.

Aspect 45: The method of aspect 33, further comprising: transmitting, to the UE, a half-duplex symbol format indication that indicates an uplink format, a downlink format, or a flexible format, for each symbol of the set of symbols, wherein the network full-duplex configuration updates the half-duplex symbol format indication for the set of symbols for full-duplex communications at the network entity, and the UE full-duplex configuration corresponds to the network full-duplex configuration for the subset of symbols for full-duplex communications at the UE, and wherein the first symbol has the flexible format in the half-duplex symbol format indication and the first symbol has a flexible-and-uplink network full-duplex configuration.

Aspect 46: The method of aspect 45, further comprising: updating the first symbol to have the flexible format responsive to the indication that the first symbol has the updated configuration, wherein both the network entity and the UE communicate using half-duplex communications for the first symbol.

Aspect 47: The method of aspect 45, further comprising: updating the first symbol to have a flexible-and-uplink sub-band full-duplex configuration responsive to the indication that the first symbol has the second configuration, wherein the flexible-and-uplink full-duplex configuration provides an uplink sub-band and one or more flexible sub-bands outside the uplink sub-band within at least one carrier bandwidth, and wherein the network entity communicates using full-duplex communications for the first symbol and the UE communicates using half-duplex communications for the first symbol according to the flexible format.

Aspect 48: The method of aspect 45, further comprising: updating the first symbol to have a downlink-and-uplink sub-band full-duplex configuration responsive to the indication that the first symbol has the second configuration, wherein the downlink-and-uplink sub-band full-duplex configuration provides an uplink sub-band and one or more downlink sub-bands within at least one carrier bandwidth, and wherein the network entity communicates using full-duplex communications for the first symbol and the UE communicates using half-duplex communications for the first symbol according to the downlink format.

Aspect 49: The method of aspect 45, further comprising: updating the first symbol to have the uplink format responsive to the indication that the first symbol has the second configuration, wherein both the network entity and the UE communicate using half-duplex communications for the first symbol.

Aspect 50: The method of aspect 45, further comprising: updating the first symbol to have the downlink format responsive to the indication that the first symbol has the second configuration, wherein both the network entity and the UE communicate using half-duplex communications for the first symbol.

Aspect 51: The method of any of aspects 45 through 50, further comprising: receiving, from the UE, a UE capability message that indicates that the UE is capable to perform sub-band full-duplex communication at the UE, and that the UE is capable to update the UE full-duplex configuration for one or more symbols to fallback to a network a downlink-and-uplink sub-band full-duplex configuration, to a network a flexible-and-uplink sub-band full-duplex configuration, or to the downlink, uplink, or flexible format half-duplex symbol format configuration associated with the set of symbols.

Aspect 52: The method of any of aspects 33 through 51, wherein the transmitting the indication comprises: transmitting a scheduling DCI communication that schedules downlink or uplink communications outside of a sub-band that is configured for downlink or uplink communications in the UE full-duplex configuration for at least the first symbol.

Aspect 53: The method of any of aspects 33 through 52, wherein the transmitting the indication comprises: transmitting a non-scheduling DCI communication that indicates whether the first symbol is to be used for UE full-duplex communications or for UE half-duplex communications.

Aspect 54: The method of any of aspects 33 through 53, wherein the transmitting the indication comprises: transmitting a MAC-CE that indicates whether the first symbol is to be used for UE full-duplex communications or for UE half-duplex communications.

Aspect 55: The method of any of aspects 33 through 54, wherein the transmitting the indication comprises: transmitting DCI that indicates that at least the first symbol has the second configuration, the DCI provided in a group common DCI communication, a DCI communication that schedules data, a DCI communication that does not schedule data, or a prespecified DCI communication associated with full-duplex communications.

Aspect 56: The method of aspect 55, wherein the DCI indicates one or more symbols are updated or indicates the second configuration is valid until a subsequent updated configuration is provided.

Aspect 57: The method of any of aspects 33 through 56, wherein the transmitting the indication comprises: transmitting a MAC-CE that indicates that at least the first symbol has the second configuration, and that indicates one or more symbols that are updated or that the second configuration is valid until a subsequent updated configuration is provided.

Aspect 58: The method of any of aspects 33 through 57, wherein the transmitting the indication comprises: transmitting a scheduling DCI communication that schedules a channel or reference signal transmission for one or more symbols, and wherein the indication that at least the first symbol has the second configuration is based at least in part on the channel or reference signal transmission that is scheduled.

Aspect 59: The method of any of aspects 33 through 58, wherein the indication that at least the first symbol of the subset of symbols has the second configuration provides one or more of a change to a periodic pattern of the UE full-duplex configuration for the subset of symbols, an updated semi-persistent UE full-duplex configuration for the subset of symbols, or the second configuration that is maintained until a subsequent update of the UE full-duplex configuration.

Aspect 60: The method of aspect 59, wherein the indication includes one or more of a bitmap that indicates a pattern of symbols that have the UE full-duplex configuration, a predefined pattern identification that indicates the pattern of symbols that have the UE full-duplex configuration, or an offset and length of the subset of symbols that have the UE full-duplex configuration.

Aspect 61: The method of any of aspects 33 through 60, wherein the indication that at least the first symbol of the subset of symbols has the second configuration provides the second configuration for a single occasion of the subset of symbols, or for multiple occasions of the subset of symbols.

Aspect 62: The method of aspect 61, wherein the indication provides an identification of one or more symbols associated with the single occasion with the second configuration, or provides a time window during which the multiple occasions of subset of symbols have the second configuration.

Aspect 63: The method of any of aspects 33 through 62, wherein the first symbol is applied based at least in part on a time duration from a receipt of the indication, a time duration from transmission of an acknowledgment of the indication, a time duration indicated in configuration or control information signaling, or a time duration indicated in a reported UE capability.

Aspect 64: The method of any of aspects 33 through 63, wherein the indication that at least the first symbol of the subset of symbols has the second configuration is applied to one CC, one or more CCs in a CC list, or in a different CC than a CC used to provide the indication.

Aspect 65: A UE for wireless communications, comprising one or more memories storing processor-executable code, and one or more processors coupled with the one or more memories and individually or collectively operable to execute the code to cause the UE to perform a method of any of aspects 1 through 32.

Aspect 66: A UE for wireless communications, comprising at least one means for performing a method of any of aspects 1 through 32.

Aspect 67: A non-transitory computer-readable medium storing code for wireless communications, the code comprising instructions executable by a processor to perform a method of any of aspects 1 through 32.

Aspect 68: A network entity for wireless communications, comprising one or more memories storing processor-executable code, and one or more processors coupled with the one or more memories and individually or collectively operable to execute the code to cause the network entity to perform a method of any of aspects 33 through 64.

Aspect 69: A network entity for wireless communications, comprising at least one means for performing a method of any of aspects 33 through 64.

Aspect 70: A non-transitory computer-readable medium storing code for wireless communications, the code comprising instructions executable by a processor to perform a method of any of aspects 33 through 64.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Any functions or operations described herein as being capable of being performed by a processor may be performed by multiple processors that, individually or collectively, are capable of performing the described functions or operations.

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media. Any functions or operations described herein as being capable of being performed by a memory may be performed by multiple memories that, individually or collectively, are capable of performing the described functions or operations.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

As used herein, including in the claims, the article "a" before a noun is open-ended and understood to refer to "at least one" of those nouns or "one or more" of those nouns. Thus, the terms "a," "at least one," "one or more," "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A user equipment (UE), comprising:
   one or more memories storing processor-executable code; and
   one or more processors coupled with the one or more memories and individually or collectively operable to execute the code to cause the UE to:
   receive a network full-duplex configuration that indicates a set of symbols are configured for full-duplex communication at a network entity;
   receive a UE full-duplex configuration that indicates at least a subset of the set of symbols of the network full-duplex configuration have a first configuration for full-duplex communication at the UE, the subset of the set of symbols including some or all of the set of symbols;
   receive an indication that at least a first symbol of the subset of the set of symbols has a second configuration that is different from the first configuration for the first symbol; and
   communicate with the network entity according to the second configuration of the first symbol.

2. The UE of claim 1, wherein the one or more processors are individually or collectively further operable to execute the code to cause the UE to:
   receive a half-duplex symbol format indication that indicates an uplink format, a downlink format, or a flexible format, for each symbol of the set of symbols, wherein the first symbol has the downlink format in the half-duplex symbol format indication, and wherein the network full-duplex configuration updates the half-duplex symbol format indication for the set of symbols for full-duplex communications at the network entity, and the UE full-duplex configuration corresponds to the network full-duplex configuration for the subset of the set of symbols for full-duplex communications at the UE.

3. The UE of claim 2, wherein the one or more processors are individually or collectively further operable to execute the code to cause the UE to:
   update the first symbol to have the downlink format responsive to the indication that the first symbol has the second configuration, wherein both the network entity and the UE communicate using half-duplex communications for the first symbol.

4. The UE of claim 2, wherein the one or more processors are individually or collectively further operable to execute the code to cause the UE to:
   update the first symbol to have the network full-duplex configuration indicated for the first symbol responsive to the indication that the first symbol has the second configuration, wherein the network entity communicates using full-duplex communications for the first symbol and the UE communicates using half-duplex communications for the first symbol according to the network full-duplex configuration.

5. The UE of claim 1, wherein the network full-duplex configuration is a sub-band full-duplex configuration in which at least a first sub-band of a component carrier bandwidth is configured for downlink communications and at least a second sub-band of the component carrier bandwidth or another component carrier is configured for uplink communications.

6. The UE of claim 1, wherein the UE full-duplex configuration is a sub-band full-duplex configuration in which at least a first sub-band of a component carrier bandwidth is configured for downlink communications and at least a second sub-band of the component carrier bandwidth or another component carrier is configured for uplink communications.

7. The UE of claim 1, wherein the one or more processors are individually or collectively further operable to execute the code to cause the UE to:

transmit a UE capability message that indicates that the UE is capable to perform full-duplex communication at the UE, and that the UE is capable to update the UE full-duplex configuration for one or more symbols to fallback to the network full-duplex configuration or to a half-duplex symbol format configuration associated with the set of symbols.

8. The UE of claim 1, wherein the one or more processors are individually or collectively further operable to execute the code to cause the UE to:

receive a half-duplex symbol format indication that indicates an uplink format, a downlink format, or a flexible format, for each symbol of the set of symbols, wherein the first symbol has the flexible format in the half-duplex symbol format indication and the first symbol has a downlink-and-uplink network full-duplex configuration, and wherein the network full-duplex configuration updates a half-duplex symbol format for the set of symbols for full-duplex communications at the network entity, and the UE full-duplex configuration corresponds to the network full-duplex configuration for the subset of the set of symbols for full-duplex communications at the UE.

9. The UE of claim 8, wherein the one or more processors are individually or collectively further operable to execute the code to cause the UE to:

update the first symbol to have the downlink format responsive to the indication that the first symbol has the second configuration, wherein both the network entity and the UE communicate using half-duplex communications for the first symbol.

10. The UE of claim 8, wherein the one or more processors are individually or collectively further operable to execute the code to cause the UE to:

update the first symbol to have the flexible format responsive to the indication that the first symbol has the second configuration, wherein both the network entity and the UE communicate using half-duplex communications for the first symbol.

11. The UE of claim 8, wherein the one or more processors are individually or collectively further operable to execute the code to cause the UE to:

update the first symbol to have the network full-duplex configuration indicated for the first symbol responsive to the indication that the first symbol has the second configuration, wherein the network entity communicates using full-duplex communications for the first symbol and the UE communicates using half-duplex communications for the first symbol according to the downlink format or the flexible format.

12. The UE of claim 1, wherein the one or more processors are individually or collectively further operable to execute the code to cause the UE to:

receive a half-duplex symbol format indication that indicates an uplink format, a downlink format, or a flexible format, for each symbol of the set of symbols, wherein the first symbol has the flexible format in the half-duplex symbol format indication, and wherein the network full-duplex configuration updates the half-duplex symbol format indication for the set of symbols for sub-band full-duplex communications at the network entity to provide that the first symbol has a flexible-and-uplink network sub-band full-duplex configuration, and the UE full-duplex configuration corresponds to the network full-duplex configuration for the subset of the set of symbols for sub-band full-duplex communications at the UE.

13. The UE of claim 12, wherein the one or more processors are individually or collectively further operable to execute the code to cause the UE to:

update the first symbol to have the flexible format responsive to the indication that the first symbol has the second configuration, wherein both the network entity and the UE communicate using half-duplex communications for the first symbol.

14. The UE of claim 12, wherein the one or more processors are individually or collectively further operable to execute the code to cause the UE to:

update the first symbol to have a flexible-and-uplink sub-band full-duplex configuration responsive to the indication that the first symbol has the second configuration, wherein the flexible-and-uplink sub-band full-duplex configuration provides an uplink sub-band and one or more flexible sub-bands outside the uplink sub-band within at least one carrier bandwidth, and wherein the network entity communicates using full-duplex communications for the first symbol and the UE communicates using half-duplex communications for the first symbol according to the flexible format.

15. The UE of claim 12, wherein the one or more processors are individually or collectively further operable to execute the code to cause the UE to:

update the first symbol to have a downlink-and-uplink sub-band full-duplex configuration responsive to the indication that the first symbol has the second configuration, wherein the downlink-and-uplink sub-band full-duplex configuration provides an uplink sub-band and one or more downlink sub-bands within at least one carrier bandwidth, and wherein the network entity communicates using full-duplex communications for the first symbol and the UE communicates using half-duplex communications for the first symbol according to the downlink format.

16. The UE of claim 12, wherein the one or more processors are individually or collectively further operable to execute the code to cause the UE to:

update the first symbol to have the uplink format responsive to the indication that the first symbol has the second configuration, wherein both the network entity and the UE communicate using half-duplex communications for the first symbol.

17. The UE of claim 12, wherein the one or more processors are individually or collectively further operable to execute the code to cause the UE to:

update the first symbol to have the downlink format responsive to the indication that the first symbol has the second configuration, wherein both the network entity and the UE communicate using half-duplex communications for the first symbol.

18. The UE of claim 1, wherein, to receive the indication, the one or more processors are individually or collectively operable to execute the code to cause the UE to:

receive a scheduling downlink control information (DCI) communication that schedules downlink or uplink communications outside of a sub-band that is configured for downlink or uplink communications in the UE full-duplex configuration for at least the first symbol.

19. The UE of claim 1, wherein, to receive the indication, the one or more processors are individually or collectively operable to execute the code to cause the UE to:

receive a medium access control (MAC) control element (CE) that indicates whether the first symbol is to be used for UE full-duplex communications or for UE half-duplex communications.

20. The UE of claim 1, wherein the indication that at least the first symbol of the subset of the set of symbols has the second configuration provides one or more of a change to a periodic pattern of the UE full-duplex configuration for the subset of the set of symbols, an updated semi-persistent UE full-duplex configuration for the subset of the set of symbols, or the second configuration that is maintained until a subsequent update of the UE full-duplex configuration.

21. The UE of claim 1, wherein the indication that at least the first symbol of the subset of the set of symbols has the second configuration provides the second configuration for a single occasion of the subset of the set of symbols, or for multiple occasions of the subset of the set of symbols.

22. The UE of claim 1, wherein the indication that at least the first symbol of the subset of the set of symbols has the second configuration is applied to one component carrier (CC), one or more CCs in a CC list, or in a different CC than a CC used to provide the indication.

23. A network entity, comprising:

one or more memories storing processor-executable code; and one or more processors coupled with the one or more memories and individually or collectively operable to execute the code to cause the network entity to:

transmit, to a user equipment (UE), a network full-duplex configuration that indicates a set of symbols are configured for full-duplex communication at the network entity;

transmit, to the UE, a UE full-duplex configuration that indicates at least a subset of the set of symbols of the network full-duplex configuration have a first configuration for full-duplex communication at the UE, the subset of the set of symbols including some or all of the set of symbols;

transmit, to the UE, an indication that at least a first symbol of the subset of the set of symbols has a second configuration that is different from the first configuration for the first symbol; and communicate with the UE according to the second configuration of the first symbol.

24. The network entity of claim 23, wherein the one or more processors are individually or collectively further operable to execute the code to cause the network entity to:

transmit a half-duplex symbol format indication that indicates an uplink format, a downlink format, or a flexible format, for each symbol of the set of symbols, wherein the first symbol has the downlink format in the half-duplex symbol format indication, and wherein the network full-duplex configuration updates the half-duplex symbol format indication for the set of symbols for full-duplex communications at the network entity, and the UE full-duplex configuration corresponds to the network full-duplex configuration for the subset of the set of symbols for full-duplex communications at the UE.

25. The network entity of claim 23, wherein the network full-duplex configuration is a sub-band full-duplex configuration in which at least a first sub-band of a component carrier bandwidth is configured for downlink communications and at least a second sub-band of the component carrier bandwidth is configured form uplink communications.

26. The network entity of claim 23, wherein, to transmit the indication, the one or more processors are individually or collectively operable to execute the code to cause the network entity to:

transmit a scheduling downlink control information (DCI) communication that schedules downlink or uplink communications outside of a sub-band that is configured for downlink or uplink communications in the UE full-duplex configuration for at least the first symbol.

27. The network entity of claim 23, wherein the indication that at least the first symbol of the subset of the set of symbols has the second configuration is applied to one component carrier (CC), one or more CCs in a CC list, or in a different CC than a CC used to provide the indication.

28. A method for wireless communications at a user equipment (UE), comprising:

receiving a network full-duplex configuration that indicates a set of symbols are configured for full-duplex communication at a network entity;

receiving a UE full-duplex configuration that indicates at least a subset of the set of symbols of the network full-duplex configuration have a first configuration for full-duplex communication at the UE, the subset of the set of symbols including some or all of the set of symbols;

receiving an indication that at least a first symbol of the subset of the set of symbols has a second configuration that is different from the first configuration for the first symbol; and communicating with the network entity according to the second configuration of the first symbol.

29. The method of claim 28, further comprising:

receiving a half-duplex symbol format indication that indicates an uplink format, a downlink format, or a flexible format, for each symbol of the set of symbols, wherein the first symbol has the downlink format in the half-duplex symbol format indication, and wherein the network full-duplex configuration updates the half-duplex symbol format indication for the set of symbols for full-duplex communications at the network entity, and the UE full-duplex configuration corresponds to the network full-duplex configuration for the subset of the set of symbols for full-duplex communications at the UE.

30. A method for wireless communications at a network entity, comprising:

transmitting, to a user equipment (UE), a network full-duplex configuration that indicates a set of symbols are configured for full-duplex communication at the network entity;

transmitting, to the UE, a UE full-duplex configuration 5 that indicates at least a subset of the set of symbols of the network full-duplex configuration have a first configuration for full-duplex communication at the UE, the subset of the set of symbols including some or all of the set of symbols; 10 transmitting, to the UE, an indication that at least a first symbol of the subset of the set of symbols has a second configuration that is different from the first configuration for the first symbol; and communicating with the UE according to the second 15 configuration of the first symbol.

* * * * *